United States Patent

Sato et al.

[11] Patent Number: 6,165,396
[45] Date of Patent: Dec. 26, 2000

[54] METHOD OF OBTAINING A GAS-INTRODUCED FIBER-REINFORCED RESIN INJECTION MOLDING

[75] Inventors: Atsushi Sato; Manabu Nomura; Toru Shima; Kaoru Wada, all of Ichihara, Japan

[73] Assignee: Idemitsu Petrochemical Co., Ltd., Tokyo, Japan

[21] Appl. No.: 09/073,908

[22] Filed: May 7, 1998

[30] Foreign Application Priority Data

| May 7, 1997 | [JP] | Japan | 9-116920 |
| Jul. 11, 1997 | [JP] | Japan | 9-186462 |
| Jul. 25, 1997 | [JP] | Japan | 9-200156 |

[51] Int. Cl.[7] ............ B29C 44/02; B29C 44/04
[52] U.S. Cl. ............ 264/45.3; 264/50; 264/54; 264/328.18; 264/46.4
[58] Field of Search ............ 264/328.7, 50, 264/572, 108, 46.4, 45.3, 328.18, 54

[56] References Cited

U.S. PATENT DOCUMENTS

| 1,780,330 | 11/1930 | Blair | 264/50 |
| 3,128,262 | 4/1964 | Lightfoot | 264/572 |
| 3,523,996 | 8/1970 | Kordiak | 264/50 |
| 3,879,155 | 4/1975 | Hendry | 264/50 |
| 4,155,969 | 5/1979 | Hendry | 264/328.18 |
| 5,023,041 | 6/1991 | Jones et al. | 264/328.7 |
| 5,028,377 | 7/1991 | Hendry | 264/572 |
| 5,093,053 | 3/1992 | Eckardt et al. | 264/572 |
| 5,145,615 | 9/1992 | Kim et al. | 264/230 |
| 5,162,092 | 11/1992 | Klobucar et al. | 264/328.18 |
| 5,256,047 | 10/1993 | Moldovanyi | 264/572 |
| 5,277,866 | 1/1994 | Wright | 264/328.18 |
| 5,281,376 | 1/1994 | Hara et al. | 264/46.4 |
| 5,302,339 | 4/1994 | Baxi et al. | 264/572 |
| 5,344,596 | 9/1994 | Hendry | 264/572 |
| 5,424,020 | 6/1995 | Hara et al. | 264/328.18 |
| 5,500,175 | 3/1996 | Bradt | 264/151 |
| 5,627,218 | 5/1997 | Bradt | 521/57 |
| 5,656,215 | 8/1997 | Eckardt et al. | 264/328.7 |

FOREIGN PATENT DOCUMENTS

| 0 421 842 | 4/1991 | European Pat. Off. . | |
| 2 132 284 | 1/1972 | Germany | 264/45.3 |
| WO 92/07650 | 5/1992 | WIPO | 264/50 |
| WO 93/05941 | 4/1993 | WIPO | 264/328.7 |
| WO 97/29896 | 8/1997 | WIPO . | |

OTHER PUBLICATIONS

Patent Abstracts of Japan, vol. 97, No. 5, May 30, 1997, JP 9–011269, Jan. 14, 1997.
Patent Abstracts of Japan, vol. 95, No. 8, Sep. 29, 1995, JP 7–124987, May 16, 1995.
Patent Abstracts of Japan, vol. 16, No. 94 (M–1219), Mar. 09, 1992, JP 3–274120, Dec. 05, 1991.

*Primary Examiner*—Allan R. Kuhns
*Attorney, Agent, or Firm*—Oblon, Spivak, McClelland, Maier & Neustadt, P.C.

[57] ABSTRACT

The present invention is directed to a method of obtaining a gas-introduced fiber-reinforced resin injection molding and to a molding obtained by the method. According to the present invention, there can be obtained a lightweight gas-introduced fiber-reinforced resin injection molding containing glass fibers or like fibers having excellent rigidity and strength and improved surface properties. The method includes the steps of: injecting into a die a molten resin obtained through the plasticization of a molding material; and introducing gas into the molten resin, the molding material comprising fiber-containing thermoplastic resin pellets which contain reinforcing fibers having a length of 2 mm to 100 mm, the reinforcing fibers accounting for 5% to 70% by weight of the molding material, the die including a movable die capable of advancing into and retracting from the internal cavity of the die, wherein after the injection of the molten resin into the die cavity is started, the movable die is retracted to a position where the die cavity assumes a volume corresponding to the molding, and gas is introduced into the molten resin filling the die cavity.

19 Claims, 21 Drawing Sheets

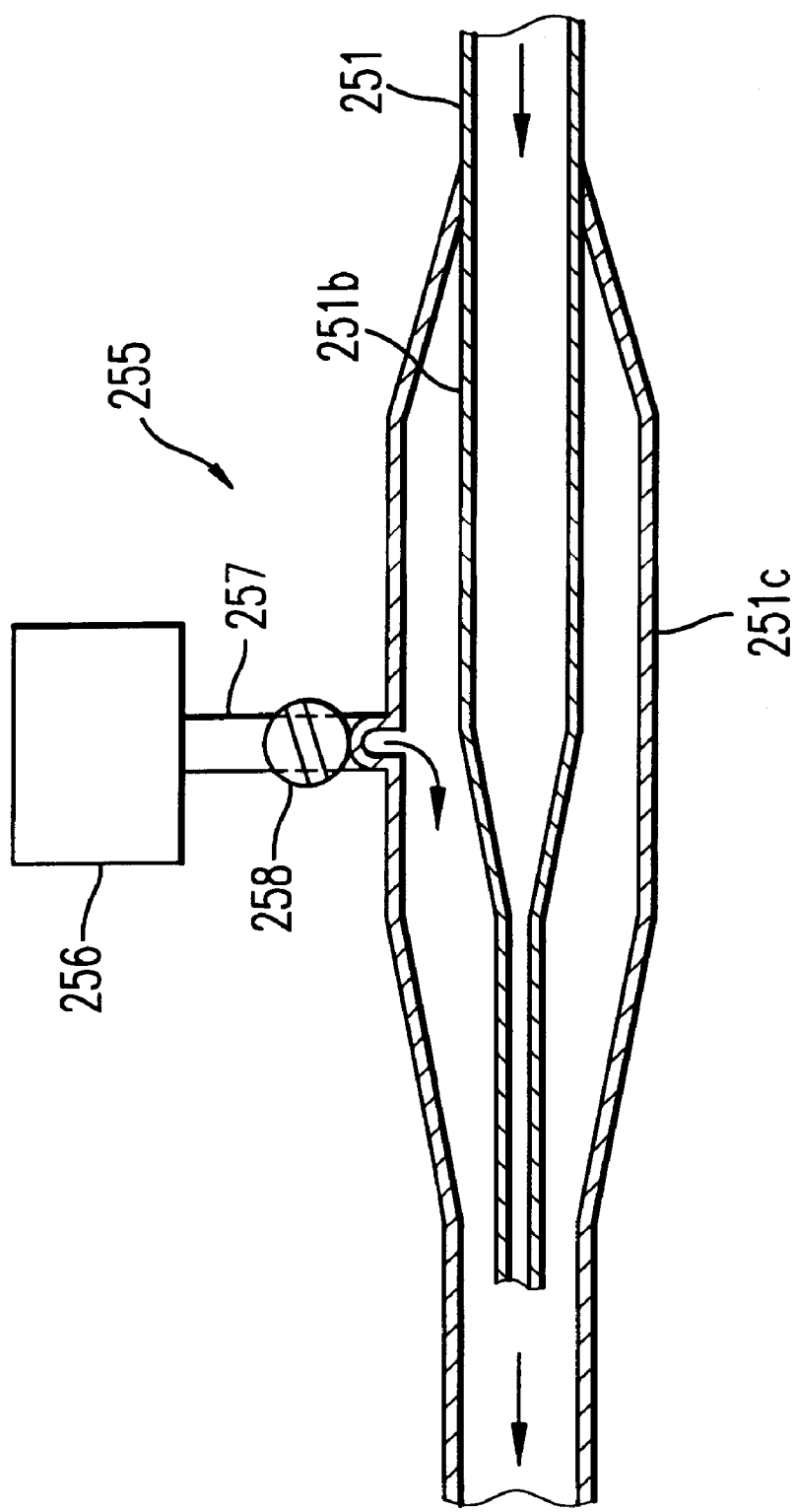

METHOD OF OBTAINING A GAS-INTRODUCED FIBER-REINFORCED RESIN INJECTION MOLDING

BACKGROUND OF THE INVENTION

1. Field of the Invention

The present invention relates to a method of obtaining a gas-introduced fiber-reinforced resin injection molding and to a molding obtained by the same. Particularly, the invention relates to a method of obtaining a lightweight gas-introduced fiber-reinforced resin injection molding containing glass fibers or like fibers and having excellent rigidity and strength and improved surface properties, as well as to a molding obtained by the method.

2. Description of the Related Art

Conventionally, there have been known fiber-reinforced resin moldings reinforced through the containment of fibers such as glass fibers. Because of excellent mechanical characteristics such as tensile strength, rigidity, and heat resistance, fiber-reinforced resin moldings are widely applied to automobile parts, such as inner panel, bumper absorbers, door steps, roof racks, rear quarter panels, and air-cleaner cases, as well as building and civil engineering members, such as outer wall panels, partition panels, and cable troughs.

Such fiber-reinforced resin moldings may be manufactured by the injection molding method in which a molten resin containing fibers is injected into the interior of a die. The injection molding method can manufacture a molding having a complicated shape and can advantageously mass-produce moldings having the same shape, since a predetermined molding cycle can be repeated continuously.

When a fiber-reinforced resin molding is to be manufactured by injection molding, the approach of increasing the amount of fibers in an attempt to improve the strength and rigidity of a molding tends to increase the weight of a manufactured molding. Accordingly, there is proposed the expansion injection molding method in which a foaming agent is mixedly added to a material resin in order to reduce the weight of a molding and the mixture is subsequently expanded and molded (Japanese Patent Application Laid-Open (kokai) No. 7-247679, etc.).

However, the expansion injection molding method has involved difficulty in obtaining a sufficient expansion ratio even when a foaming agent is used in a relatively large amount.

Further, even when a sufficient expansion ratio is obtained, foaming impairs the appearance of the resultant molding. Also, even though reinforcing fibers are contained, a molding sometimes fail to attain satisfactory mechanical characteristics such as strength, rigidity, and impact resistance due to a large hollow formed therein.

Thus, in order to attain a reduction in weight of a molding while maintaining required mechanical characteristics, such as strength, rigidity, and impact resistance, as well as required appearance quality, the following expansion molding methods (1) and (2) have already been proposed.

(1) An expansion molding method of obtaining a lightweight molding from fiber-containing resin pellets, which contain relatively long fibers, through the expansion of a molten resin effected by a springback phenomenon of the contained fibers.

(2) An expansion molding method of obtaining a more lightweight molding from the fiber-containing resin pellets mentioned above in (1) mixed with a foaming agent through the foaming-agent-accelerated expansion of a molten resin.

These methods can be used to manufacture a sufficiently lightweight fiber-reinforced resin molding without impairment of mechanical characteristics.

However, the molding methods mentioned above in (1) and (2) involve the following problems a) and b), respectively.

a) In order to prevent the breakage of reinforcing fibers as much as possible, an injection molding machine and a molding die must use a nozzle, sprue, runner, gate, and like elements designed specially to have a molten-resin flow passage of a diameter larger than a normally used diameter. Further, the shape of a molding is limited so as to prevent the breakage of reinforcing fibers during molding, and a die must also be designed accordingly.

Also, when an expansion ratio is increased in order to reduce the weight of a molding, pores present in a molten resin increase in size after the expansion of the molten resin, causing a reduction in thermal conductivity of the molten resin.

Accordingly, when a molded molten resin undergoes cooling, the interior of the molten resin cools considerably slower than does the surface of the molten resin. Consequently, it takes time until the entire molten resin cools. Even when the molten resin is expanded through the utilization of a springback phenomenon, the entire resin undergoes thermal shrinkage since the surface temperature of the resin drops. As a result, a sink mark is likely to be formed on the surface of a molding.

b) A gas generated from a foaming agent during molding enters between the surface of a molten resin and the molding surface of a die, often causing the formation of silver mark on the surface of a molding. Further, the gas ejected to the exterior of the die raises a problem of unfavorable odor.

Also, as a result of the residual pressure of the gas generated from a foaming agent, a molten resin is apt to ooze down from the nozzle of an injection apparatus when the nozzle is separated from the die. That is, a drawing phenomenon is likely to occur.

Further, as in the problem mentioned above in a), because of the presence of pores and bubbles within a molten resin, cooling the entire molten resin takes time. Thus, even when the molten resin is expanded through the utilization of a springback phenomenon, a sink mark is likely to be formed on the surface of a molding due to thermal shrinkage.

SUMMARY OF THE INVENTION

An object of the present invention is to provide a method of obtaining a gas-introduced fiber-reinforced resin injection molding capable of reducing the weight of a molding having excellent mechanical characteristics such as strength, rigidity, and heat resistance, irrespective of the shape of the molding, and capable of imparting to the molding excellent appearance free of sink mark and like defects, as well as to provide a molding obtained by the same.

According to a first aspect of the present invention, there is provided a method of obtaining a gas-introduced fiber-reinforced resin injection molding, comprising the steps of: injecting into a die a molten resin obtained through the plasticization of a molding material; and introducing gas into the molten resin, the molding material comprising fiber-containing thermoplastic resin pellets which contain reinforcing fibers having a length of 2 mm to 100 mm, the reinforcing fibers accounting for 5% to 70% by weight of the molding material, the die including a movable die capable of advancing into and retreating from the internal cavity of the die, wherein after the injection of the molten resin into the die cavity is started, the movable die is retracted to a position where the die cavity assumes a volume corresponding to the molding, and gas is introduced into the molten resin filling the die cavity.

The present invention uses a predetermined amount of reinforcing fibers having a predetermined length. The reinforcing fibers contained in the molten resin have a length such that they are seldom broken even when an ordinary die and an ordinary injection apparatus are used. Also, the reinforcing fibers are of a sufficient length and are contained in a sufficient amount to effect a springback phenomenon. As the springback phenomenon progresses, small bubbles are formed within the molten resin and grow into continuous pores, thereby forming a three-dimensional web-like resin structure. Subsequently, the molten resin is cooled while such a porous resin structure is maintained. As a result, a sufficiently lightweight molding having high strength can be obtained.

In the present invention, after the injection of the molten resin into the die cavity is started, the movable die is retracted to a position where the die cavity assumes a volume corresponding to a molding, and gas is introduced into the molten resin filling the die cavity. The introduction of gas not only accelerates the cooling of the molten resin but also assists the springback phenomenon of reinforcing fibers in effecting the formation of a three-dimensional web-like porous resin structure.

Specifically, in the case of a springback force being weak due to a relatively low content of reinforcing fibers, even when continuous small bubbles or pores are formed within a molten resin, the subsequent retraction of the movable die may cause the bubbles or pores to become nonuniform or to be biased, a sink mark may be formed on the surface of a molding, or the molten resin may separate from the molding surface of the die with a resultant failure to obtain a molding having a targeted shape. By contrast, when gas is introduced into pores formed of small continuous bubbles formed through the springback phenomenon of reinforcing fibers, the pores are uniformly filled with gas and expanded by the uniformly applied pressure of the introduced gas. Accordingly, when the movable die is retracted, the molten resin reliably expands to the volume of a molding and assumes a uniformly formed three-dimensional web-like porous resin structure.

In this case, the introduction of gas, performed after the injection of the molten resin into the die cavity is started, is preferably performed after small bubbles, formed through the springback phenomenon of reinforcing fibers effected in association with the retraction of the movable die, grow to continuous pores, particularly preferably while the movable die is retracted. When gas is introduced into the molten resin before continuous bubbles or pores are formed, the gas fails to be distributed throughout the bubbles or pores, and mere portions of bubbles or pores are expanded. As a result, relatively large hollows are formed in a nonuniform, biased manner in a molding, and thus the molding may fail to attain satisfactory strength.

When, because of a sufficiently high content of reinforcing fibers, a springback force is sufficiently strong to form a uniform three-dimensional web-like porous resin structure merely through the utilization of the springback phenomenon, gas may be introduced into a molten resin after continuous pores are formed through the springback phenomenon of reinforcing fibers, but is preferably introduced after the movable die retracts to a position where the die cavity assumes a volume corresponding to a molding.

Through the introduction of gas after the completion of retraction of the movable die, gas is distributed throughout the entire molten resin. Thus, gas is prevented from stagnating in a biased manner in the molten resin. Further, gas of a relatively low pressure can complement the expansion of the molten resin. The introduction of a low-pressure gas does not involve the occurrence of gas leakage between the surface of a molten resin and the molding surface of the die and thus prevents the occurrence of appearance defects such as silver mark.

Further, through the introduction of gas into a molten resin contained in a die before the molten resin cools and cures, the molten resin is pressed against the molding surface of the die by the pressure of the introduced gas and cools and cures while maintaining close contact between its surface and the molding surface of the die. Accordingly, even when the molten resin undergoes thermal shrinkage, numerous pores formed within the molten resin merely increase in size without the formation of appearance defects, such as sink mark, on the surface of a molding.

Since the pressure of the introduced gas holds a molten resin pressed against the molding surface of the die, the cooling of the molten resin is accelerated, thereby significantly reducing cooling time.

Additionally, with regard to the introduction of gas into a molten resin, when the introduced gas is adapted to maintain a constant pressure and to be partially released to the exterior of a die when gas pressure increases, the discharged gas removes heat from inside the molten resin. Thus, the cooling time of the molten resin is reduced, and thus the cycle time of molding is reduced, thereby improving the mass productivity of moldings.

Preferably, the movable die is advanced sometime between the aforementioned start of injection of a-molten resin and the aforementioned start of retraction of the movable die, in order to compress the molten resin filling the die cavity. As a result of compressing the molten resin and thereby pressing the molten resin against the molding surface of the die before the molten resin is allowed to expand, the surface of the molten resin is cooled. Accordingly, a skin layer is formed in the surface of the molten resin along the molding surface of the die, thereby imparting excellent appearance to a molding.

Preferably, the aforementioned molding material used in the present invention contains at least fiber-containing thermoplastic resin pellets which have a length of 2 mm to 100 mm and which contain reinforcing fibers having a length equal to that of the resin pellets and arranged in parallel in an amount of 20% to 80% by weight, and the reinforcing fibers account for 5% to 70% by weight of the molding material.

The fiber-containing thermoplastic resin pellets may be contained singly or in combination with other resin pellets.

When the length of reinforcing fibers is less than 2 mm, even the introduction of gas may fail to complement the expansion of a molten resin. By contrast, when the length is in excess of 100 mm, bridging may occur during injection molding, or plasticization may be impaired. Thus, molding may become difficult to perform.

Through use of resin pellets which contain reinforcing fibers, arranged in parallel with each other, in an amount of 20% to 80% by weight, the fibers are less likely to be broken even though the pellets are elasticized and kneaded by the screw of an injection apparatus.

When the reinforcing-fiber content of a molding material is less than 5% by weight, a springback phenomenon cannot be expected to effect the expansion of a molten resin, and the introduction of gas involves fear of formation of a relatively large hollow within the molten resin. As a result, a molding may fail to attain a reduction in weight or fiber-effected reinforcement.

When the reinforcing-fiber content of a molding material is in excess of 70% by weight, it becomes difficult to mold the molten resin because of less flowability of a molten resin. Moreover, since the fiber added to the molten resin often appears onto the surface of the molding, it becomes hard to obtain the fiber-reinforced resin molding having an excellent appearance.

In the present invention, the aforementioned molding material may contain a foaming agent in an amount not greater than 3 parts by weight based on 100 parts by weight of the molding material.

When a foaming agent is contained in the molding material, a foaming force of the foaming agent compensates any lack of springback force of fibers. Accordingly, even when no gas is introduced into a molten resin, as the movable die retreats, the molten resin reliably expands to a volume corresponding to a molding.

When the foaming-agent content of a molding material is in excess of 3 parts by weight, silver mark may be formed with a resultant impairment of appearance of a molding. Further, a relatively large hollow may be formed in a molding, causing a significant impairment in strength and rigidity.

Thus, the foaming-agent content of a molding material is preferably minimized in view of the fact that a foaming agent is added merely for the purpose of complementing a springback phenomenon.

In the present invention, the aforementioned gas is preferably a cooling gas having a temperature not higher than 15° C., preferably not higher than 0° C.

Further, the gas is preferably provided at a gauge pressure of 0.1 $kg/cm^2$ to 200 $kg/cm^2$, particularly 0.1 $kg/cm^2$ to 20 $kg/cm^2$.

That is, the pressure of gas to be introduced depends on various factors including: the size, shape, and expansion ratio of a molding; fluidity, viscosity, and the amount of fibers contained in a molten resin; and the shape of the gate of a die.

Generally, as the pressure of gas decreases, the possibility of formation of a relatively large hollow within a resin also decreases. As a result, a molding can more reliably assume a required strength. Also, gas leakage between the surface of a molten resin and the molding surface of a die is less likely to occur, thereby decreasing the possibility of occurrence of appearance defects such as silver mark.

The reason why gas having a relatively low pressure can be introduced into a molten resin is that numerous continuous pores are formed in the molten resin through the utilization of springback phenomenon of fibers. By contrast, when only a foaming agent is used without the utilization of the springback phenomenon, mere independent bubbles can be formed. Thus, the introduction of a low-pressure gas to be performed in the case of utilizing the springback phenomenon, is difficult to perform.

When the pressure of gas is in excess of 200 $kg/cm^2$, there may often occur gas leakage between the surface of a molten resin and the molding surface of a die, or a relatively large hollow may be formed. Thus, appearance defects, such as silver mark, and functional defects, such as an impairment of strength, caused by a large hollow are highly likely to occur.

Preferably, in a cooling step, gas is circulated in and discharged from a molten resin so as to quickly cool the molten resin.

In the present invention, gas may be introduced into a molten resin through a gas nozzle provided within the nozzle of an injection apparatus, which plasticizes a molding material and injects into the cavity of a die a molten resin obtained through the plasticization. Alternatively, gas may be introduced into the molten resin through a pin-and-sleeve arrangement provided in the die and opening to a sprue, runner, or die cavity.

Preferably, gas is introduced into a molten resin through a pin-and-sleeve arrangement provided in a die. More preferably, the pin-and-sleeve arrangement opens to a die cavity.

Preferably, the pin-and-sleeve arrangement includes a sleeve element, a pin element inserted into the sleeve element, and a gas flow passage defined by the sleeve element and the pin element, and the end portion of the sleeve element projects farther toward the gas outlet side than does the tip of the pin element.

The surface layer of a fiber-reinforced resin molding has a strength higher than that of an ordinary resin molding. The employment of the above-mentioned pin-and-sleeve arrangement enables gas to break through the surface layer, irrespective of molding material and molding conditions, and thus enables gas to be sufficiently introduced into a reinforcing-fiber-containing resin. Thus, the formation of a sink mark or a like defect can be reliably prevented.

Specifically, the surface layer of a molten resin (molding) in contact with the molding surface of a die is cooled more than is the interior of the molten resin. Accordingly, when an employed pin-and-sleeve arrangement is such that the tip of the pin element projects from the sleeve element, a low-pressure gas may not be able to break through the surface layer of the molten resin and may thus enter between the surface of the molten resin and the molding surface of the die instead of entering the molten resin. In this case, even when the low-pressure gas can break through the surface layer to thereby form a gas inlet bore in the surface layer, the cross-sectional area of the gas inlet bore tends to be smaller than that of the gas flow passage of the pin-and-sleeve arrangement. As a result, a required amount of gas may not be introduced into the molten resin.

In order to solve this problem and introduce a sufficient amount of gas into a molten resin, a high-pressure gas may be used. However, the use of high-pressure gas involves a problem that a large hollow is formed within a molding with a resultant impairment of strength of the molding.

By contrast, in the case of the above-mentioned pin-and-sleeve arrangement of the invention, the end portion of the sleeve element projects farther toward the gas outlet side than does the tip of the pin element. Accordingly, gas discharged from a gas flow passage collects in and fills an end space defined by the tip of the pin element and the sleeve element. As a result, the pressure of gas collecting in the end space increases. When the gas pressure increases sufficiently to break through the surface layer of a molten resin (molding), the gas breaks through the surface layer to thereby form in the surface layer a gas inlet bore having a cross-sectional area larger than that of the gas flow passage. That is, there is formed in the surface layer a gas inlet bore having a cross-sectional area and shape substantially similar to those of the gas-outlet-side end opening of the sleeve element. Gas is introduced into the molten resin through the thus-formed gas inlet bore.

As described above, even when the pressure of gas introduced into the gas flow passage is relatively low, the gas pressure can be increased within the end space so as to break through the surface layer of a molten resin. Thus, gas can be reliably introduced into the molten resin. Further, since there is formed in the surface layer a gas inlet bore having a cross-sectional area larger than that of the gas flow passage, a sufficient amount of gas can be introduced into the molten resin. Accordingly, the molten resin is cooled while being pressed against the molding surface of the die by the pressure of the introduced gas; thus, a skin layer is formed in the surface layer of a molding, thereby reliably preventing the occurrence of appearance defects such as sink mark.

Further, as soon as gas collecting in the end space reaches a sufficient pressure to break through the surface layer of a molten resin, the gas breaks through the surface layer, so that the gas pressure is prevented from increasing excessively. Accordingly, the pressure of gas to be introduced into a molten resin can be minimized to a level required for breaking through the surface layer, thereby avoiding the gas-induced formation of a large hollow within a molding. Thus, excellent strength can reliably be imparted to the molding.

Through use of a molten resin containing reinforcing fibers as a molding material, favorable mechanical characteristics are imparted to a molding. Further, after the injection of a molten resin into a die cavity is started or after the injection of a molten resin has been performed, there are performed a step of expanding the die cavity and a step of introducing gas into the molten resin. Thus, the introduction of gas can complement the springback-effected expansion of the fiber-containing molten resin, thereby reliably expanding the molten resin. Accordingly, there is obtained a lightweight molding having excellent mechanical characteristics with respect to unit weight.

The gas-outlet-side tip of the pin element of the pin-and-sleeve arrangement may be pointed. However, this is not recommended for the following reason. When gas is discharged from the gas flow passage of the pin-and-sleeve arrangement and collects in the end space of the arrangement, the gas presses a molten resin. At this time, it is surmised that the gas collecting in the end space is distributed such that the distance between the molten resin and the tip of the pin element is constant. Accordingly, if the tip of the pin element is pointed, the surface of the molten resin pressed by the gas assumes a conical shape corresponding to the pointed profile of the tip of the pin element. Thus, the gas is apt to concentrate at the vertex of the conical shape, and therefore the gas may not be sufficiently introduced into the molten resin.

For this reason, the tip of the pin element on the gas outlet side preferably has a flat surface substantially perpendicular to the axis of the pin element.

Through use of the flat-ended pin element, a sufficient amount of gas can be reliably introduced into the molten resin, thereby more reliably preventing the occurrence of a sink mark or a like defect. Further, since the pin element has a simple shape, its manufacture can be facilitated. The favorable effect of the flat end of the pin element conceivably derives from the fact that a portion of the molten resin pressed by gas becomes flat so that the gas can uniformly fill the end space of the pin-and-sleeve arrangement.

The sleeve element and the pin element may have the following structure: the sleeve element is cylindrically formed; the pin element is formed substantially in the shape of the letter T and includes a pin body inserted into the sleeve element and an anchorage portion, which is provided at the gas-inlet-side base end of the pin body and covers the gas-inlet-side opening of the sleeve element; and slits formed in the anchorage portion serve as a gas inlet to a gas flow passage.

Since, as mentioned above, the pin element formed substantially in the shape of the letter T has the anchorage portion corresponding to the upper bar of the letter T, when gas is introduced into a gas flow passage through the slits formed in the anchorage portion, the gas flow functions to press the anchorage portion against the gas-inlet-side end of the sleeve element, thereby reliably preventing the pin element from separating from the sleeve element.

Preferably, the gas-outlet-side end of the sleeve element projects beyond the tip of the pin element in an amount of 0.1 mm to 3 mm.

If the amount of the projection is less than 0.1 mm, a sufficient end space is not obtained, resulting in a potential failure to introduce a required amount of gas into a molten resin. If the amount of the projection is in excess of 3 mm, a molding may not smoothly separate from the pin-and-sleeve arrangement in the step of removing the molding from a die.

Herein, a single pin-and-sleeve arrangement may be provided in a die. However, in order to uniformly introduce gas into the entire molten resin, preferably, a plurality of pin-and-sleeve arrangements are provided in a die so as to introduce gas into a molten resin from two or more positions.

In order to obtain a molding having excellent appearance, a pin-and-sleeve arrangement is preferably located in a die at a molding surface opposite that corresponding to the facing surface of a molding.

In the present invention, in addition to gas, a liquid coolant may be introduced into a molten resin. The introduced liquid coolant is usually released to the exterior of a die through vaporization.

When a liquid coolant, together with gas, is introduced into a molten resin, even a small amount of liquid coolant removes a large quantity of heat from inside the molten resin, since the thermal capacity of liquid coolant is large as compared to that of gas. Further, the liquid coolant vaporizes within the molten resin, thereby accelerating cooling of the molten resin through the removal of heat in the form of heat of vaporization.

Also, a liquid coolant is reliably introduced into a molten resin by means of gas. The thus-introduced liquid coolant evaporates within the molten resin, and the vapor is discharged to the exterior of a die. Thus, heat is not accumulated within the molten resin, so that a molding is reliably cooled. Further, the molten resin contained in a die cavity is pressed against the molding surface of the die by the pressure of the introduced gas, whereby the molten resin cools and cures while the surface of the molten resin is held in close contact with the molding surface of the die. Accordingly, a sink mark or a like defect is not formed on the surface of a molding. Also, since the surface of the molten resin is continuously pressed against the molding surface of the die by the pressure of the introduced gas, the cooling of the molten resin is accelerated. This reduces cooling time significantly.

Cooling through use of a liquid coolant is particularly effective for a molding integrally coated with a facing material, whose cooling time is more than twice that of an ordinary molding since the facing material serves as a heat insulator to thereby retard cooling through a die.

In the case of introducing gas and a liquid coolant into a molten resin, only gas may be first introduced into the molten resin, and then the liquid coolant, together with gas, may be introduced into the molten resin.

In doing so, the initially introduced gas complements the springback-effected expansion of the molten resin to thereby uniformly form pores in the molten resin. Thus, in the subsequent introduction of gas and liquid coolant, the liquid coolant is reliably introduced into the uniformly formed pores by means of the gas. Through the vaporization of the introduced liquid coolant, heat is sufficiently removed from the molten resin, thereby accelerating the uniform cooling of a molding.

In the present invention, a facing material to cover a molding can be attached to the aforementioned die prior to start of molding.

Through use of such a die to which a facing material is previously attached, a laminated molding covered with the facing material can be obtained.

Examples of such a facing material include single-layer materials, such as woven fabrics, nonwoven fabrics, thermoplastic resin facing materials, expanded thermoplastic resin facing materials, and films printed with patterns or the like; and multilayered facing materials, such as a thermoplastic elastomer, vinyl chloride resin, or a like facing material which is lined with a thermoplastic resin, an expanded thermoplastic resin, or the like.

A thermoplastic resin serving as a main component of resin pellets is not particularly limited. Examples of such a thermoplastic resin include polyolefin resins such as polypropylene, propylene-ethylene block copolymers, propylene-ethylene random copolymers, and polyethylene; polystyrene resins; ABS resins; polyvinyl chloride resins, polyamide resins, polyester resins, polyacetal resins, polycarbonate resins, aromatic polyether or thioether resins, aromatic polyester resins, polysulfone resins, and acrylate resins.

The above thermoplastic resins may be used singly or in combination.

Among the thermoplastic resins, preferable are polypropylene resins, such as polypropylene, block or random copolymers of propylene and another olefin, and mixtures thereof, and particularly preferable are polypropylene resins which contain a polyolefin resin modified with an unsaturated carboxylic acid or its derivative.

Examples of reinforcing fibers to be contained in the aforementioned resin pellets include fibers shown below in (1) to (4). Particularly preferably, glass fibers are employed.

(1) Ceramic fibers: boron fibers, silicon carbide fibers, alumina fibers, silicon nitride fibers, zirconia fibers (2) Inorganic fibers: glass fibers, carbon fibers (3) Metallic fibers: copper fibers, brass fibers, steel fibers, stainless steel fibers, aluminum fibers, aluminum alloy fibers (4) Organic fibers: polyester fibers, polyamide fibers, aramid fibers, Kevlar (trade name) fibers, polyarylate fibers Glass fibers to be contained in resin pellets are E-glass or S-glass fibers having an average fiber diameter not greater than 25 $\mu$m, preferably 3 $\mu$m to 20 $\mu$m.

When the glass fiber diameter is less than 3 $\mu$m, glass fibers do not intimately contact a resin, and thus the impregnation of glass fibers with a resin becomes difficult to perform during the manufacture of pellets. By contrast, when the glass fiber diameter is in excess of 20 $\mu$m, the glass fibers are likely to break or chip during melting and kneading.

In the manufacture of pellets from any of the above thermoplastic resins and glass fibers through pultrusion or solution impregnation, glass fibers are surface-treated through use of a coupling agent and are subsequently bundled in groups of 100 fibers to 10,000 fibers, preferably 150 fibers to 5,000 fibers, through use of a binder.

The coupling agent may be selected as adequate from among conventional so-called silane coupling agents and titanium coupling agents.

Examples of such a coupling agent include amino silanes or epoxy silanes, such as $\gamma$-aminopropyltriethoxysilane, N-$\beta$-(aminoethyl)-$\gamma$-aminopropyltrimethoxysilane, $\gamma$-glycidoxypropyltrimethoxysilane, and $\beta$-(3,4-epoxycyclohexyl)ethyltrimethoxysilane. Particularly, the former amino silane compounds are preferable.

Example methods of surface-treating glass fibers through use of such a coupling agent include a sizing process, a dry mixing method, and a spraying method. In the sizing process, a coupling agent is mixed into an organic solvent to obtain an organic solution or suspension, and subsequently the thus-obtained solution or suspension, serving as a so-called sizing agent, is applied to glass fibers.

In the surface treatment of glass fibers, in addition to the aforementioned coupling agent, a film-forming substance for glass may be used. Examples of such a film-forming substance include polyesters, urethane polymers, epoxy polymers, acrylic polymers, vinyl acetate polymers, and isocyanate polymers, with urethane polymers and olefin polymers being preferred.

Examples of a binder include urethane compounds, olefin compounds, acrylic compounds, butadiene compounds, and epoxy compounds. Of these, urethane compounds and olefin compounds are particularly preferred.

Among the above binders, urethane binders may be of either a single-component type, such as oil-modified type, moisture-hardened type, block type, or the like, or a two-component type such as catalyst-hardened type, polyol-hardened type, or the like, so long as urethane binders, which are usually obtained through reaction of a diisocyanate compound and polyhydric alcohol, contain polyisocyanate in an amount of not less than 50% by weight.

Examples of an olefin binder include polyolefin resins modified with an unsaturated carboxylic acid or a derivative thereof.

Glass fibers bundled through use of the above binder are coated and impregnated with a thermoplastic resin so as to manufacture resin pellets which contain glass fibers.

Example methods of coating and impregnating glass fibers with a thermoplastic resin include the following: a bundle of fibers is immersed in a molten resin contained in a container or the like so as to impregnate the bundle with the resin; a bundle of fibers is immersed in a relevant resin suspension or emulsion so as to impregnate the bundle with the resin, and subsequently the bundle of fibers is caused to pass through a coating die; and a molten resin adhering to a bundle of fibers is forcibly spread through use of a die so that the bundle of fibers is impregnated with the resin.

Also, a pultrusion process combined with pressing is applicable to a process of impregnating fibers with a resin. Specifically, a bundle of fibers is drawn for impregnation with a molten resin through a die which has pits and projections formed in the inner wall thereof in order to establish intimate contact between a bundle of fibers and a resin, i.e. to improve wettability. Then, the bundle of fibers is pressed through use of pressure rollers.

When glass fibers and a molten resin show intimate contact, or good wettability, therebetween, the glass fibers are readily impregnated with the molten resin, and pellets can be readily manufactured. Thus, the aforementioned step of bundling fibers through use of a binder may be omitted.

In order to establish intimate contact between glass fibers and a resin, the resin may be polarized, or a functional group which reacts with a coupling agent may be grafted onto the surfaces of glass fibers.

The thus-formed bundle of long fibers (assuming the form of strand or the like) impregnated with a resin is cut in its longitudinal direction to obtain resin pellets which contain long fibers having the same length as that of the pellets.

The form of a bundle of long fibers impregnated with a resin, from which resin pellets are obtained, is not limited to a strand having a substantially circular cross section. A bundle of long fibers impregnated with a resin may assume the form of sheet, tape, or band and be cut to obtain resin pellets having a predetermined length.

As described hereinabove, in the molding method of the present invention, there may be incorporated a foaming agent in an amount of not more than 3 parts by weight, specifically, 0.01 to 3 parts by weight, based on 100 parts by weight of the starting material.

The foaming agent to be added is not particularly limited so long as it is thermally decomposed to generate a gas.

Examples of such a foaming agent include oxalic acid derivatives, azo compounds, hydrazine derivatives, semicarbazides, azide compounds, nitroso compounds, triazole, urea and its related compounds, nitrites, hydrides, carbonates, and bicarbonates.

More specifically, mention may be given of azodicarbonamide (ADCA), benzenesulfohydrazide, N,N-dinitropentamethylenetetramine, and terephthalazide.

To resin pellets may be added, as needed, stabilizers, antistatic agents, weathering stabilizers, coloring agents, short fibers, and fillers such as talc.

According to a second aspect of the present invention, there is provided a molding obtained by the method according to the first aspect.

Specifically, the present invention provides a fiber-reinforced resin injection molding, manufactured by the steps of: injecting into a die a molten resin obtained through the plasticization of a molding material; and introducing gas into the molten resin, the molding material comprising fiber-containing thermoplastic resin pellets which contain reinforcing fibers having a length of 2 mm to 100 mm, the reinforcing fibers accounting for 5% to 70% by weight of the molding material, the die including a movable die capable of advancing into and retreating from the internal cavity of the die, wherein after the injection of the molten resin into the die cavity is started, the movable die is retracted to a position where the die cavity assumes a volume corresponding to the molding, and gas is introduced into the molten resin filling the die cavity.

According to the second aspect, the formation of numerous pores in a molding attains a reduction in weight of the molding. Accordingly, application to transportation machinery parts such as automobile parts improves the mechanical efficiency or the like of transportation machinery. Also, application to building and civil engineering members such as cable troughs facilitates installation work due to the lightness of the molding.

Preferably, reinforcing fibers contained in the molding of the invention have an average length of 2 mm to 10 mm.

When the average length of reinforcing fibers is not less than 2 mm, an obtained molding conceivably has a necessary minimum strength, lightness, and excellent appearance, and thus can be used in various applications.

By contrast, when the average length of reinforcing fibers is in excess of 10 mm, reinforcing fibers encounter difficulty in entering a fine portion, rib, or the like of a molding. As a result, the strength of such a portion may decrease due to insufficient presence of reinforcing fibers.

BRIEF DESCRIPTION OF THE DRAWINGS

FIG. 12 is a sectional view showing a connecting portion between a refrigerant feeding apparatus and a gas injection apparatus according to the fifth embodiment;

DESCRIPTION OF THE PREFERRED EMBODIMENTS

Embodiments of the present invention will now be described with reference to the drawings.

Figure 1:
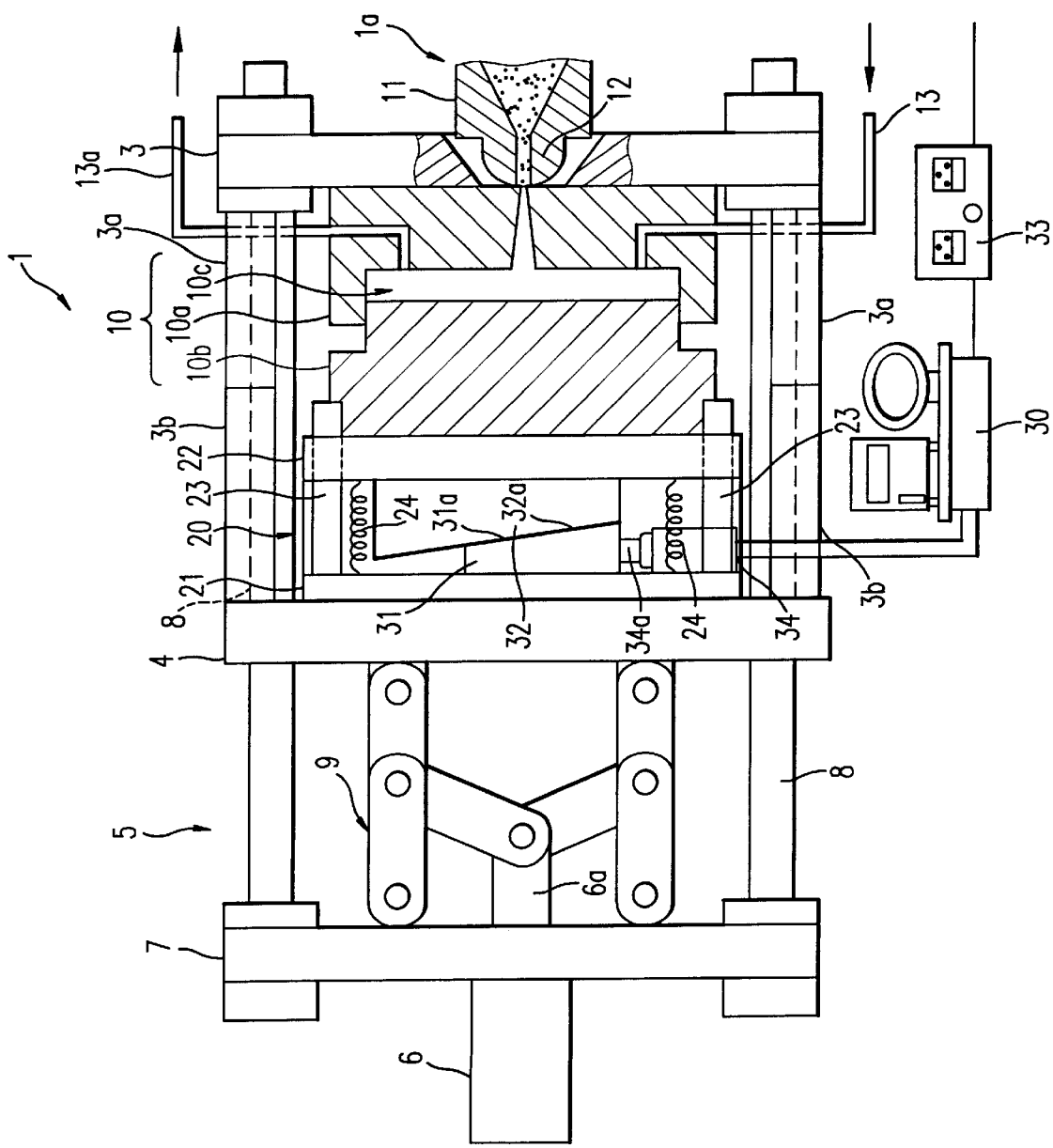
FIG. 1 is a side view showing the entirety of an injection molding machine according to a first embodiment and the like of the present invention.

FIG. 1 shows an injection molding machine 1 according to a first embodiment of the present invention. The injection molding machine 1 includes a stationary die 10A and a movable die 10B. The stationary die 10A, the movable die 10B, and a cavity 10C constitute a die 10. A molten resin is injected into the cavity 10C so as to obtain a molding.

The injection molding machine 1 has an injection apparatus 1A for injecting a molten resin into the die 10, a stationary die plate 3 to which the stationary die 10A is fixedly attached, a movable die plate 4 to which the movable die 10B is attached and which is movable in relation to the stationary die plate 3, a die-clamping apparatus 5 for advancing the movable die plate 4 toward the stationary die plate 3, and a die-moving apparatus 20 attached to the movable die plate 4 and adapted to advance or retreat the movable die 10B in relation to the stationary die 10A.

In the injection apparatus 1A, resin pellets charged into an injection cylinder 11 are kneaded and plasticized through use of an unillustrated screw. A molten resin obtained through the plasticization of the resin pellets is discharged through a nozzle 12 provided at the tip of the injection cylinder 11.

The stationary die 10A includes pin-and-sleeve arrangements 13 and 13A for introducing gas into a molten resin. The pin-and-sleeve arrangements 13 and 13A usually open at a molding surface for molding the back surface of a molding. The pin-and-sleeve arrangements 13 and 13A are connected to an unillustrated gas introduction apparatus for introducing gas into a molten resin contained in the die 10.

In order to hold constant the pressure of gas introduced into a molten resin contained in the die 10, the pin-and-sleeve arrangement 13 may serve as a release passage for partially releasing gas from inside the molten resin upon an increase in the gas pressure of the interior of the molten resin.

Also, the die 10 has a pressure-regulating valve (not shown) for controlling the gas pressure of the interior of a molten resin at a predetermined level through opening or closing the release passage (pin-and-sleeve arrangement 13A).

The pin-and-sleeve arrangement 13A and the pressure-regulating valve enable the introduced gas to circulate within the die 10 and be released to the exterior of the die 10, thereby significantly improving the cooling rate of a molding.

The movable die plate 4 is slidably movable along tie bars 8 extending between a stationary plate 7, to which a die-clamping oil hydraulic cylinder unit 6 is rigidly secured, and the stationary die plate 3.

The die-clamping apparatus 5 has a toggle mechanism 9 to which a piston rod 6A of the oil hydraulic cylinder unit 6 is connected. A pressing force generated by the oil hydraulic cylinder unit 6 is amplified by the toggle mechanism 9. The thus-amplified force causes the movable plate 4 to advance to thereby clamp the die 10.

Clamping-force-bearing blocks 3A and 3B are provided between the movable die plate 4 and the stationary die plate 3. When the movable die plate 4 is advanced, the clamping-force-bearing block 3B provided on the side of the movable die plate 4 abuts the clamping-force-bearing block 3A provided on the side of the stationary die plate 3 to thereby bear a large clamping force produced by the toggle mechanism 9. The clamping-force-bearing blocks 3A and 3B are adapted to maintain parallelism between the die plates 3 and 4.

The die-moving apparatus 20 includes a stationary plate 21, which is attached to the movable die plate 4, and a movable plate 22, which advances or retracts in relation to the stationary plate 21.

The movable die 10B is mounted on the front surface of the movable plate 22. The movable plate 22 is slidable along guide bars 23 set in the stationary plate 21. Tension springs 24 extend between the movable plate 22 and the stationary plate 21 and continuously apply to the movable plate 22 a tensile force which pulls the movable plate 22 toward the stationary plate 21.

A pair of inclination members 31 and 32 are provided between the stationary plate 21 and the movable plate 22.

The inclination members 31 and 32 have inclined surfaces 31A and 32A, respectively, which are inclined in relation to the moving direction of the movable die 10B. The inclined surfaces 31A and 32A are in face-to-face contact and arranged along the moving direction of the movable die 10B.

The inclination member 31 is slidable on the surface of the stationary plate 21 in a direction perpendicular to the moving direction of the movable die 10B. The inclination member 31 is connected to the tip of a piston rod 34A of an oil hydraulic unit 34 which is rigidly secured to the stationary plate 21. The oil hydraulic cylinder unit 34 is adapted to move the inclination member 31 toward the inclination member 32.

The inclination member 32 is rigidly secured to the movable plate 22.

Since the inclination member 31 is movable, the inclination members 31 and 32 are said to be movable in relation to each other.

In the die-moving apparatus 20 having the above-described structure, the inclination member 31 is slid on the surface of the stationary plate 21 so as to move toward or away from the inclination member 32. Also, the movable die 165 can be moved to a position located a certain distance from the stationary die 10A and temporarily secured in the position.

In order to feed hydraulic oil to the die-moving apparatus 20, an oil hydraulic unit 30 is provided. Also, there is provided a control unit 33 which controls the oil hydraulic unit 30 so as to cause the die-moving apparatus 20 to perform a desired operation.

The control unit 33 has a sequence control circuit, such as a digital sequencer, and can be programmed so as to cause the movable die 10B to continuously perform any of several different operations; for example, the movable die 10B moves stepwise in relation to the stationary die 10A, or halts at a predetermined position and then resumes moving.

Next, a molding procedure of the present embodiment will be described.

First, the die 10 is attached to the injection molding machine 1, and resin pellets are charged into the injection cylinder 11 of the injection apparatus 1A. Then, the injection molding machine 1 is started, thus starting to plasticize and knead resin pellets contained in the injection cylinder 11.

The resin pellets employed herein are primarily formed from polypropylene and have a length of 2 to 100 mm. The resin pellets contain, in an amount of 20% to 80% by weight, reinforcing fibers which have a length equal to that of the resin pellets and are arranged in parallel. In the case of a mixture of the resin pellets and other pellets not containing reinforcing fibers, the mixture contains reinforcing fibers in an amount of 5% to 70% by weight, preferably 5% to 60% by weight.

In the injection cylinder 11, resin pellets are sufficiently plasticized and kneaded such that countless glass fibers are uniformly distributed in a molten resin and intertwined, thus facilitating the occurrence of a springback phenomenon.

The die-clamping apparatus 5 is activated so as to move the movable die plate 4 toward the stationary die plate 3, causing the clamping-force-bearing block 3B on the side of the movable die plate 4 to abut against the clamping-force-bearing block 3A on the side of the stationary die plate 3.

Figure 2A:
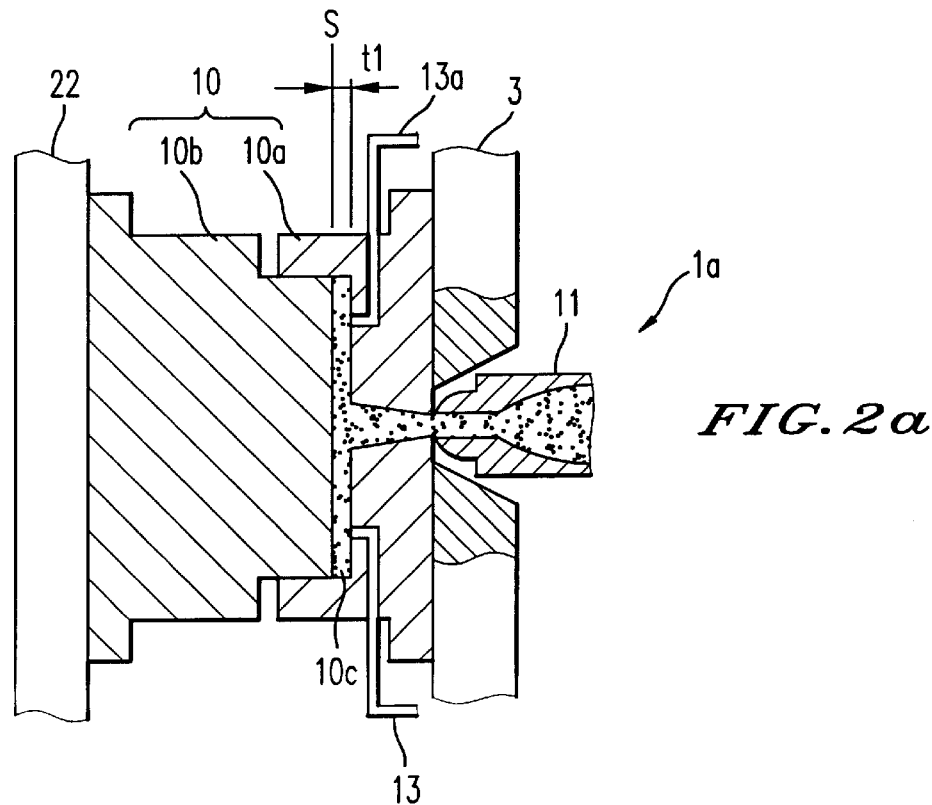
FIG. 2A is a view showing a step of molding procedure according to the first embodiment of the present invention.

Next, the die-moving apparatus 20 is activated so as to move the movable die 10B to position S where the cavity 10C of the die 10 assumes a volume smaller than that corresponding to a molding, as shown in FIG. 2(A). The thickness of the cavity 10C becomes t1.

In this case, t2/t1 can be set at the range between 1.2 and 6.0, where t1 denotes the thickness of the cavity 10C defined by the movable die 10B located in position S and t2 denotes the thickness of the cavity 10C having a volume corresponding to a molding.

In the above-mentioned state, a molten resin is injected into the die 10 from the injection apparatus 1A. The cavity 10C, having a volume smaller than that corresponding to a molding, is filled with the molten resin, which is closely pressed against the molding surface of the die 10 by an injection pressure. Thus, the injection of the molten resin is completed.

Figure 2B:
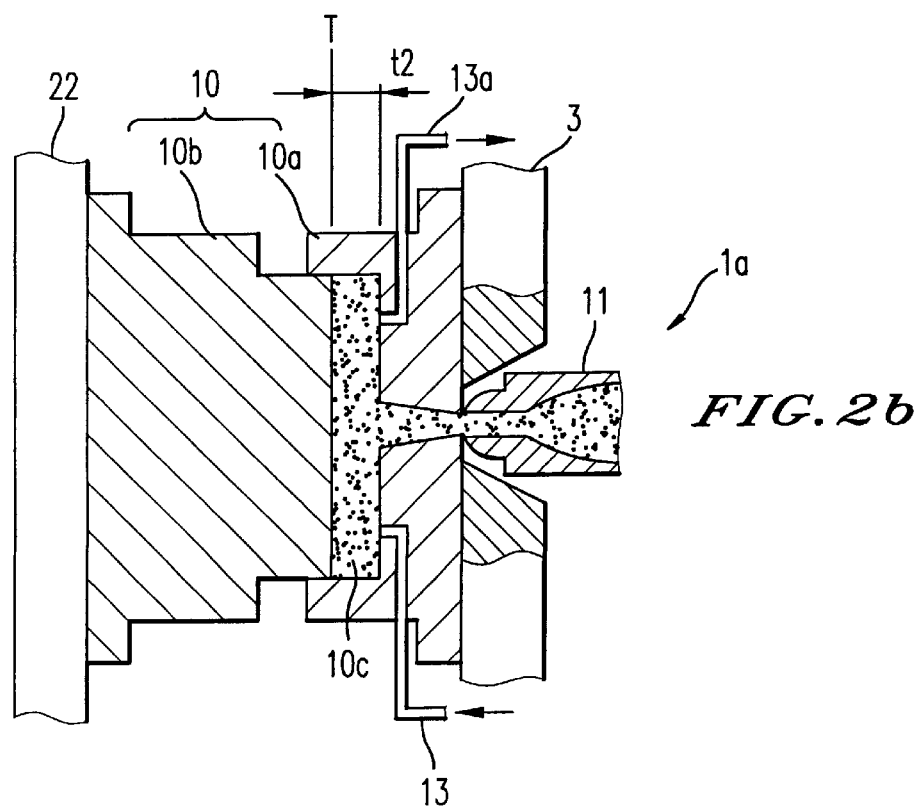
FIG. 2B is a view showing a step of molding procedure according to the first embodiment.

Immediately before or after the completion of injection of the molten resin or after the elapse of a predetermined time following the completion of injection of the molten resin, the die-moving apparatus 20 is activated so as to retreat the movable die 10B to position T where the cavity 10C of the die 10 assumes a volume corresponding to a molding, as shown in FIG. 2(B). The thickness of the cavity 10C becomes t2.

During the time between the completion of injection of the molten resin and the arrival of the movable die 10B at the position T, the surface of the molten resin contained in the die 10 is cooled, thereby forming a skin layer in the surface of the molten resin (molding).

When the movable die 10B is to be retracted after the completion of injection of the molten resin, the time between the completion of the injection and the start of the retraction may be set at the range between 0 and 10 seconds, depending on the temperature of the die 10.

The retraction rate Vr of the movable die 10B is 0.05 mm/sec to 100 mm/sec, preferably 0.05 mm/sec to 50 mm/sec.

When the movable die 10B is retracted, a springback phenomenon causes the molten resin to expand. Specifically, glass fibers contained in the molten resin are released from compression and thus apply an elastic restoring force to the molten resin; consequently, the molten resin expands, thereby forming countless pores within the molten resin. Thus, there is obtained a lightweight molding having a volume greater than that of the molding material employed.

As soon as the movable die 10B reaches the position T, gas is introduced into the molten resin through the pin-and-sleeve arrangement 13. Through the introduction of gas at this point of time, the gas is introduced into the molten resin before the molten resin contained in the die 10 is completely cooled and cured.

The gas introduced into the molten resin is distributed into countless pores formed in the molten resin; thus, a large hollow is not formed in the molten resin.

Also, the molten resin is pressed against the molding surface of the die 10 from inside by the pressure of the introduced gas and cooled and cured while maintaining close contact between its surface and the molding surface of the die 10. Accordingly, even when the molten resin undergoes thermal shrinkage subsequent to cooling and curing, numerous pores formed within the molten resin merely increase in size without the formation of appearance defects, such as sink mark, on the surface of a molding.

The gas introduced into the molten resin is set at a pressure of 0.1 kg/cm$^2$ to 20 kg/cm$^2$ and higher than a set pressure of the aforementioned pressure-regulating valve.

Accordingly, the gas introduced into the molten resin is maintained at a predetermined pressure by the pressure-regulating valve and partially released to the exterior of the die 10. Through the partial release of gas, the interior of the molten resin is cooled; thus, cooling time for the molten resin is reduced.

In this case, cooling efficiency is improved through use of a cooling gas having a temperature not higher than 15° C., preferably not higher than 0° C.

After the elapse of a predetermined time required for sufficiently cooling a molding, the die-clamping apparatus 5 is activated so as to retract the movable die plate 4 and open the die 10. Then, the molding is removed from the interior of the die 10, thereby completing the molding operation. Subsequently, the above molding operation is repeated as needed.

The present embodiment described above produces the following effect.

Reinforcing fibers contained in a molten resin have a length of 2 mm to 100 mm and account for 5% to 70% by weight of the molten resin. Further, reinforcing fibers contained in fiber-containing thermoplastic resin pellets are arranged in parallel with each other. Accordingly, even when the die 10 and the injection apparatus 1A are of an ordinary type, reinforcing fibers are less likely to be broken during kneading or injection.

Thus, the reinforcing fibers have a sufficient length to initiate a springback phenomenon. Further, the reinforcing fibers are contained in an amount sufficient to initiate a springback phenomenon. Accordingly, when the movable die 10B retracts, the molten resin expands sufficiently, whereby there is obtained a sufficiently lightweight molding.

Also, the introduction of gas complements the springback-effected expansion of a molten resin. Accordingly, even when a molten resin injected into the die 10 has somewhat insufficient reinforcing fiber content to expand to a predetermined size, the introduced gas enables the molten resin to reliably expand to the volume of a molding as the movable die 103 retreats. Thus, an expected reduction in weight of a molding is reliably attained.

Since reinforcing fibers have a length not less than 2 mm, the expansion of a molten resin is reliably complemented by the injection of gas. Further, since reinforcing fibers have a length not greater than 100 mm, bridging, defective plasticization, or a like problem does not occur during injection molding. Thus, a molding operation can be smoothly performed.

Also, since the content of reinforcing fibers is not less than 5% by weight, the injection of gas does not involve the generation of a large hollow within a molten resin, whereby an obtained molding achieves both a reduction in weight and a fiber-effected improvement in strength. Further, since the content of reinforcing fibers is not greater than 70% by weight, gas is reliably introduced into a molten resin without any gas leakage between the surface of the molten resin and the molding surface of the die 10, thereby preventing the generation of an appearance defect such as a silver mark.

Further, at the latest, gas is introduced into a molten resin contained in the die 10 before the molten resin is cooled and cured. Thus, the molten resin is pressed against the molding surface of the die 10 from inside by the pressure of the introduced gas and is cooled and cured while maintaining close contact between its surface and the molding surface of the die 10. Accordingly, even when the molten resin undergoes thermal shrinkage, numerous pores formed within the molten resin merely increase in size without the generation of appearance defects, such as sink mark, on the surface of a molding. Thus, there is obtained a molding having a smooth surface and excellent appearance.

Further, the gas (preferably a cooling gas) introduced into the molten resin is maintained at a constant pressure and partially released to the exterior of the die 10. Through the partial release of gas, the interior of the molten resin is cooled; thus, cooling time for the molten resin is reduced with a resultant reduction in the molding cycle time. As a result, the mass productivity of moldings can be improved accordingly.

Also, gas is introduced into a molten resin contained in the cavity 10C after the cavity 10C is expanded to a volume corresponding to a molding through the retraction of the movable die 10B. In other words, gas is injected into an expanded molten resin. Thus, the gas to be introduced can be of a relatively low pressure. Even the low-pressure gas can be introduced throughout the interior of the molten resin without any occurrence of biased stagnation in the molten resin.

Accordingly, the pressure of gas to be introduced into a molten resin can be reduced. Moreover, since the gas is distributed throughout the interior of the molten resin, the thus-distributed gas becomes lower in pressure. Thus, there occurs no gas leakage between the surface of the molten resin and the molding surface of the die 10, thereby preventing the generation of an appearance defect such as a silver mark.

Further, while the movable die 10B is located at the position S where the cavity 10C of the die 10 assumes a volume smaller than that corresponding to a molding, a molten resin is injected into the die 10, whereby the molten resin is closely pressed against the molding surface of the die 10 by an injection pressure. Subsequent to the completion of injection of the molten resin and during the retreat of the movable die 10B to the position T, the surface of the molten resin is cooled so as to form a skin layer on the surface of the molten resin (molding). Accordingly, the skin layer is formed along the molding surface of the die 10, thereby imparting excellent appearance to a molding.

As described above, an obtained molding achieves both an improvement in mechanical characteristics such as rigidity and strength and a reduction in weight. Accordingly, the application of the molding to transportation machinery parts such as automobile parts improves the mechanical efficiency or the like of transportation machinery. Also, the application of the molding to building and civil engineering members such as cable troughs facilitates installation work due to the lightness of the molding.

Figure 3A:
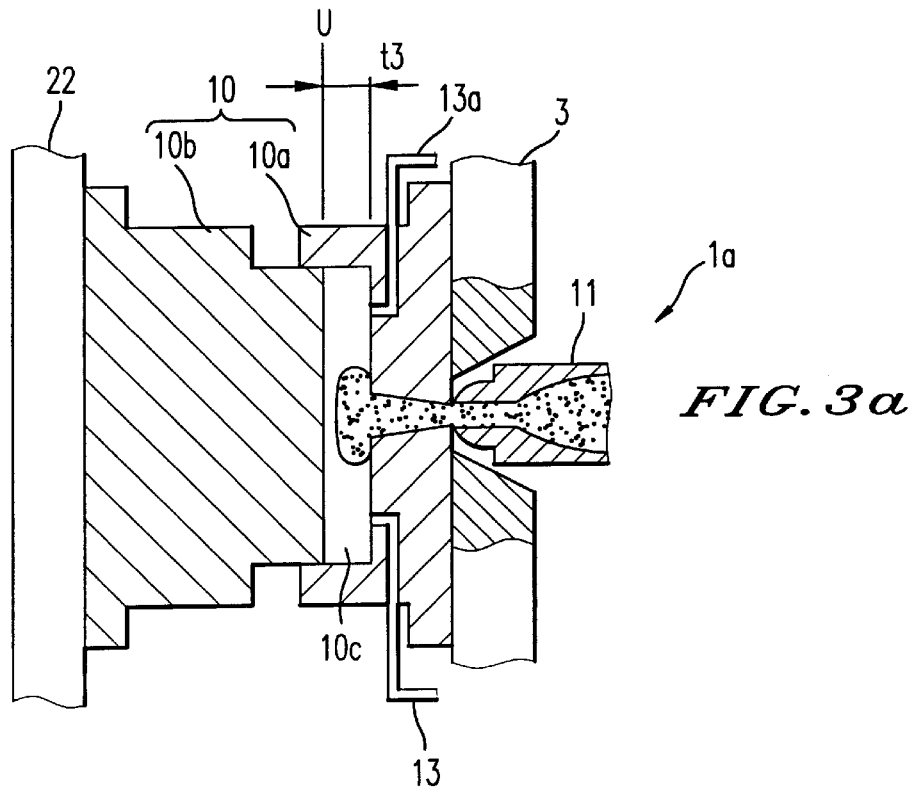
FIG. 3A is a view showing a step of molding procedure according to a second embodiment of the present invention.
Figure 3B:
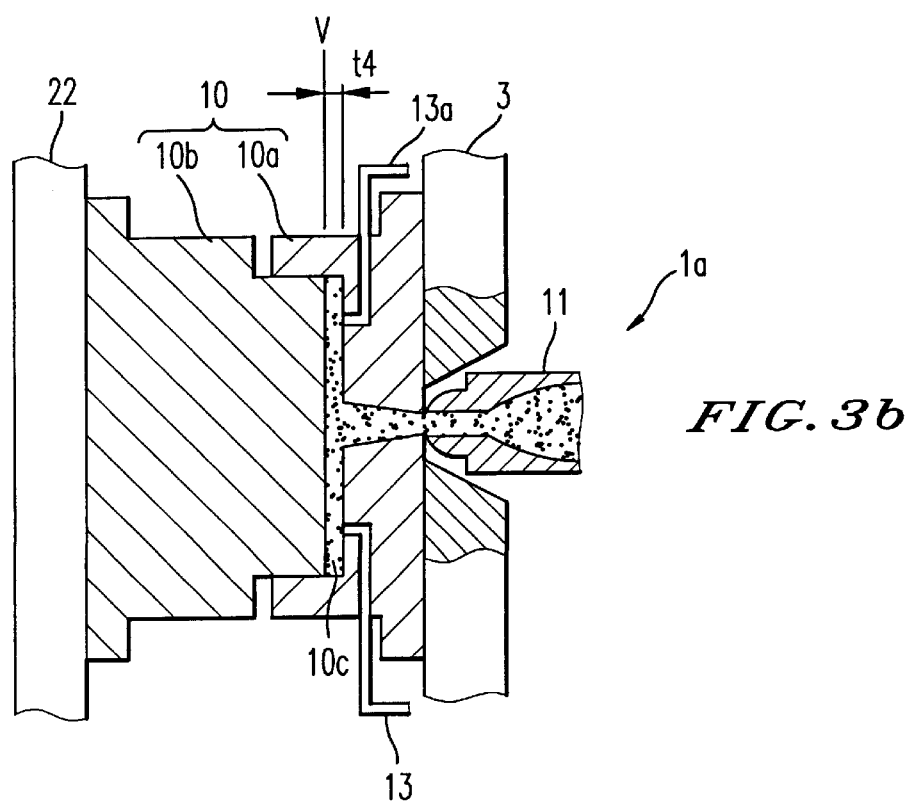
FIG. 3B is a view showing a step of molding procedure according to the second embodiment.
Figure 3C:
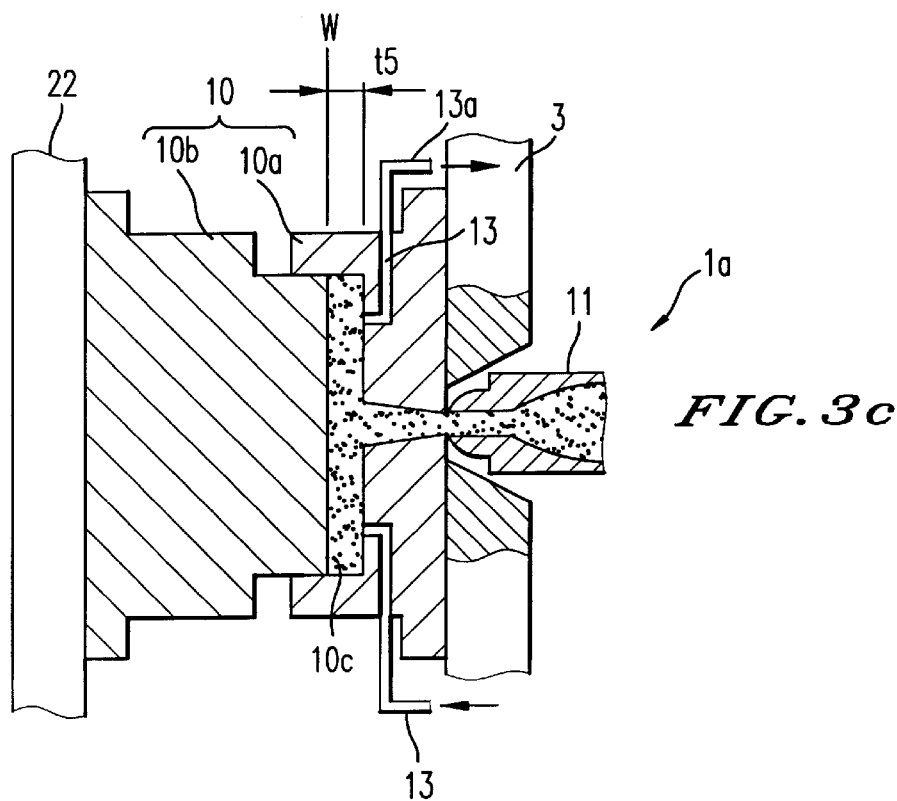
FIG. 3C is a view showing a step of molding procedure according to the second embodiment.

FIG. 3 shows a molding procedure according to a second embodiment of the present invention. In the first embodiment described above in which a molten resin is injected into a die cavity having a volume smaller than that corresponding to a molding so as to fill the die cavity with the molten resin and to bring the molten resin into close contact with the molding surface of a die by means of an injection pressure. In contrast, in the second embodiment, the movable die 10B is advanced so as to apply a compressive force to the molten resin contained in the die cavity, thereby bringing the molten resin into close contact with the molding surface of the die.

The molding procedure of the second embodiment will now be described in detail. Since the molding procedure of the second embodiment employs the injection molding machine 1 employed in the first embodiment, the description of the injection molding machine 1 is omitted.

First, the die 10 is attached to the injection molding machine 1, and resin pellets are charged into the injection cylinder 11 of the injection apparatus 1A. Then, the injection molding machine 1 is started, thus starting to plasticize and knead resin pellets contained in the injection cylinder 11.

As in the first embodiment described above, the resin pellets employed herein are primarily formed from polypropylene and have a length of 2 to 100 mm. The resin pellets contain, in an amount of 20% to 80% by weight, reinforcing fibers which have a length equal to that of the resin pellets and are arranged in parallel. In the case of a mixture of the resin pellets and other pellets not containing reinforcing fibers, the mixture contains reinforcing fibers in an amount of 5% to 70% by weight, preferably 5% to 60% by weight.

In the injection cylinder 11, resin pellets are sufficiently plasticized and kneaded such that countless glass fibers are uniformly distributed in a molten resin and intertwined, thus facilitating the occurrence of a springback phenomenon.

The die-clamping apparatus 5 is activated so as to move the movable die plate 4 toward the stationary die plate 3, causing the clamping-force-bearing block 3B on the side of the movable die plate 4 to abut against the clamping-force-bearing block 3A on the side of the stationary die plate 3.

Next, the die-moving apparatus 20 is activated so as to move the movable die 10B to position U where the cavity 10C of the die 10 assumes a volume larger than that of all the molten resin to be injected into the cavity 10C, as shown in FIG. 3(A). The thickness of the cavity 10C becomes t3.

In the above-mentioned state, a molten resin is injected into the die 10 from the injection apparatus 1A. When all the molten resin is injected into the cavity 10C, the injection of the molten resin is completed.

Immediately before or after the completion of injection of the molten resin or after the elapse of a predetermined time following the completion of injection of the molten resin, the die-moving apparatus 20 is activated so as to advance the movable die 10B to position V where the cavity 10C of the die 10 assumes a volume smaller than that corresponding to a molding, as shown in FIG. 3(B). The thickness of the cavity 10C becomes t4.

As a result of the advancement of the movable die 10B, the molten resin contained in the cavity 10C is compressed and thus closely pressed against the molding surface of the die 10 by a compressive force applied to the molten resin. Accordingly, a skin layer is formed on the surface of the molten resin.

As soon as the movable die 10 reaches the position V, the movable die 10B is retreated to position W where the cavity 10C of the die 10 assumes a volume corresponding to a molding. The thickness of the cavity 10C becomes t5.

During the retreat of the movable die 10B to the position W, the surface of the molten resin is cooled, thereby securing the skin layer formed on the surface of the molten resin.

The retraction rate Vr of the movable die 10B is 0.05 mm/sec to 100 mm/sec, preferably 0.05 mm/sec to 50 mm/sec.

When the movable die 10B is retreated, a springback phenomenon is accelerated and causes the molten resin to expand. Specifically, glass fibers contained in the molten resin are released from compression and thus apply an elastic restoring force to the molten resin; consequently, the molten resin expands, thereby forming countless pores within the molten resin. Thus, there is obtained a lightweight molding having a volume greater than that of the molding material employed.

As soon as the movable die 10B reaches the position W, gas is introduced into the molten resin through the pin-and-sleeve arrangement 13. Through the introduction of gas at this point of time, gas is introduced into the molten resin before the molten resin contained in the die 10 is completely cooled and cured.

The gas introduced into the molten resin is distributed into countless pores formed in the molten resin; thus, a large hollow is not formed in the molten resin.

Also, the molten resin is pressed against the molding surface of the die 10 from inside by the pressure of the introduced gas and is cooled and cured while maintaining close contact between its surface and the molding surface of the die 10. Accordingly, even when the molten resin undergoes thermal shrinkage subsequent to cooling and curing, numerous pores formed within the molten resin merely increase in size without the formation of an appearance defect, such as a sink mark, on the surface of a molding.

The gas introduced into the molten resin is set at a pressure of 0.1 kg/cm$^2$ to 20 kg/cm$^2$ and higher than a set pressure of the aforementioned pressure-regulating valve.

Accordingly, the gas introduced into the molten resin is maintained at a predetermined pressure by the pressure-regulating valve and partially released to the exterior of the die 10. Through the partial release of gas, the interior of the molten resin is cooled; thus, cooling time for the molten resin is reduced.

After the elapse of a predetermined time required for sufficiently cooling a molding, the die-clamping apparatus 5 is activated so as to retreat the movable die plate 4 and open the die 10. Then, the molding is removed from the interior of the die 10, thereby completing the molding operation. Subsequently, the above molding operation is repeated as needed.

The present embodiment also provides actions and effects similar to those of the first embodiment described previously. Further, since a molten resin is compressed and fills a die cavity through the movement of the movable die 10B, there can be obtained even a thin molding which would otherwise not be obtained due to a failure to fill a molten resin throughout a die cavity merely by an injection pressure. Also, even when, for reason of reduction in weight, glass fibers cannot be contained in an amount sufficient to attain a required expansion, the required expansion can be attained with the assistance of the injected gas.

Figure 4A:
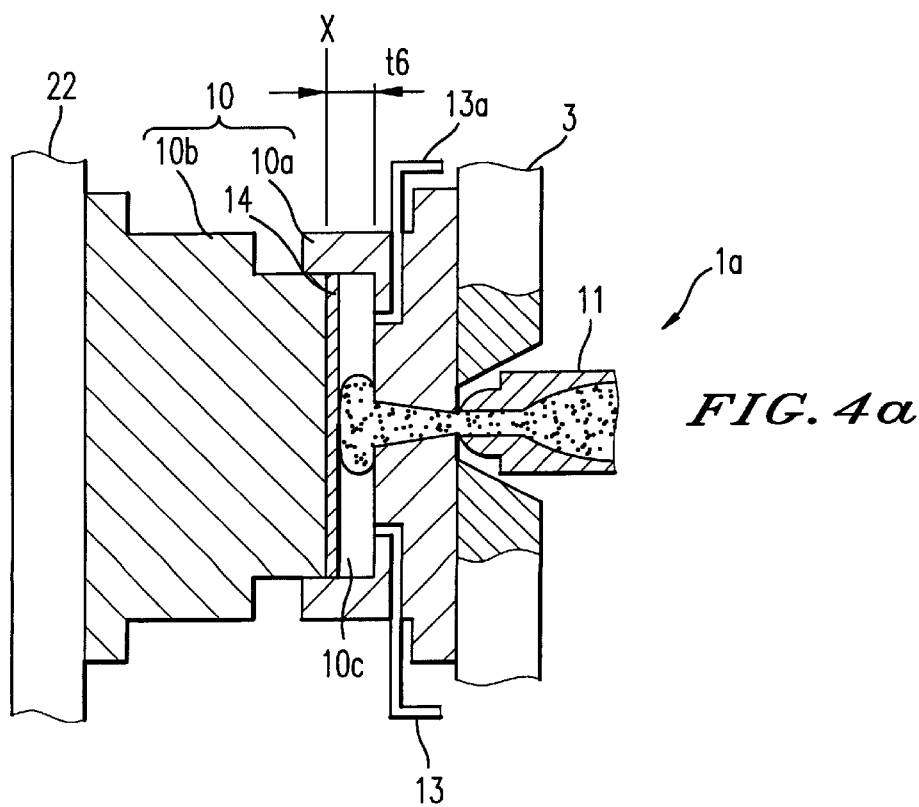
FIG. 4A is a view showing a step of molding procedure according to a third embodiment of the present invention.
Figure 4B:
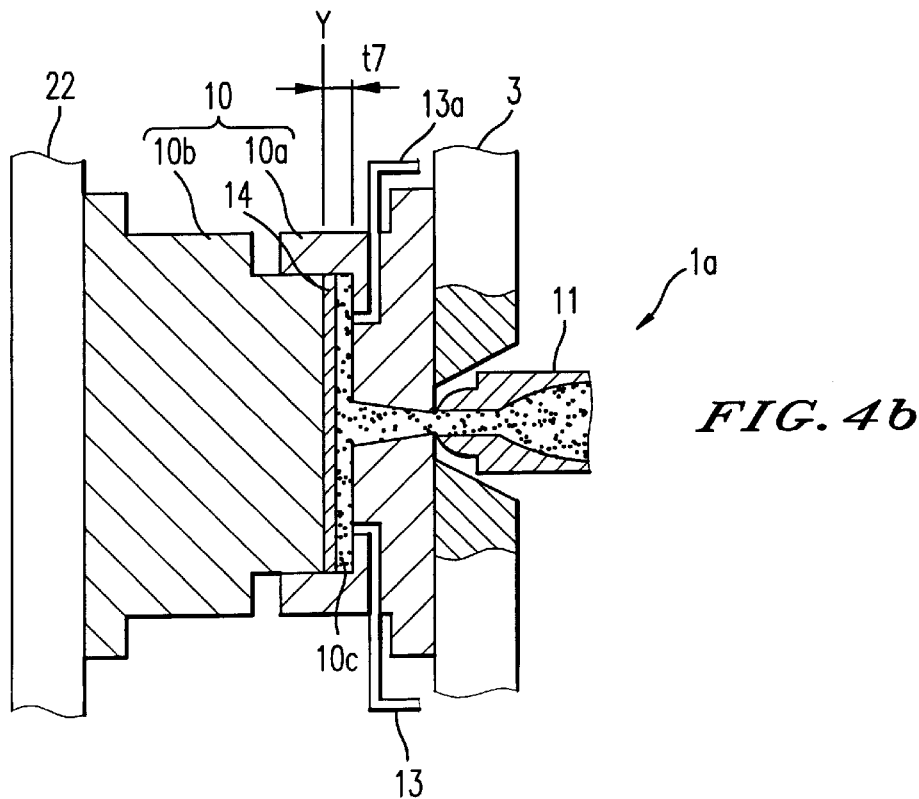
FIG. 4B is a view showing a step of molding procedure according to the third embodiment.
Figure 4C:
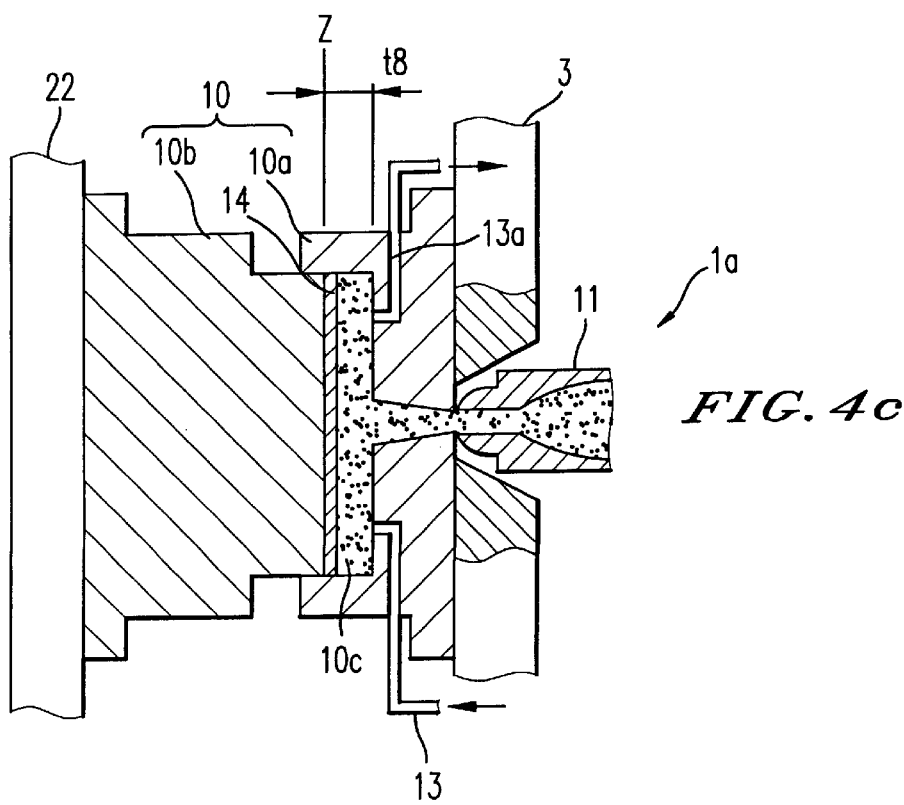
FIG. 4C is a view showing a step of molding procedure according to the third embodiment.

FIG. 4 shows a molding procedure according to a third embodiment of the present invention. In contrast to the first and second embodiments described above in which a resin used as a molding material is exposed in an obtained molding, the present embodiment relates to a molding procedure for obtaining a unitary laminated molding which includes a facing material used for covering the surface of the molding.

The molding procedure of the third embodiment will now be described in detail. Since the molding procedure of the third embodiment employs the injection molding machine 1 employed in the first and second embodiments, the description of the injection molding machine 1 is omitted.

First, the die 10 is attached to the injection molding machine 1, and a facing material 14 is attached onto the movable die 10B of the die 10 as shown in FIG. 4(A). Resin pellets are charged into the injection cylinder 11 of the injection apparatus 1A. Then, the injection molding machine 1 is started, thus starting to plasticize and knead resin pellets contained in the injection cylinder 11. Through kneading, countless glass fibers are uniformly distributed in a molten resin and intertwined, thus facilitating the occurrence of a springback phenomenon.

In relation to the attachment of the facing material 14 onto the movable die 10B, the movable die 10B may be provided with attachment means, such as pins or vacuum chuck holes, for securing the facing material 14 on the movable die 10B. Such attachment means enables the automatic attachment of the facing material 14 onto the movable die 10B.

The facing material 14 may be attached onto the stationary die 10A instead of the movable die 10B.

Resin pellets employed in the present embodiment are similar to those of the first and second embodiments.

Examples of the facing material 14 include single-layer materials, such as woven fabrics, nonwoven fabrics, thermoplastic resin facing materials, expanded thermoplastic resin facing materials, and films printed with patterns or the like; and multilayered facing materials, such as a thermoplastic elastomer, vinyl chloride resin, or a like facing material which is lined with a thermoplastic resin, an expanded thermoplastic resin, or the like.

The die-clamping apparatus 5, is activated so as to move the movable die plate 4 toward the stationary die plate 3, causing the clamping-force-bearing block 3B on the side of the movable die plate 4 to abut against the clamping-force-bearing block 3A on the side of the stationary die plate 3.

Next, the die-moving apparatus 20 is activated so as to move the movable die 10B to position X where the cavity 10C of the die 10 assumes a volume larger than that of all the molten resin to be injected into the cavity 10C. The thickness of the cavity 10C becomes t6 (see FIG. 4(A)).

In the above-mentioned state, a molten resin is injected into the die 10 from the injection apparatus 1A. When all the molten resin is injected into the cavity 10C, the injection of the molten resin is completed.

Immediately before or after the completion of injection of the molten resin or after the elapse of a predetermined time following the-completion of injection of the molten resin, the die-moving apparatus 20 is activated so as to advance the movable die 10B to position Y where the cavity 10C of the die 10 assumes a volume smaller than that corresponding to a molding, as shown in FIG. 4(B). The thickness of the cavity 10C becomes t7.

As a result of the advancement of the movable die 10B, the molten resin contained in the cavity 10C is compressed, fills the cavity 10C, and thus is closely pressed against the facing material 14 by a compressive force applied to the molten resin. Accordingly, the molten resin is bonded to the facing material 14.

As soon as the movable die 108 reaches the position Y, the movable die 10B is retreated to position Z where the cavity 10C of the die 10 assumes a volume corresponding to a molding. The thickness of the cavity 10C becomes t8.

The retreat rate Vr of the movable die 10B is 0.05 mm/sec to 100 mm/sec, preferably 0.05 mm/sec to 50 mm/sec.

When the movable die 10B is retreated, a springback phenomenon causes the molten resin to expand. Specifically, glass fibers contained in the molten resin are released from compression and thus apply an elastic restoring force to the molten resin; consequently, the molten resin expands, thereby forming countless pores within the molten resin. Thus, there is obtained a lightweight molding having a volume greater than that of the molding material employed.

As soon as the movable die 10B reaches the position Z, gas is introduced into the molten resin through the pin-and-sleeve arrangement 13. Through the introduction of gas at this point of time, gas is introduced into the molten resin before the molten resin contained in the die 10 is completely cooled and cured.

The gas introduced into the molten resin is distributed into countless pores formed in the molten resin; thus, a large-hollow is not formed in the molten resin.

Also, the molten resin is pressed against the molding surface of the die 10 from inside by the pressure of the introduced gas and is cooled and cured while the facing material 14 is in close contact with the molding surface of the die 10. Accordingly, even when the molten resin undergoes thermal shrinkage due to cooling and curing, numerous pores formed within the molten resin merely increase in size without the formation of appearance defects, such as sink mark, on the surface of a molding.

The gas introduced into the molten resin is set at a pressure of 0.1 kg/cm$^2$ to 20 kg/cm$^2$ and higher than a set pressure of the aforementioned pressure-regulating valve. Accordingly, the gas introduced into the molten resin is partially released to the exterior of the die 10, and the interior of the molten resin is cooled accordingly. Thus, cooling time for the molten resin is reduced.

After the elapse of a predetermined time required for sufficiently cooling a molding, the die-clamping apparatus 5 is activated so as to retreat the movable die plate 4 and open the die 10. Then, the molding is removed from the interior of the die 10, thereby completing the molding operation. Subsequently, the above molding operation is repeated as needed.

The present embodiment also provides actions and effects similar to those of the first and second embodiments described previously. Further, through a single molding cycle, there can be obtained a unitary laminated molding which includes a facing material used for covering the surface of the molding.

Next, the effect of a pin-and-sleeve arrangement, favorably usable in the present invention, will be described with reference to a fourth embodiment of the invention.

Figure 5:
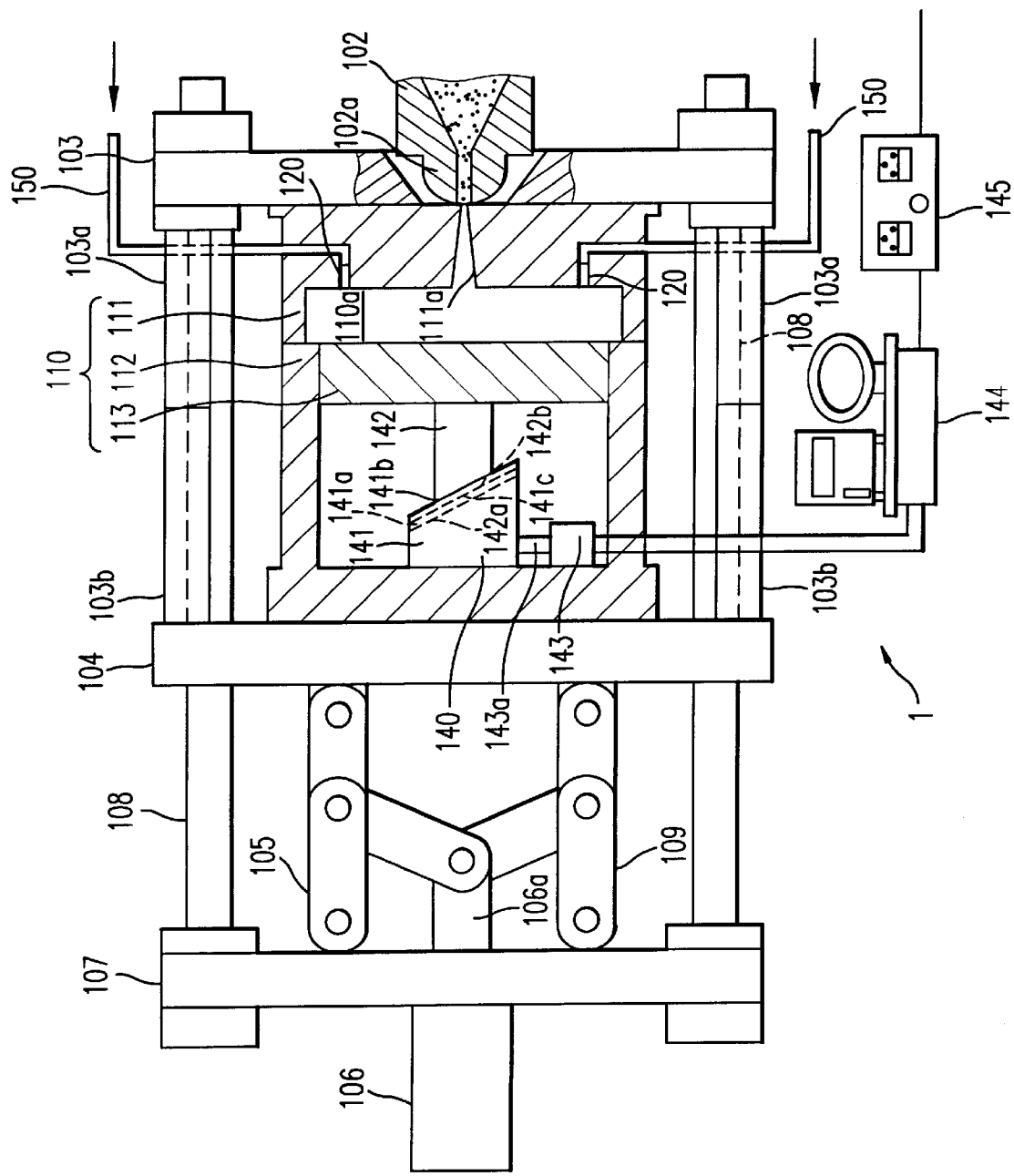
FIG. 5 is a side view showing the entirety of an injection molding machine according to a fourth embodiment of the present invention.

FIG. 5 shows an injection molding machine 101 according to the fourth embodiment of the present invention. The injection molding machine 101 is adapted to inject a molten resin into a die 110 from a nozzle 102A of an injection apparatus 102, thereby yielding a molding.

In the injection apparatus 102, resin pellets charged into an unillustrated injection cylinder are kneaded and plasticized through use of a screw (not shown). A molten resin obtained through the plasticization of the resin pellets is discharged through a nozzle 102A provided at the tip of the injection cylinder.

The injection molding machine 101 of the present embodiment includes a stationary die plate 103 fixedly provided on the side of the injection apparatus 102, a stationary plate 107 fixedly provided on the side opposite the injection apparatus 102, a movable die plate 104 provided between the stationary die plate 103 and the stationary plate 107 and adapted to move toward or away from the stationary die plate 103, and a die-clamping apparatus 105 for moving the movable die plate 104 in relation to the stationary plate 103.

Tie bars 108 extend between the opposingly disposed stationary die plate 103 and stationary plate 107. The movable die plate 104 is slidably movable along the tie bars 108.

The die-clamping apparatus 105 includes a toggle mechanism 109, provided between the movable die plate 104 and the stationary plate 107, and an oil hydraulic cylinder unit 106 attached to the stationary plate 107 and used for clamping the die 110. A piston rod 106A of the oil hydraulic cylinder unit 106 is connected to the toggle mechanism 109. A pressing force generated by the oil hydraulic cylinder unit 106 is amplified by the toggle mechanism 109. The thus-amplified force is used for closing or clamping the die 110.

Clamping-force-bearing blocks 103A and 103B are provided between the stationary die plate 103 and the movable die plate 104 along a die-clamping or die-opening direction. When the movable die plate 4 is advanced in relation to the stationary die plate 103, the clamping-force-bearing block 103B provided on the side of the movable die plate 104 abuts the clamping-force-bearing block 103A provided on the side of the stationary die plate 103 to thereby bear a large clamping force produced by the toggle mechanism 109. The clamping-force-bearing blocks 103A and 103B are adapted to maintain parallelism between the stationary die plate 103 and the movable die plate 104.

The die 110 includes a stationary die 111 mounted on the stationary die plate 103, a movable die 112 mounted on the movable die plate 104, and a movable die 113 provided as part of the movable die 112.

The movable die 113 is inserted into a hollow space 112A provided in the central portion of the movable die 112 and opening to the stationary die 111 and can advance or retreat in relation to the cavity 110A of the die 110. A die-moving apparatus 140 provided within the hollow space 112A causes the movable die 113 to advance or retreat in a slidable manner in relation to the cavity 110A.

The die-moving apparatus 140 includes a pair of inclination members 141 and 142 having inclined surfaces 141A and 142A, respectively, which are inclined with respect to the moving direction of the movable die 113. The inclination members 141 and 142 are arranged along the moving direction of the movable die 113 with the inclined surfaces 141A and 142A abutting each other.

An oil hydraulic cylinder unit 143 is connected to the inclination member 141 so as to drive the inclination member 141 in a direction perpendicular to the moving direction of the movable die 113. A drive unit for moving the inclination member 141 may be of a pneumatic type or a motor-driven type.

Guide portions 141B projecting toward the inclination member 142 are provided on the inclined surface 141A of the inclination member 141 along its both side edges. The end portion of the inclination members 142 on the side of the inclined surface 142A is fitted between the two guide portions 141B.

Specifically, a groove 141C is formed in the inner surface of each of the guide portions 141B. Elongated projections 142B are provided on the end portion of the inclination member 142 on the side of the inclined surface 142A so as to engage the grooves 141C.

In the die-moving apparatus 140 having the above structure, as a piston rod 143A of the oil hydraulic cylinder unit 143 is advanced, the inclination member 141 presses the inclination member 142, thereby causing the movable die 113 to advance in relation to the cavity 110A. In contrast, as the piston rod 143A is retreated, the inclination member 141 draws the inclination member 142, thereby causing the movable die 113 to retract in relation to the cavity 110A.

An oil hydraulic unit 144 serving as an oil hydraulic pressure source is connected to the oil hydraulic cylinder unit 143. To the oil hydraulic unit 144 is connected a control unit 145 for controlling a generated oil hydraulic pressure so as to cause the die-moving apparatus 140 to perform a desired operation. The control unit 145 has a sequence control circuit, such as a digital sequencer, and can be programmed so as to cause the movable die 113 to continuously perform any of several different operations; for example, the movable die 113 advances or retracts stepwise in relation to the stationary die 10A, or halts at a predetermined position and then resumes moving.

A sprue 111A is formed at the central portion of the stationary die 111. A nozzle 102A of the injection apparatus 102 extends through the stationary die plate 103 and is connected to the sprue 111A. A molten resin is injected into the cavity from the nozzle 102A through the sprue 111A.

Two pin-and-sleeve arrangements 120 are embedded in the stationary die 111 for the purpose of introducing gas into a molten resin filling the cavity 110A. The pin-and-sleeve arrangements constitute portions of gas introduction passages 150 for introducing gas into the cavity 110A and are located at a portion of the molding surface of the die 110 opposite that corresponding to the front surface (facing surface) of a molding.

Figure 6:
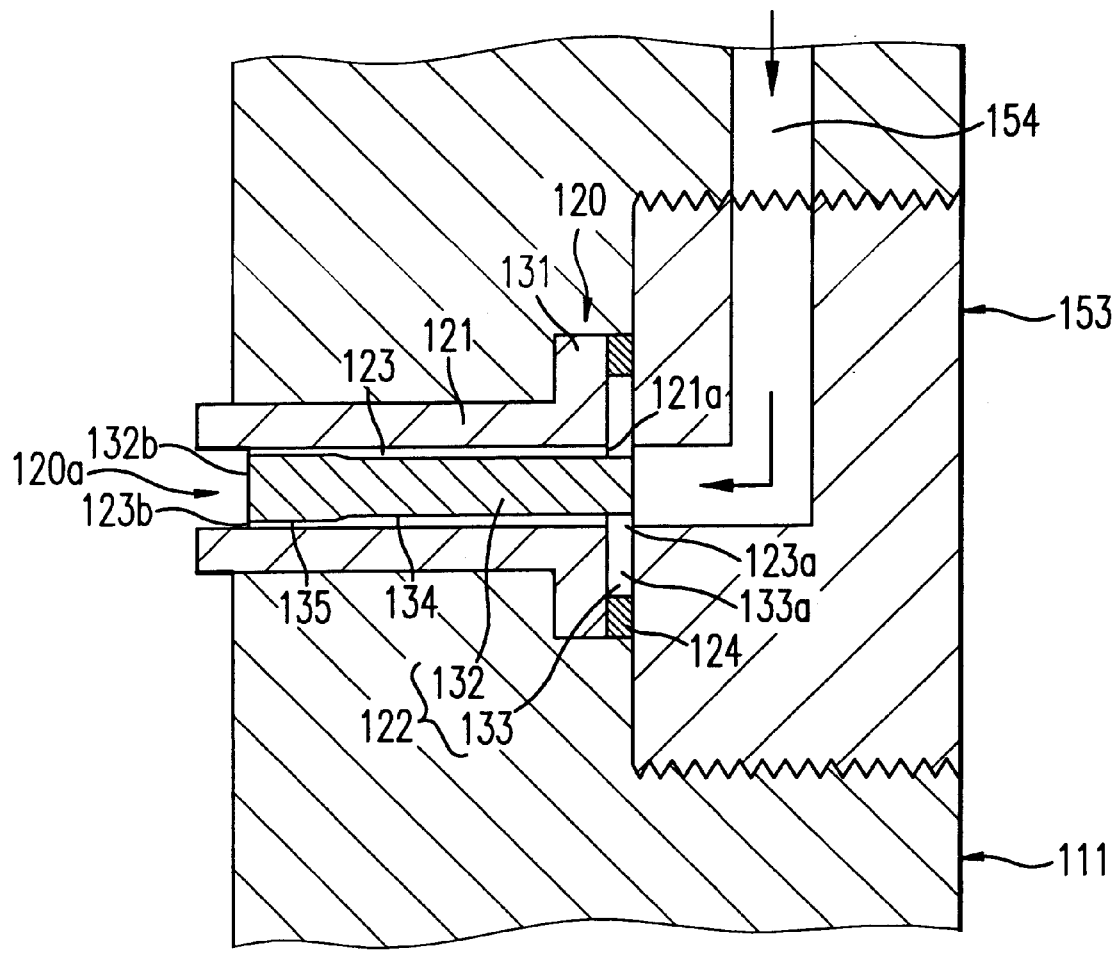
FIG. 6 is a sectional view showing an engagement mechanism of a pin-and-sleeve arrangement according to the fourth embodiment.

As shown in FIG. 6, the pin-and-sleeve arrangement 120 is embedded in the stationary die 111 such that its end slightly projects from the molding surface of the stationary die 111. Specifically, when the overall length of the pin-and-sleeve arrangement 120 is 30 mm to 50 mm, the pin-and-sleeve arrangement 120 projects from the molding surface in an amount of about 2 mm.

To the pin-and-sleeve arrangement 120 is connected a gas tap 153 screwed into the stationary die 111. To the gas tap 153 is connected a gas introduction passage 154 extending to a gas feed unit (not shown) installed outside the stationary die 111. Gas fed from the gas feed unit flows through the gas introduction passage 154 and the gas tap 153 and is then introduced into the cavity 10A through the pin-and-sleeve arrangement.

The pin-and-sleeve arrangement 120 includes a cylindrical sleeve element 121, a pin element 122 inserted into the sleeve element 121, and a gas flow passage 123 defined by the sleeve element 121 and the pin element 122 and extending in the axial direction of the pin-and-sleeve arrangement 120 for allowing gas to flow therethrough.

The sleeve element 121 has a flange 131 at its end portion on the side of the gas inlet 123A (on the side of the gas tap 153). The flange 131 is adapted to prevent the sleeve element 121 from coming off the stationary die 111.

Figure 7:
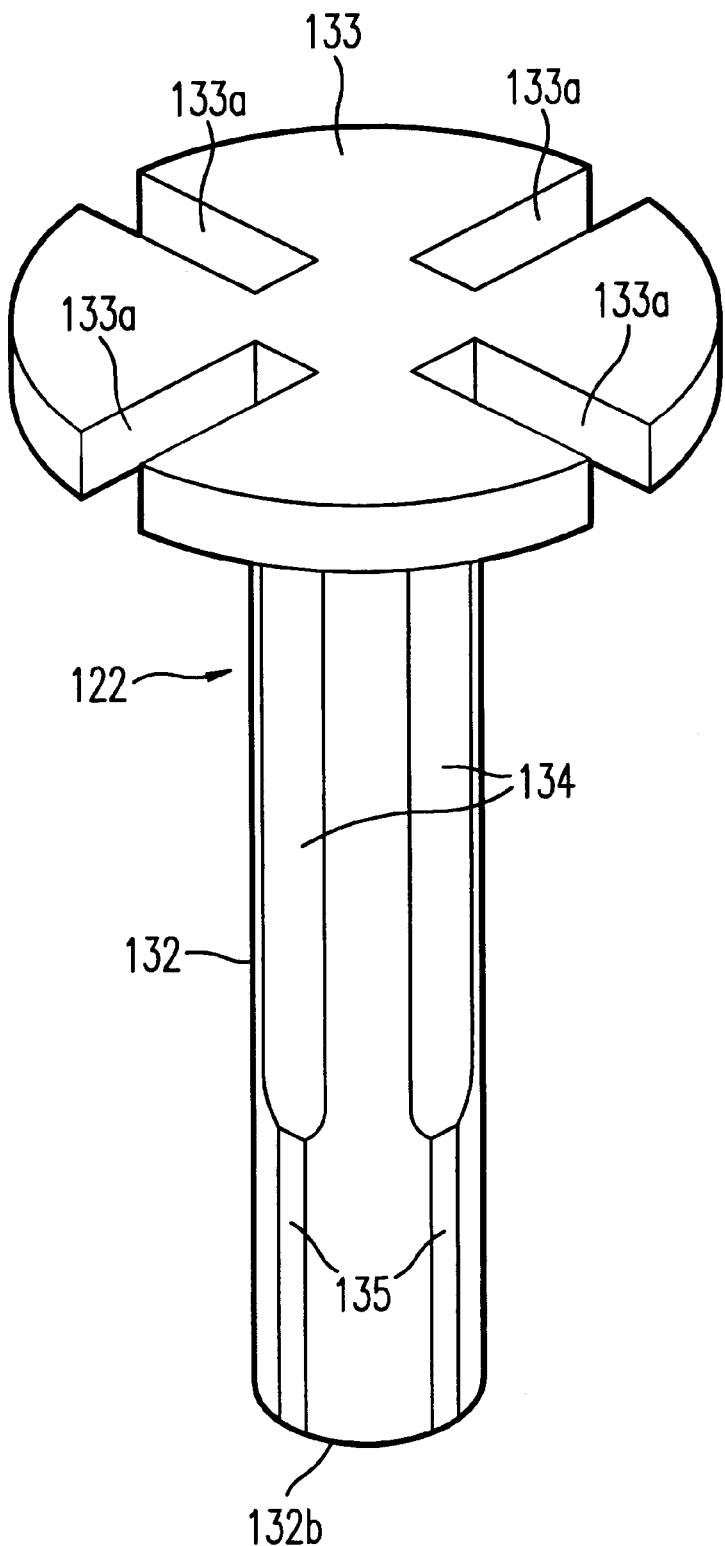
FIG. 7 is a perspective view showing a pin element of the pin-and-sleeve arrangement according to the fourth embodiment.
Figure 8:
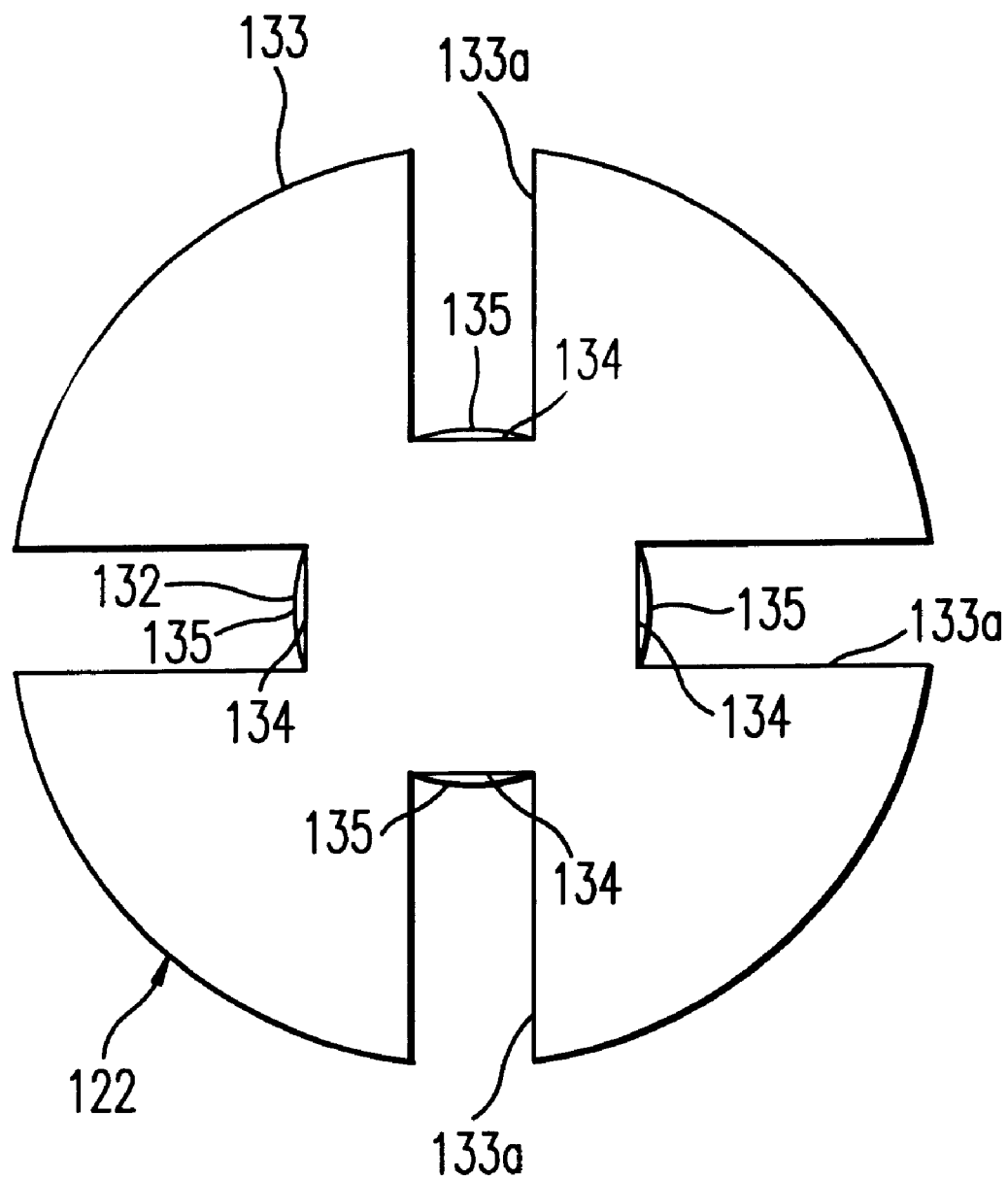
FIG. 8 is a view showing the pin element of the pin-and-sleeve arrangement according to the fourth embodiment.

As shown in FIGS. 7 and 8, the pin element 122 is formed substantially in the shape of the letter T and includes a pin body 132, having a substantially cylindrical shape and inserted into the sleeve element 121 in a substantially tight matter, and an anchorage portion 133, provided at the end portion of the pin body 132 on the side of the gas inlet 123A.

The anchorage portion 133 is formed in a disk-like shape so as to cover an opening 121A of the sleeve element 121 on the side of the gas inlet 123A and rigidly secured to the flange 131 of the sleeve element 121 through use of engagement means (not shown) such as screws. A sealing material 124 is provided around the circumference of the anchorage portion 133 for the purpose of preventing gas leakage.

Flat portions 134 and 135 are formed, by machining or like processing, on the circumferential surface of the pin body 132 in the axial direction of the pin body 132 and arranged equally spaced. The flat portions 134 and 135 and the inner surface of the sleeve element 121 define the four gas flow passages 123.

The flat portions 134 are located on the side of the gas inlet 123A, and the flat portions 135 are located on the side of the gas outlet 123B. The width of each flat portion 135 is narrower than that of each flat portion 134. In other words, a pin diameter tangent to the flat portions 135 is greater than that tangent to the flat portions 134. Accordingly, a portion of the gas flow passage 123 corresponding to the flat portions 135 is narrower than that corresponding to the flat portions 134.

Slits 133A are formed in the anchorage portion 133 and serve as the gas inlets 123A to the gas flow passage 123.

The tip of the pin body 132 on the side of the gas outlet 123B has a flat tip surface 132B substantially perpendicular to the axial direction of the pin body 132.

The end face of the sleeve element 121 on the side of the gas outlet 123B projects farther than the tip surface 132B. As a result, an end space 120A is defined at the tip of the pin-and-sleeve arrangement 120 by the tip surface 132B and the end portion of the sleeve element 121.

The end face of the sleeve element 121 projects in an amount of, for example, 0.1 mm to 3 mm from the tip surface 132B of the pin element 122.

Next, a molding procedure of the fourth embodiment will be described.

The present embodiment uses a fiber-containing resin, which contains reinforcing fibers, as a molding material and obtains a molding from the resin through expansion.

As a molding material, thermoplastic resin pellets containing reinforcing fibers may be used singly or in combination with other resin pellets. The contained reinforcing fibers impart expansion to a molten resin injected into the die 110. A foaming agent may be added to the molding material for the purpose of complementing the expansion of a molten resin.

Examples of reinforcing fibers to be contained in the above-mentioned resin pellets include ceramic fibers, such as rock wool and boron fibers; inorganic fibers, such as glass fibers and carbon fibers; metallic fibers, such as aluminum fibers and copper fibers; and organic fibers, such as ultra high molecular weight polyethylene fibers, aramid fibers, and polyarylate fibers. Particularly, glass fibers are preferred.

A thermoplastic resin serving as a main component of resin pellets is not particularly limited. Examples of such a thermoplastic resin include polyolefin resins such as polypropylene, propylene-ethylene block copolymers, propylene-ethylene random copolymers, and polyethylene; polystyrene resins; ABS resins; polyvinyl chloride resins, polyamide resins, polyester resins, polyacetal resins, polycarbonate resins, aromatic polyether or thioether resins, aromatic polyester resins, polysulfone resins, and acrylate resins.

These resins may incorporate a filler such as talc, as well as a variety of additives, to thereby provide injection-moldable high-molecular-weight materials which may be used in the method of the present invention.

The above thermoplastic resins may be used singly or in combination.

Among the thermoplastic resins, preferable are polypropylene resins, such as polypropylene, block or random copolymers of propylene and another olefin, and mixtures thereof, and particularly preferable are polypropylene resins which contain a polyolefin resin modified with an unsaturated carboxylic acid or its derivative.

The fiber-containing resin serving as a starting molding material includes reinforcing fibers having a length of 2 mm to 100 mm, and the reinforcing fibers account for 5% to 70% by weight of the molding material. Preferably, the fiber-containing resin is in the form of pellets having a length of 2 mm to 100 mm and including reinforcing fibers which have a length equal to that of the resin pellets and are arranged in parallel. An example fiber-containing resin pellet is Mostron L (trade name) manufactured by Idemitsu Petrochemical Co., Ltd.

Such a molding material undergoes an injection molding process in the following manner. First, resin pellets are charged into the injection apparatus 102. Then, the injection molding machine 101 is started, thus starting to plasticize and knead the resin pellets contained in the injection apparatus 102. Through kneading, reinforcing fibers are uniformly distributed in a molten resin and intertwined, thus facilitating the occurrence of a springback phenomenon.

Figure 9A:
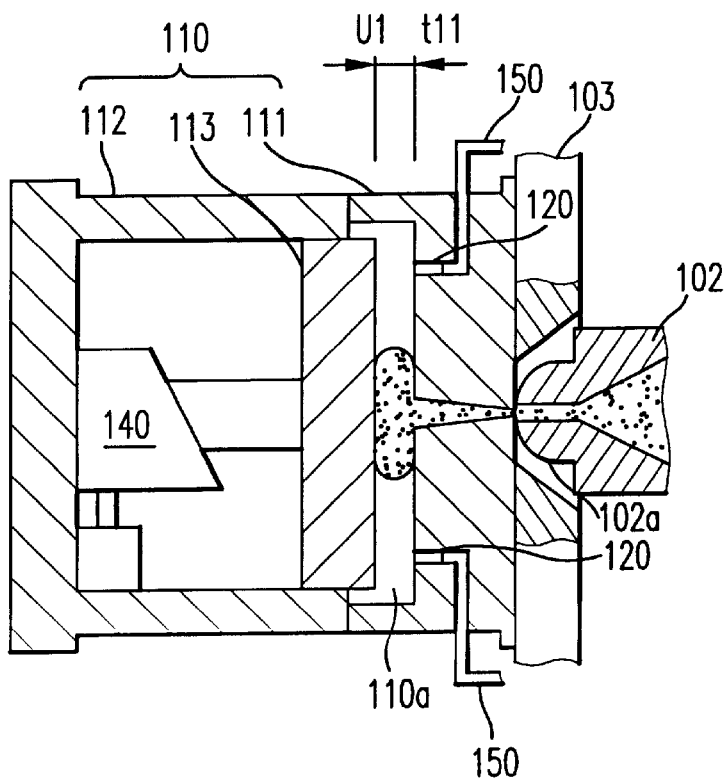
FIG. 9A is a view showing a step of molding procedure according to the fourth embodiment.

Then, the die-clamping apparatus 105 is activated so as to move the movable die plate 104 toward the stationary die plate 103, thereby closing the die 110. The die-moving apparatus 140 is activated so as to move the movable die 113 to position U1 where the thickness of the cavity 110A of the die 110 becomes t11, as shown in FIG. 9(A). The movable die 113 is brought to a standstill there.

Herein, the thickness t11 of the cavity 110A is set at the sum of a thickness corresponding to the volume of a molten resin to be injected and a thickness corresponding to a stroke of compression of a molten resin contained in the die 110. In order to reduce breakage of reinforcing fibers during injection of a molten resin through use of a relatively low injection pressure, the compression stroke is preferably 0.1 mm to 50 mm, more preferably 1 mm to 10 mm. Through the employment of a compression stroke of 1 mm to 10 mm, the breakage of reinforcing fibers can be further reduced, and the occurrence of an appearance defect, such as a flow mark, can be prevented.

In the above-mentioned state, a molten resin is injected into the cavity 110A from the nozzle 102A of the injection apparatus 102A.

Figure 9B:
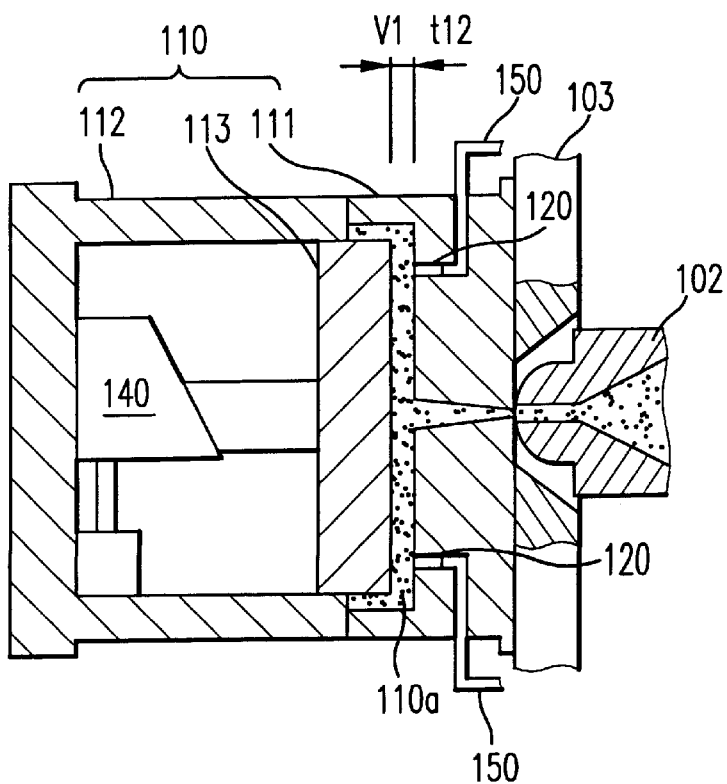
FIG. 9B is a view showing a step of molding procedure according to the fourth embodiment.

At an appropriate point of time after the start of injection of a molten resin, for example, immediately after or as soon as the injection is completed, the die-moving apparatus 140 is activated so as to advance the movable die 113 to position VI where the thickness of the cavity 110A becomes t12 as shown in FIG. 9(B). The movable die 113 is brought to a standstill there. The thickness t12 of the cavity 110A is set such that the cavity 110A substantially assumes the volume of a molten resin to be injected.

As a result of the advancement of the movable die 113, the molten resin contained in the cavity 110A is compressed to thereby fill the cavity 110A and be closely pressed against the molding surface of the die 110 by a compressive force applied to the molten resin. Accordingly, the surface layer of the molten resin in close contact with the molding surface of the die 110 is cooled and solidified more quickly than is the interior of the molten resin.

Figure 9C:
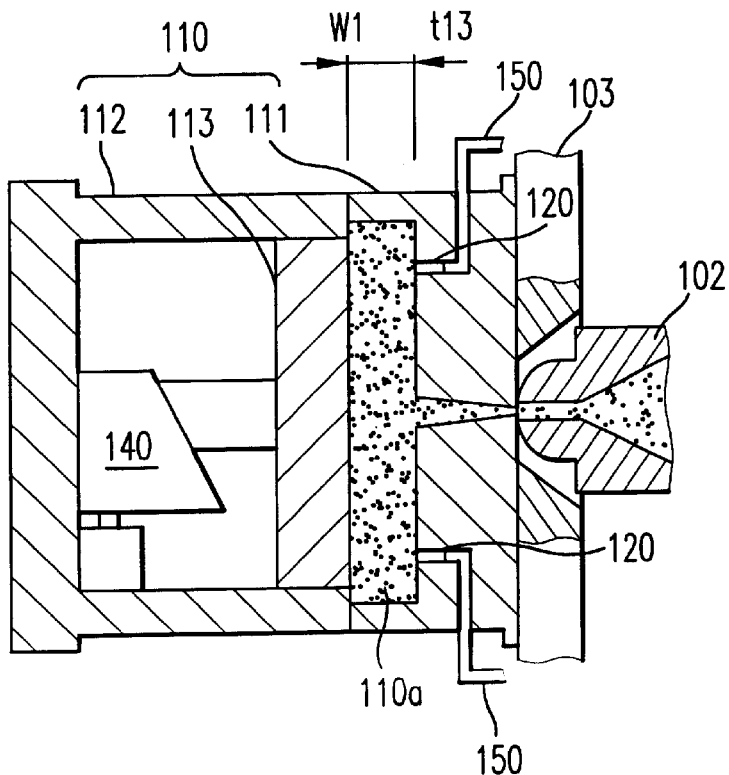
FIG. 9C is a view showing a step of molding procedure according to the fourth embodiment.

When the surface layer of the molten resin is solidified at a predetermined thickness, the die-moving apparatus 140 is activated so as to retreat the movable die 113 to position W where the thickness of the cavity 110A becomes t13 as shown in FIG. 9(C). The movable die 113 is brought to a standstill there.

Herein, the thickness t13 of the cavity 110A is set such that the cavity 110A assumes the volume of a molding.

The retraction rate of the movable die 113 may appropriately be set in accordance with molding conditions, the type of a resin employed, etc., for example, at 0.05 mm/sec to 100 mm/sec, preferably 0.05 mm/sec to 50 mm/sec for the purpose of reliably transferring the profile of the molding surface of the die 110 to the molten resin.

When the movable die 113 is retracted as described above to thereby expand the cavity 110A, a springback phenomenon causes the molten resin to expand. Specifically, reinforcing fibers contained in the molten resin are released from compression and thus apply an elastic restoring force to the molten resin; consequently, the molten resin expands.

After the movable die 113 reaches the position W1, the gas feed unit (not shown) is activated. Gas is introduced into the molten resin contained in the cavity 110A through the pin-and-sleeve arrangement 120.

The pressure of gas introduced is, for example, 0.01 MPa to 20 MPa. Particularly, through the employment of a relatively low gas pressure of 0.01 MPa to 1 Mpa, there can be further reliably prevented the occurrence of a large hollow within a molding and the occurrence of an appearance defect which would otherwise result due to gas leakage to the exterior of the molten resin, and there is no need for employing high-pressure gas facilities with a resultant reduction in equipment cost.

The gas fed from the gas feed unit flows through the gas introduction passage 154 and the gas tap 153 and is then introduced into the gas flow passage 123 through the slits 133A, or the gas inlets 123A, formed in the pin element 122 of the pin-and-sleeve arrangement 120. The introduced gas flows out from the gas outlet 123B into the end space 120A and collects therein. As a result, the gas pressure within the end space 120A increases. When the gas pressure increases to a level capable of breaking through the solidified surface layer of the molten resin, the gas breaks through the layer and forms a gas inlet bore in the layer. The gas inlet bore has a cross-sectional area substantially identical to that of the open end of the sleeve element 121 on the side of the gas outlet 123B, i.e. a cross-sectional area larger than that of the gas flow passage 123. The gas is introduced into the molten resin through the gas inlet bore.

As a result of the introduction of gas into the molten resin as described above, the molten resin is pressed from inside against the molding surface of the die 110. Thus, the profile of the molding surface of the die 110 is intensively transferred to the surface of the molten resin, so that a skin layer is formed on the surface of the molten resin.

After a predetermined amount of gas is introduced into the molten resin, the molten resin is allowed to cool and solidify for a predetermined period of time. Then, the die-clamping apparatus 105 is activated so as to retreat the movable die plate 104 and open the die 110. Then, a molding is removed from the interior of the die 110. The obtained molding has a volume greater than that of the molding material employed.

Subsequently, the above molding operation is repeated as needed.

In the above-described injection compression molding process, a step of advancing the movable die 113 so as to compress a molten resin may be omitted. That is, molding is performed in a manner similar to that of the injection compression molding process except that while the movable die 113 is at the position VI (see FIG. 9(B)), the molten resin is injected into the cavity 110A and fills the cavity 110A.

The present embodiment as described above produces the following effects.

Since the end of the sleeve element 121 of the pin-and-sleeve arrangement projects farther than the tip of the pin element 122, even when the pressure of gas to be introduced into the gas flow passage 123 is relatively low, the gas pressure within the tip space 120A can be increased sufficiently to break through the surface layer of a molten resin. Accordingly, the gas can be reliably introduced into the molten resin. Further, since a gas inlet bore having a cross-sectional area larger than that of the gas flow passage 123 is formed in the surface layer, a sufficient amount of gas can be introduced into the molten resin. Accordingly, since the molten resin can be cooled while being pressed against the molding surface of the die 110 by the introduced gas, a skin layer following the molding surface of the die 110 can be formed in the surface of a molding, thereby reliably preventing the occurrence of an appearance defect such as a sink mark.

Further, as soon as the gas collecting in the end space 120A reaches a sufficient pressure to break through the surface layer of a molten resin, the gas breaks through the surface layer, so that the gas pressure is prevented from increasing excessively. Accordingly, the pressure of gas to be introduced into the molten resin can be minimized to a level required for breaking through the surface layer, thereby avoiding the gas-induced formation of a large hollow within a molding. Thus, excellent strength can reliably be imparted to the molding.

Further, since the tip of the pin element 122 on the side of the gas outlet 123B has a flat surface substantially perpendicular to the axis of the pin element 122, the shape of the pin element 122 can be made simple, so that the processing or manufacture of the pin element 122 can be facilitated. Also, since a sufficient amount of gas can be reliably introduced into a molten resin, the occurrence of a sink mark or a like defect can be further reliably prevented Since the pin element 122 includes the anchorage portion 133 covering the opening 121A of the sleeve element 121 to thereby substantially assume the shape of the letter T, when gas is introduced into the gas flow passage 123 through the slits 133A formed in the anchorage portion 133, the gas flow functions to press the anchorage portion 133 against the flange 131 of the sleeve element 121, thereby reliably preventing the pin element 122 from separating from the sleeve element 121.

Since the end of the sleeve element 121 projects beyond the tip of the pin element 122 in an amount of 0.1 mm to 0.3 mm, a sufficient end space 120A is reliably obtained. Accordingly, gas can be sufficiently introduced into a molten resin, and a molding can be smoothly separated from the pin-and-sleeve arrangement 120 in the step of removing the molding from the die 110.

Through use of a molten resin containing reinforcing fibers as a molding material, favorable mechanical characteristics are imparted to a molding. Further, after the injection of the molten resin into a die cavity is started, there are performed a step of expanding the die cavity and a step of introducing gas into the molten resin. Thus, the introduction of gas can complement the springback-effected expansion of the fiber-containing molten resin, thereby reliably expanding the molten resin. Accordingly, there is obtained a lightweight molding having excellent mechanical characteristics with respect to unit weight.

Also, after filling a molten resin into the cavity 110A is completed, a cavity expansion step for expanding the molten resin is performed. Thus, a skin layer following the molding surface of the die 110 can be formed in the surface of the molten resin through the cooling of the molten resin before the molten resin is expanded. Accordingly, a molding having excellent appearance is obtained.

The structure and procedure of the fourth embodiment are to be considered as illustrative and not restrictive and may be modified so long as an object of the present invention is achieved.

For example, the fourth embodiment is described while gas is introduced into a molten-resin after the completion of the retraction of the movable die 113, i.e. after the completion of the step of expanding the cavity 110A. However, the gas may be introduced into the molten resin during the retreat of the movable die 113.

Figure 10:
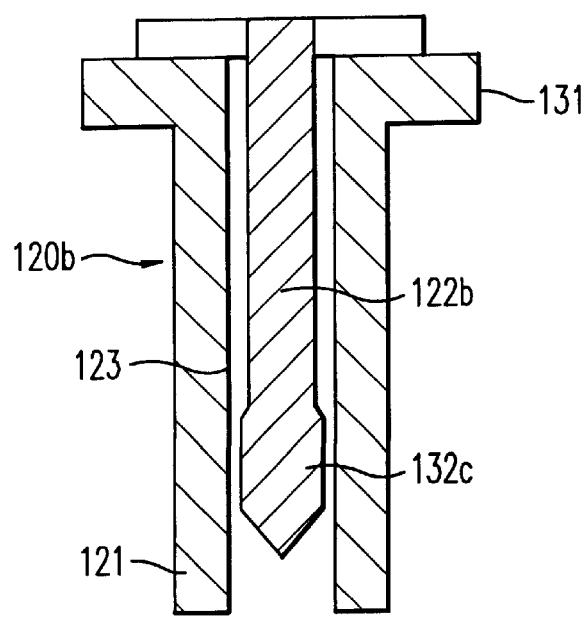
FIG. 10 is a sectional view showing a pin-and-sleeve arrangement other than that used in the fourth embodiment.

The fourth embodiment is described while the tip of the pin element 122 of the pin-and-sleeve arrangement 120 has the flat tip surface 132B. However, the shape of the pin element 122 is not particularly limited. For example, as shown in FIG. 10, the pin element 122 may have a pointed head 232B. This facilitates the manufacture of the pin-and-sleeve arrangement 120 as in the case of conventional pin-and-sleeve arrangements.

The fourth embodiment is described while the four gas flow passages 123 are formed. However, the number of gas flow passages is not particularly limited. Preferably, a plurality of gas flow passages are provided in order to efficiently introduce gas into a molten resin.

Further, the fourth embodiment is described while the die-moving apparatus 140 is built in the die 110. However, the hollow space 112A of the movable die 112 may be modified to a through-hole. A movable die may slidably be arranged in the through-hole, and a die-moving apparatus may be disposed between the movable die and a movable die plate.

Also, the fourth embodiment is described while molding is performed by the injection compression molding process or injection molding process. However, molding may be performed by an injection press molding process.

The structure of the injection molding machine employed in the fourth embodiment is to be considered as illustrative and not restrictive. The type or structure of an injection molding machine may appropriately be selected in accordance with a specific embodiment of the invention so long as the injection molding machine has a die allowing its cavity to be expandable and provided with a pin-and-sleeve arrangement in which the end of a sleeve element projects farther on the gas outlet side than the tip of a pin element.

Next, the effect of the introduction of a liquid coolant, together with gas, into a molten resin in the present invention will be described with reference to a fifth embodiment of the invention. Herein, the same features are denoted by common reference numerals, and their description will be omitted or given briefly.

Figure 11:
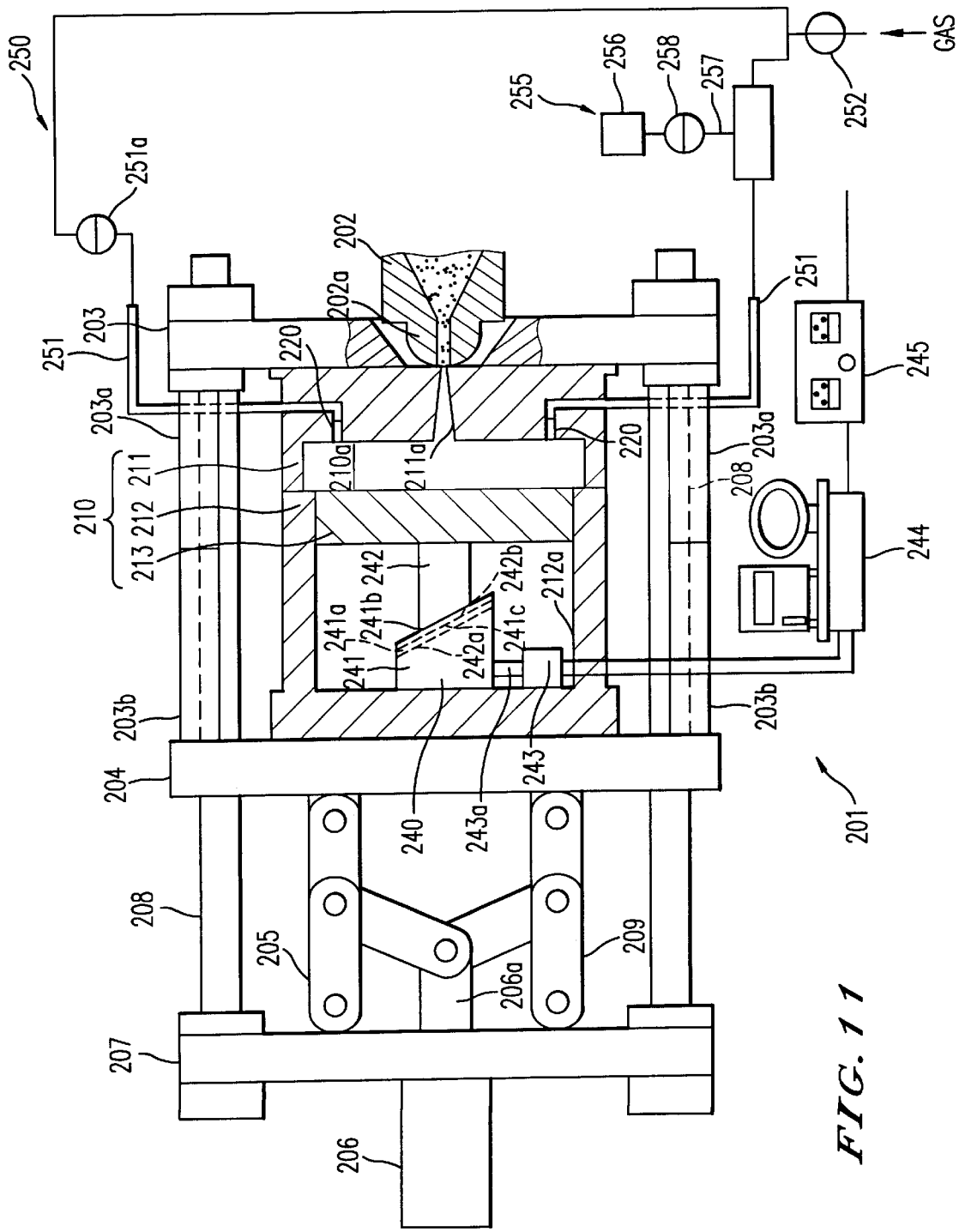
FIG. 11 is a side view showing the entirety of an injection molding machine according to a fifth embodiment of the present invention.

FIG. 11 shows an injection molding machine 201 used in the present embodiment.

The injection molding machine 201 is the injection molding machine 101 of the fourth embodiment to which a coolant feed unit for introducing a liquid coolant into a gas introduction tube is added. Accordingly, other portions of the injection molding machine 201 are similar to those of the injection molding machine 101; therefore, their description is omitted.

In FIG. 11, a coolant feed unit 255 for introducing a liquid coolant into pores formed in a molding is connected to a gas introduction tube 251 of a gas feed unit 250.

As shown in FIG. 12, the coolant feed unit 255 includes a coolant tank 256 for storing a liquid coolant and a coolant feed tube 257 for transferring the liquid coolant from the coolant tank 256 to the gas introduction tube 251. Gas flowing through the gas introduction tube 251 causes the liquid coolant to be drawn into the gas introduction tube 251.

Specifically, the junction of the gas introduction tube 251 and the coolant feed tube 257 includes an inner tube 251B and an outer tube 251C arranged concentrically with each other. The coolant feed tube 257 is open to the interior of the outer tube 151C. The diameter of the inner tube 251B reduces toward its tip. Since the end of the outer tube 251C is closed on the inner tube 251B, a high-speed gas discharged from the inner tube 251B causes a negative pressure to be generated in the space defined by the inner tube 251B and the outer tube 251C. As a result, a liquid coolant is drawn into the outer tube 251C from the coolant feed tube 257 and sent downstream together with gas.

A valve 258 is provided in the coolant feed tube 257 of the coolant feed unit 255 in order to allow or block the feed of a liquid coolant into the gas introduction tube 251.

A liquid coolant used in the present embodiment is not particularly limited so long as it is liquid at room temperature. Examples of such a liquid coolant include water, liquid calcium chloride, liquid magnesium chloride, monohydric alcohol, dihydric alcohol, and trihydric alcohol. In consideration of corrosion of metal, state of a coolant at a working temperature, etc., water, liquefied carbon dioxide gas, monohydric alcohol, and dihydric alcohol are preferred.

Next, a molding procedure of the fifth embodiment will be described.

First, the die 210 is attached to the injection molding machine 201, and resin pellets are charged into an injection cylinder 211 of an injection apparatus 201A. Then, the injection molding machine 201 is started, thus starting to plasticize and knead resin pellets contained in the injection cylinder 211.

The resin pellets employed herein are primarily formed from polypropylene and have a length of 2 to 100 mm. The resin pellets contain, in an amount of 20% to 80% by weight, reinforcing fibers which have a length equal to that of the resin pellets and are arranged in parallel. In the case of a mixture of the resin pellets and other pellets not containing reinforcing fibers, the mixture contains reinforcing fibers in an amount of 5% to 70% by weight, preferably 5% to 60% by weight.

In the injection cylinder 211, resin pellets are sufficiently plasticized and kneaded such that countless glass fibers are uniformly distributed in a molten resin and intertwined, thus facilitating the occurrence of a springback phenomenon.

A die-clamping apparatus 205 is activated so as to move a movable die plate 204 toward a stationary die plate 203, causing a clamping-force-bearing block 203B on the side of a movable die plate 204 to abut against a clamping-force-bearing block 203A on the side of a stationary die plate 203.

Figure 13A:
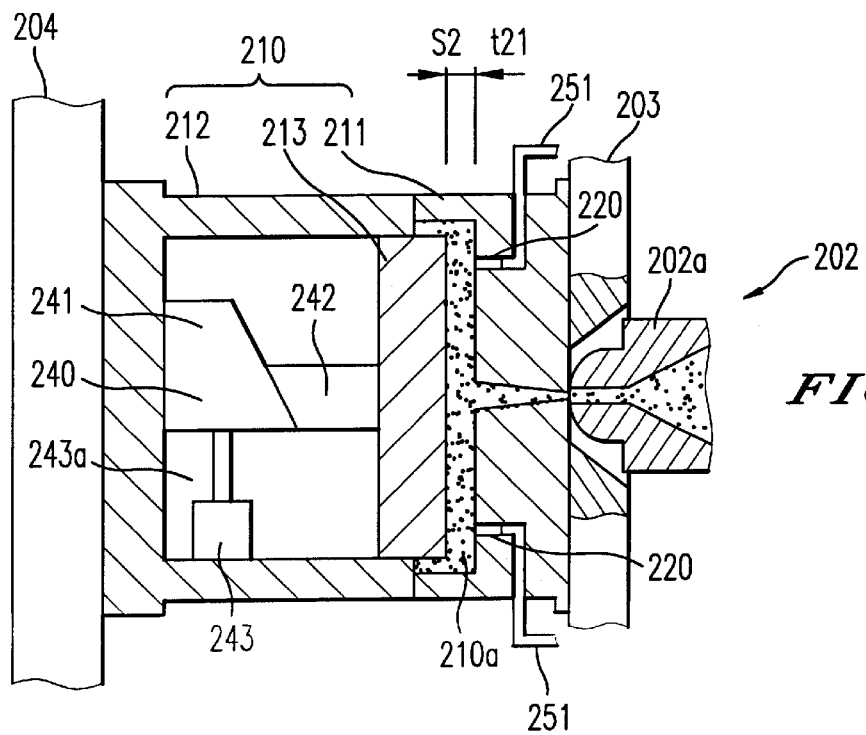
FIG. 13A is a view showing a step of molding procedure according to the fifth embodiment.

Next, a die-moving apparatus 240 is activated so as to move a movable die 213 to position S2 where a cavity 210A of the die 210 assumes a volume smaller than that corresponding to a molding, as shown in FIG. 13(A). The thickness of the cavity 210C becomes t21.

In this case, t2/t1 can be set at the range between 11.2 and 16.0, where t21 denotes the thickness of the cavity 210A defined by the movable die 213 located in position S and t22 denotes the thickness of the cavity 210A having a volume corresponding to a molding.

In the above-mentioned state, a molten resin is injected into the die 210 from the injection apparatus 201A. The cavity 210A, having a volume smaller than that corresponding to a molding, is filled with the molten resin, which is closely pressed against the molding surface of the die 210 by an injection pressure. Thus, the injection of the molten resin is completed.

Figure 13B:
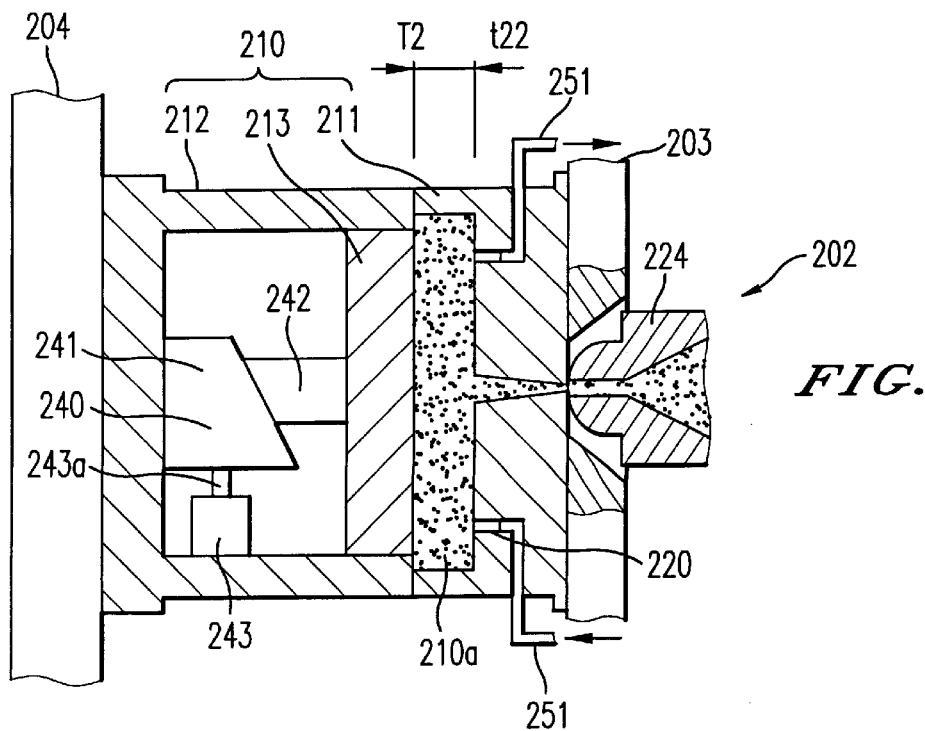
FIG. 13B is a view showing a step of molding procedure according to the fifth embodiment.

Immediately before or after the completion of injection of the molten resin or after the elapse of a predetermined time following the completion of injection of the molten resin, the die-moving apparatus 240 is activated so as to retract the movable die 213 to position T2 where the cavity 210A of the die 210 assumes a volume corresponding to a molding, as shown in FIG. 13(B). The thickness of the cavity 210A becomes t22.

During the time between the completion of injection of the molten resin and the arrival of the movable die 213 at the position T2, the surface of the molten resin contained in the die 210 is cooled, thereby forming a skin layer on the surface of the molten resin (molding).

When the movable die 213 is to be retracted after the completion of injection of the molten resin, the time between the completion of the injection and the start of the retraction may be set at the range between 0 and 10 seconds, depending on the temperature of the die 210.

The retraction rate Vr of the movable die 213 is 0.05 mm/sec to 100 mm/sec, preferably 0.05 mm/sec to 50 mm/sec.

When the movable die 213 is retracted, a springback phenomenon causes the molten resin to expand. Specifically, glass fibers contained in the molten resin are released from compression and thus apply an elastic restoring force to the molten resin; consequently, the molten resin expands, thereby forming countless pores within the molten resin. Thus, there is obtained a lightweight molding having a volume greater than that of the molding material employed.

As soon as the movable die 213 reaches the position T2, the gas feed unit 250 is activated so as to introduce gas into the molten resin through a pin-and-sleeve arrangement 220. Through the introduction of gas at this point of time, the gas is introduced into the molten resin before the molten resin contained in the die 210 is completely cooled and cured.

Figure 14A:
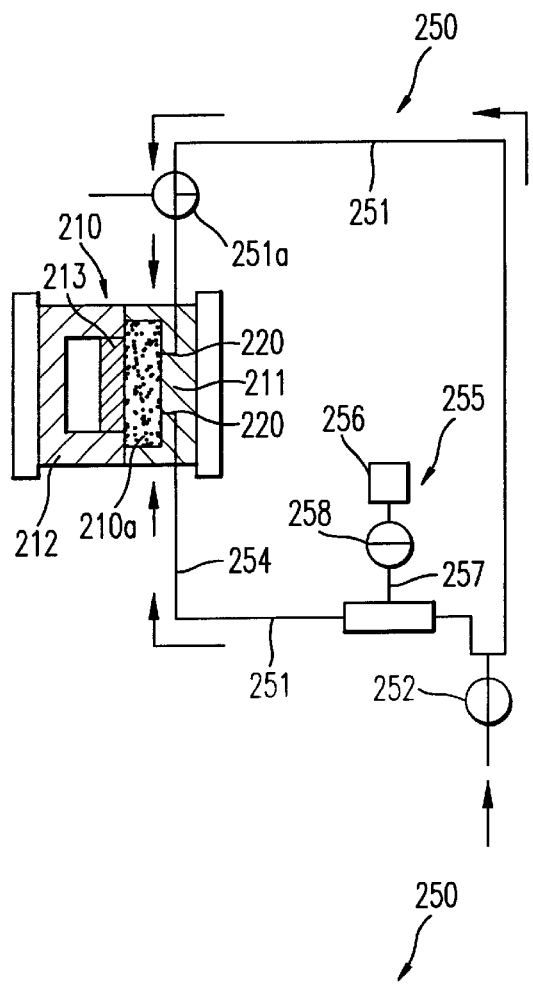
FIG. 14A is a view showing a step of procedure of feeding liquid refrigerant and gas according to the fifth embodiment.

As shown in FIG. 14(A) (see also FIG. 11), when a gas valve 252 is opened while a release valve 251A is closed, gas fed from an unillustrated gas source flows through the gas introduction tube 251 and the pin-and-sleeve arrangement 220 and is then introduced into a molten resin. The gas introduced into the molten resin is distributed into countless pores formed in the molten resin; thus, a large hollow is not formed in the molten resin.

The gas fed from the gas feed unit 250 flows through the gas introduction passage 154 and the gas tap 153 and is then introduced into the gas flow passage 123 through the slits 133A, or the gas inlets 123A, formed in a pin element 222 of the pin-and-sleeve arrangement 220. The introduced gas flows out from the gas outlet 123B into the end space 120A and collects therein. As a result, the gas pressure within the end space 120A increases. When the gas pressure increases to a level capable of breaking through the surface layer of the molten resin, the gas breaks through the layer and forms a gas inlet bore in the layer. The gas inlet bore has a cross-sectional area substantially identical to that of the open end of the sleeve element 121 on the side of the gas outlet 123B, i.e. a cross-sectional area larger than that of the gas flow passage 123. The gas is introduced into the molten resin through the gas inlet bore.

As a result of the introduction of gas into the molten resin as described above, the molten resin is pressed from inside against the molding surface of the die 210. Thus, the profile of the molding surface of the die 210 is intensively transferred to the surface of the molten resin, so that a skin layer is formed on the surface of the molten resin.

Figure 14B:
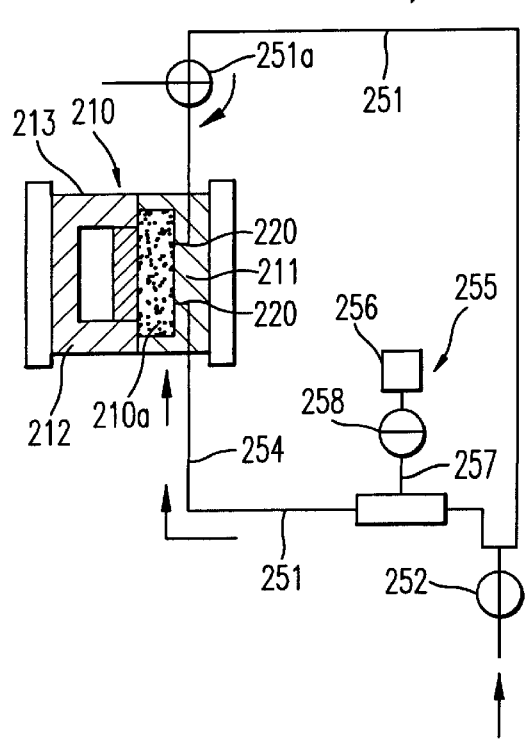
FIG. 14B is a view showing a step of procedure of feeding liquid refrigerant and gas according to the fifth embodiment.
Figure 14C:
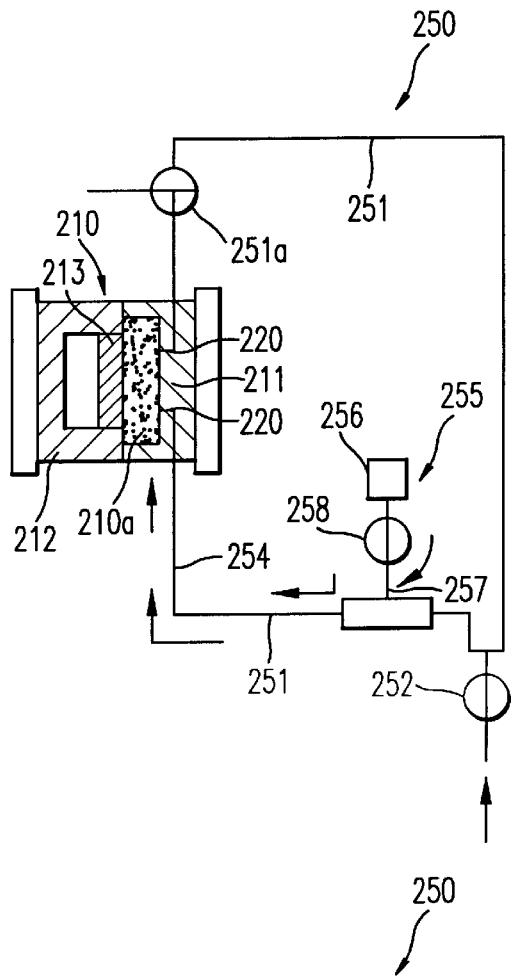
FIG. 14C is a view showing a step of procedure of feeding liquid refrigerant and gas according to the fifth embodiment.
Figure 14D:
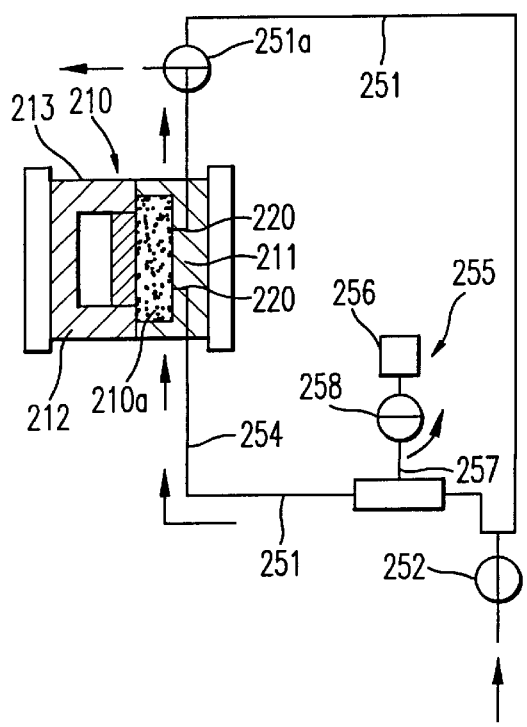
FIG. 14D is a view showing a step of procedure of feeding liquid refrigerant and gas according to the fifth embodiment.

Subsequently, as shown in FIG. 14(B), the release valve 251A is opened so as to open the gas introduction tube 251. Further, as shown in FIG. 14(C), the valve 258 is opened so as to feed a liquid coolant into the gas introduction tube 251 from the coolant tank 256 of the coolant feed unit 255 through the coolant feed tube 257. Thus, the liquid coolant, together with the gas, is introduced into pores formed in the molten resin, which becomes a molding. The thus-introduced liquid coolant removes heat accumulated within the molding and further removes the accumulated heat through evaporation. Then, as shown in FIG. 14(D), the valve 258 is closed. The vapor generated within the molding, together with the gas, is released into the atmosphere through the release valve 251A.

After the molten resin is cooled and solidified as described above, the die-clamping apparatus 205 is activated so as to retreat the movable die plate 204 and open the die 210. Then, the molding is removed from the interior of the die 210. The obtained molding has a volume greater than that of the molding material employed.

Subsequently, the above molding operation is repeated as needed.

The present embodiment as described above produces the following effects.

A liquid coolant is introduced into pores formed in a molding which, in turn, is formed in the cavity 210A in a molding process composed of the steps of: plasticizing a fiber-containing thermoplastic resin material to obtain a molten resin; injecting the molten resin into the cavity 210A of the die 210 having the movable die 213 capable of advancing or retreating in relation to the cavity 210A; and expanding the cavity 210A filled with the molten resin. Since the liquid coolant introduced into the pores within the molding has a thermal capacity greater than that of gas, even a small amount of the liquid coolant removes heat from inside the molding. Further, through the removal of heat in the form of heat of vaporization associated with the vaporization of the liquid coolant within the molding, the molding is quickly cooled.

Further, while the movable die 213 is located at the position S2 where the cavity 210A of the die 210 assumes a volume smaller than that corresponding to a molding, a molten resin is injected into the die 210 and fills the cavity 210A, whereby the molten resin is closely pressed against the molding surface of the die 210 by an injection pressure. Subsequent to the completion of injection of the molten resin and during the retracting of the movable die 213 to the position T2 to thereby expand the cavity 210A, the surface of the molten resin is cooled so as to form a skin layer on the surface of the molten resin (molding). Accordingly, the skin layer is formed along the molding surface of the die 210, thereby imparting excellent appearance to a molding.

Also, a liquid coolant, together with gas, is introduced into pores formed in a molding, and the introduced gas is vaporized and released to the exterior of the die 210. Accordingly, the liquid coolant is reliably introduced into the pores formed in the molding, and the release of the vapor prevents heat from accumulating within the molding, thereby reliably cooling the molding.

Also, the introduction of gas complements the springback-effected expansion of a molten resin. Accordingly, even when a molten resin injected into the die 210 has somewhat insufficient reinforcing fiber content to expand to a predetermined size, the introduced gas enables the molten resin to reliably expand to the volume of a molding as the movable die 213 retracts. Thus, an expected reduction in weight of a molding is reliably attained.

Further, at the latest, gas is introduced into a molten resin contained in the die 210 before the molten resin is cooled and cured. Thus, the molten resin is pressed against the molding surface of the die 210 from inside by the pressure of the introduced gas and is cooled and cured while maintaining close contact between its surface and the molding surface of the die 210. Accordingly, an appearance defect, such as a sink mark, is not generated on the surface of a molding. Thus, there is obtained a molding having a smooth surface and excellent appearance.

Also, reinforcing fibers contained in a molten resin have a length of 2 mm to 100 mm and account for 5% to 70% by weight of the molten resin. Further, reinforcing fibers contained in fiber-containing thermoplastic resin pellets are arranged in parallel with each other. Accordingly, even when the die 210 and the injection apparatus 201A are of an ordinary type, reinforcing fibers are less likely to be broken during kneading or injection.

Thus, the reinforcing fibers have a sufficient length to initiate a springback phenomenon. Further, the reinforcing fibers are contained in an amount sufficient to initiate a springback phenomenon. Accordingly, when the movable die 213 retreats, the molten resin expands sufficiently, whereby there is obtained a sufficiently lightweight molding.

Also, since the reinforcing fibers have a length not less than 2 mm, the expansion of a molten resin is reliably complemented by the injection of gas. Further, since the reinforcing fibers have a length not greater than 100 mm, bridging, defective plasticization, or a like problem does not occur during injection molding. Thus, a molding operation can be smoothly performed.

Further, since the content of reinforcing fibers is not less then 5% by weight, the injection of gas does not involve the generation of a large hollow within a molten resin, whereby an obtained molding achieves both a reduction in weight and a fiber-effected improvement in strength. Moreover, since the content of reinforcing fibers is not greater than 70% by weight, a surface layer is favorably formed on a molding, and there occurs no gas leakage between the surface of the molten resin and the molding surface of the die 210, thereby preventing the generation of an appearance defect such as a silver mark.

Also, gas is introduced into a molten resin contained in the cavity 210A after the cavity 210A is expanded to a volume corresponding to a molding through the retraction of the movable die 210C. In other words, gas is injected into an expanded molten resin. Thus, the gas to be introduced can be of a relatively low pressure. Even the low-pressure gas can be introduced throughout the interior of the molten resin without any occurrence of biased stagnation in the molten resin.

Accordingly, the pressure of gas to be introduced into a molten resin can be reduced. Moreover, since the gas is distributed throughout the interior of the molten resin, there occurs no gas leakage between the surface of the molten resin and the molding surface of the die 210, thereby preventing the generation of an appearance defect such as a silver mark.

As described above, an obtained molding achieves both an improvement in mechanical characteristics such as rigidity and strength and a reduction in weight. Accordingly, the application of the molding to transportation machinery parts such as automobile parts improves the mechanical efficiency or the like of transportation machinery. Also, the application of the molding to building and civil engineering members such as cable troughs facilitates installation work due to the lightness of the molding.

Gas or gas and a liquid coolant can be reliably introduced into pores formed in a molding by operating the valve 258 provided in the following simple molding system configuration. An injection molding machine for obtaining a lightweight molding from a fiber-containing resin includes the injection apparatus 201A for plasticizing a fiber-containing thermoplastic resin material to obtain a molten resin and for injecting the molten resin into a die cavity; the die 210 having the cavity 210A for containing the injected molten resin and the movable die 213 capable of advancing or retracting in relation to the cavity 210A; the gas feed unit 250 for introducing gas into pores formed in a molding contained in the cavity 210A; and the coolant feed unit 255 for introducing a liquid coolant into the pores formed in the molding. The coolant feed unit 255 is connected to the gas feed unit 250, adapted to make the liquid coolant drawn in by a gas flow, and has the valve 258 for allowing or blocking the feed of the liquid coolant to the gas feed unit 250.

Since the present embodiment also employs a pin-and-sleeve arrangement as in the case of the fourth embodiment, there is also obtained the aforementioned effect derived from the pin-and-sleeve arrangement.

Next, a sixth embodiment of the present invention will be described with reference to FIG. 15. The sixth embodiment is different from the fifth embodiment in a molding procedure and uses equipment configuration identical to that of the fifth embodiment.

FIG. 15 shows a molding procedure according to the sixth embodiment. In the fifth embodiment described above in which a molten resin is injected into a die cavity having a volume smaller than that corresponding to a molding so as to fill the die cavity with the molten resin and to bring the molten resin into close contact with the molding surface of a die by means of an injection pressure. In contrast, in the sixth embodiment, the movable die 213 is advanced so as to apply a compressive force to the molten resin contained in the die cavity, thereby bringing the molten resin into close contact with the molding surface of the die.

The molding procedure of the sixth embodiment will now be described in detail. Since the molding procedure of the sixth embodiment employs the injection molding machine 201 employed in the fifth embodiment, the description of the injection molding machine 201 is omitted.

First, resin pellets are charged into the injection apparatus 202. Then, the injection molding machine 201 is started, thus starting to plasticize and knead resin pellets contained to obtain a molten resin. Through the plasticization and kneading, reinforcing fibers contained in the molten resin are uniformly distributed and intertwined, thus facilitating the occurrence of a springback phenomenon. Then, the die-clamping apparatus 205 is activated so as to move the movable die plate 204 toward the stationary die plate 203, thereby closing the die 210.

Figure 15A:
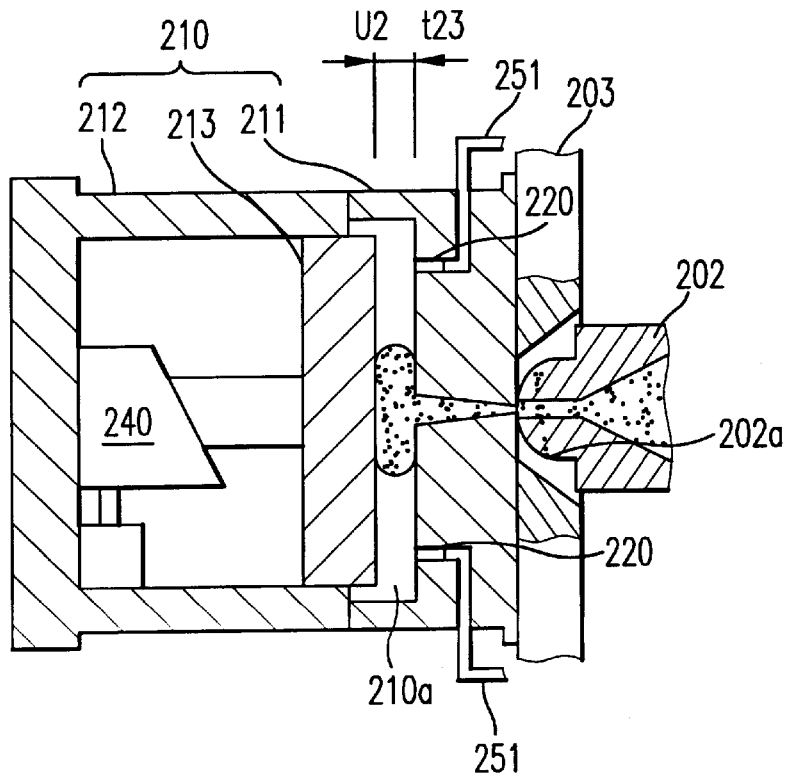
FIG. 15A is a view showing a step of molding procedure according to a sixth embodiment of the present invention.

As shown in FIG. 15(A), the die-moving apparatus 240 is activated so as to move the movable die 213 to position U2 where the thickness of the cavity 210A of the die 210 becomes t23. The movable die 213 is brought to a standstill there.

Herein, the thickness t23 of the cavity 210A is set at the sum of a thickness corresponding to the volume of a molten resin to be injected and a thickness corresponding to a stroke of compression of a molten resin contained in the die 210. In order to reduce breakage of reinforcing fibers during injection of a molten resin through use of a relatively low injection pressure, the compression stroke is preferably 0.1 mm to 50 mm, more preferably 1 mm to 10 mm. Through the employment of a compression stroke of 1 mm to 10 mm, the breakage of reinforcing fibers can be further reduced, and the occurrence of an appearance defect, such as a flow mark, can be prevented.

In the above-mentioned state, a molten resin is injected into the cavity 210A from the nozzle 202A of the injection apparatus 202.

Figure 15B:
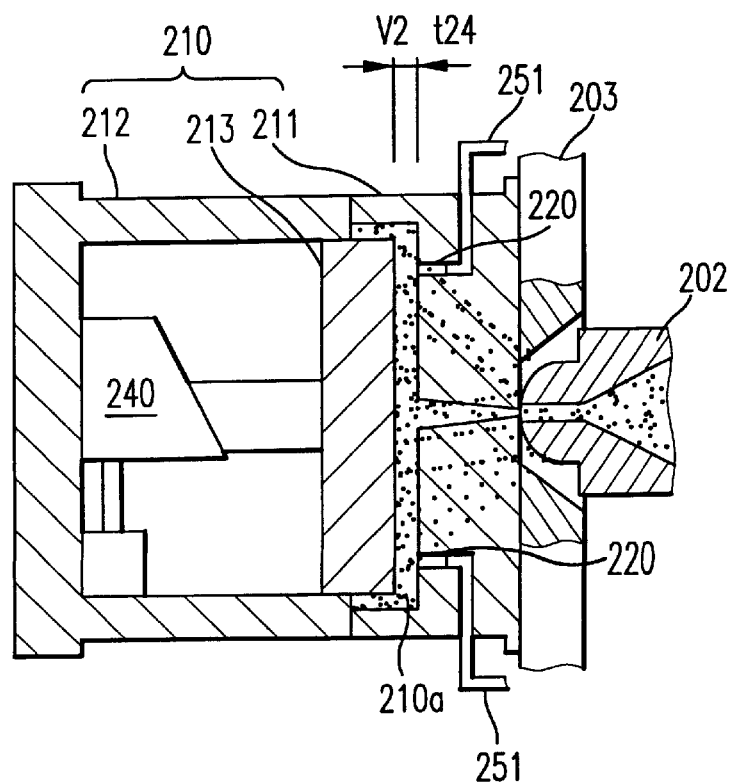
FIG. 15B is a view showing a step of molding procedure according to the sixth embodiment.

At an appropriate point of time after the start of injection of a molten resin, for example, immediately after or as soon as the injection is completed, the die-moving apparatus 240 is activated so as to advance the movable die 213 to position V2 where the thickness of the cavity 210A becomes t24 as shown in FIG. 15(B). The movable die 213 is brought to a standstill there. The thickness t24 of the cavity 210A is set such that the cavity 210A substantially assumes the volume of a molten resin to be injected.

As a result of the advancement of the movable die 213, the molten resin contained in the cavity 210A is compressed to thereby fill the cavity 210A and be closely pressed against the molding surface of the die 210 by a compressive force applied to the molten resin. Accordingly, the surface layer of the molten resin in close contact with the molding surface of the die 210 is cooled more quickly than is the interior of the molten resin.

Figure 15C:
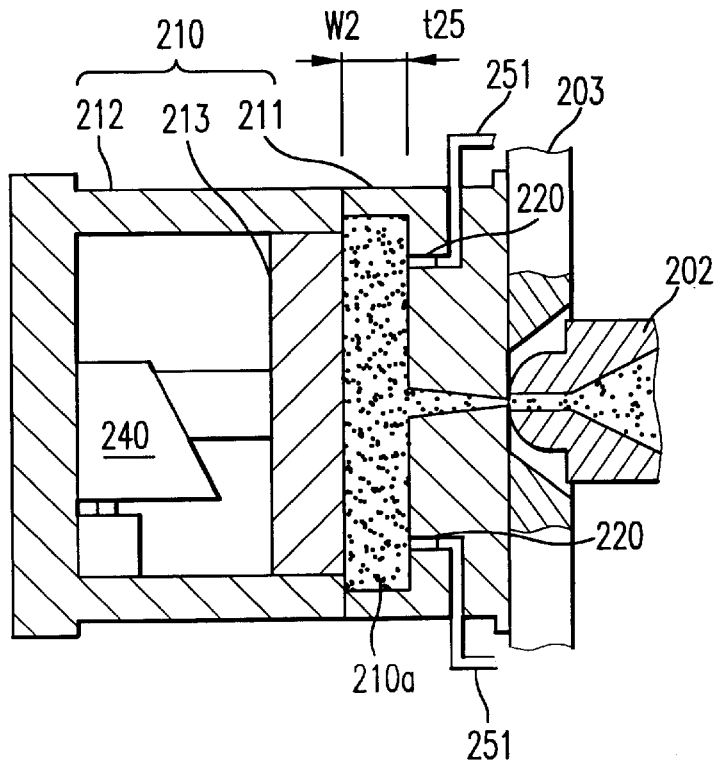
FIG. 15C is a view showing a step of molding procedure according to the sixth embodiment.

When the surface layer of the molten resin is cooled to a certain extent, the die-moving apparatus 240 is activated so as to retract the movable die 213 to position W2 where the thickness of the cavity 210A becomes t25 as shown in FIG. 15(C). The movable die 213 is brought to a standstill there.

Herein, the thickness t25 of the cavity 210A is set such that the cavity 210A assumes the volume of a molding.

The retraction rate of the movable die 213 may appropriately be set in accordance with molding conditions, the type of a resin employed, etc., for example, at 0.05 mm/sec to 100 mm/sec, preferably 0.05 mm/sec to 50 mm/sec for the purpose of reliably transferring the profile of the molding surface of the die 210 to the molten resin.

When the movable die 213 is retreated as described above to thereby expand the cavity 210A, a springback phenomenon causes the molten resin to expand. Specifically, reinforcing fibers contained in the molten resin are released from compression and thus apply an elastic restoring force to the molten resin; consequently, the molten resin expands.

After the movable die 213 reaches the position W2, the gas feed unit 250 is activated. Gas and a liquid coolant are introduced into the molten resin contained in the cavity 210A through the pin-and-sleeve arrangement 220.

The pressure of gas introduced is, for example, 0.01 MPa to 20 MPa. Particularly, through the employment of a relatively low gas pressure of 0.01 MPa to 1 Mpa, there can be further reliably prevented the occurrence of a large hollow within a molding and the occurrence of an appearance defect which would otherwise result due to gas leakage to the exterior of the molten resin, and there is no need for employing high-pressure gas facilities with a resultant reduction in equipment cost.

Accordingly, the sixth embodiment provides actions and effects similar to those of the fifth embodiment described previously. Additionally, since a molten resin is compressed and fills the die cavity 210A through the movement of the movable die 213, there can be obtained even a thin molding which would otherwise not be obtained due to a failure to fill a molten resin throughout the die cavity 210A merely by an injection pressure. Also, even when, for reason of reduction in weight, glass fibers cannot be contained in an amount sufficient to attain a required expansion, the required expansion can be attained with the assistance of the injected gas.

Next, a seventh embodiment of the present invention will be described with reference to FIG. 16. The seventh embodiment is different from the sixth embodiment in that an obtained molding includes an integral facing material and uses equipment configuration identical to that of the sixth embodiment.

FIG. 16 shows a molding procedure according to the seventh embodiment.

The molding procedure of the seventh embodiment will now be described. The seventh embodiment also employs the injection molding machine 201 employed in the fifth and sixth embodiments. However, the stationary die 211 and the movable die 213 of the movable die 212, which define a cavity 211C, have the same dimension in the width direction.

Figure 16A:
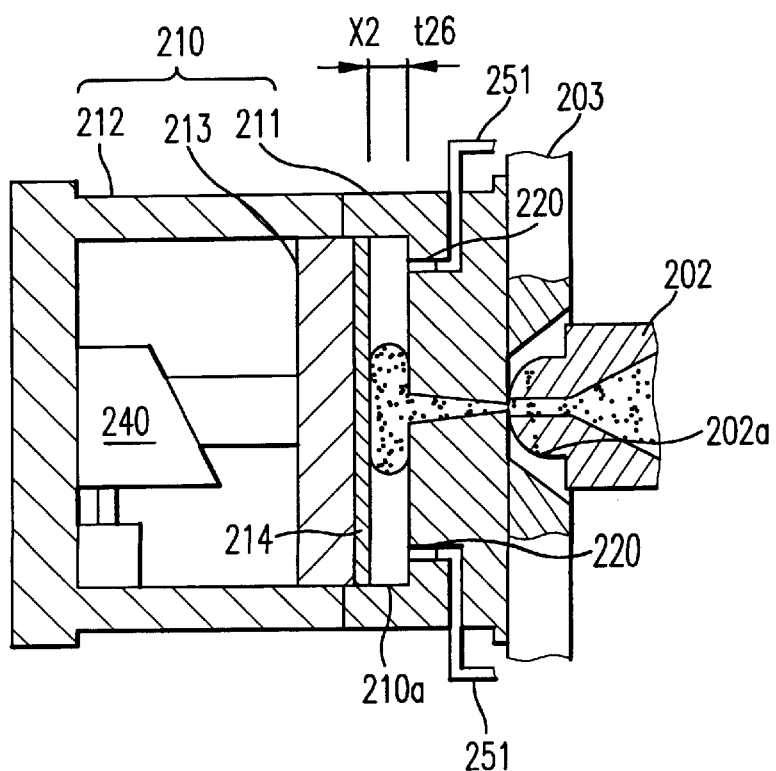
FIG. 16A is a view showing a step of molding procedure according to a seventh embodiment of the present invention.

First, the die 210 is attached to the injection molding machine 201, and a facing material 214 is attached onto the movable die 213 of the die 210 as shown in FIG. 16(A). Resin pellets are charged into the injection cylinder 211 of the injection apparatus 201A. Then, the injection molding machine 201 is started, thus starting to plasticize and knead resin pellets contained in the injection cylinder 211. Through kneading, countless glass fibers are uniformly distributed in a molten resin and intertwined, thus facilitating the occurrence of a springback phenomenon.

In relation to the attachment of the facing material 214 onto the movable die 213, the movable die 213 may be provided with attachment means, such as pins or vacuum chuck holes, for securing the facing material 214 to the movable die 213. Such attachment means enables the automatic attachment of the facing material 214 onto the movable die 213.

The facing material 214 may be attached onto the stationary die 210A instead of the movable die 213.

Examples of the facing material 214 include single-layer materials, such as woven fabrics, nonwoven fabrics, thermoplastic resin facing materials, expanded thermoplastic resin facing materials, and films printed with patterns or the like; and multilayered facing materials, such as a thermoplastic elastomer, vinyl chloride resin, or a like facing material which is lined with a thermoplastic resin, an expanded thermoplastic resin, or the like.

The die-clamping apparatus 205 is activated so as to move the movable die plate 204 toward the stationary die plate 203, causing the clamping-force-bearing block 203B on the side of the movable die plate 204 to abut against the clamping-force-bearing block 203A on the side of the stationary die plate 203.

Next, the die-moving apparatus 240 is activated so as to move the movable die 213 to position X2 where the cavity 210A of the die 210 assumes a volume larger than that of all the molten resin to be injected into the cavity 210A. The thickness of the cavity 210A becomes t26 (see FIG. 16(A)).

In the above-mentioned state, a molten resin is injected into the die 210 from the injection apparatus 201A. When all the molten resin is injected into the cavity 210A, the injection of the molten resin is completed.

Figure 16B:
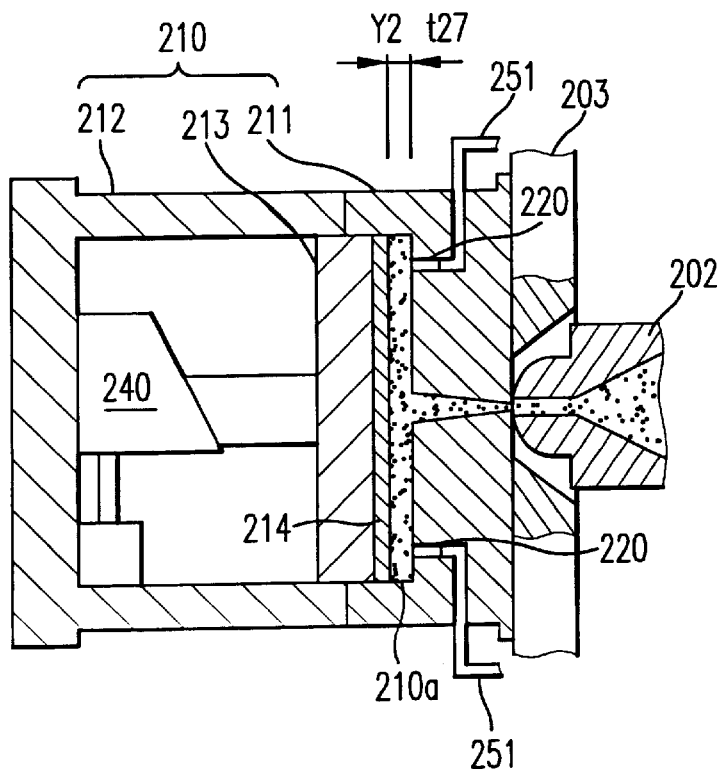
FIG. 16B is a view showing a step of molding procedure according to the seventh embodiment.
Figure 16C:
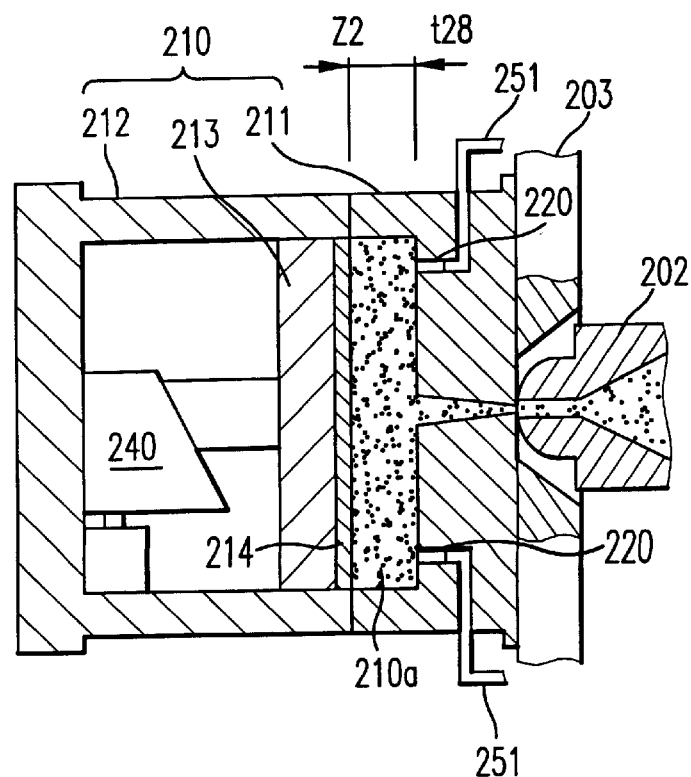
FIG. 16C is a view showing a step of molding procedure according to the seventh embodiment.

Immediately before or after the completion of injection of the molten resin or after the elapse of a predetermined time following the completion of injection of the molten resin, the die-moving apparatus 240 is activated so as to advance the movable die 213 to position Y2 where the cavity 210A of the die 210 assumes a volume smaller than that corresponding to a molding, as shown in FIG. 16(B). The thickness of the cavity 210A becomes t27.

As a result of the advancement of the movable die 213, the molten resin contained in the cavity 210A is compressed, fills the cavity 210A, and thus is closely pressed against the facing material 214 by a compressive force applied to the molten resin. Accordingly, the molten resin is bonded to the facing material 214.

As soon as the movable die 213 reaches the position Y2, the movable die 213 is retracted to position Z2 where the cavity 210A of the die 210 assumes a volume corresponding to a molding. The thickness of the cavity 210A becomes t28 (see FIG. 16(C)).

The retraction rate Vr of the movable die 213 is 0.05 mm/sec to 100 mm/sec, preferably 0.05 mm/sec to 50 mm/sec.

When the movable die 213 is retracted, a springback phenomenon causes the molten resin to expand. Specifically, glass fibers contained in the molten resin are released from compression and thus apply an elastic restoring force to the molten resin; consequently, the molten resin expands, thereby forming countless pores within the molten resin. Thus, there is obtained a lightweight molding having a volume greater than that of the molding material employed.

When the movable die 213 reaches the position Z2, gas and a liquid coolant are introduced into a molten resin through use of the gas feed unit 250 as in the case of the fifth and sixth embodiments.

After the elapse of a predetermined time required for sufficiently cooling a molding, the die-clamping apparatus 205 is activated so as to retract the movable die plate 204 and open the die 210. Then, the molding is removed from the interior of the die 210, thereby completing the molding operation. Subsequently, the above molding operation is repeated as needed.

The present embodiment also provides actions and effects similar to those of the fifth and sixth embodiments described previously. Further, through a single molding cycle, there can be obtained a unitary laminated molding which includes the facing material 214 used for covering the surface of the molding.

EXAMPLES

The present invention will next be described specifically by way of example.

Example 1

Figure 17:
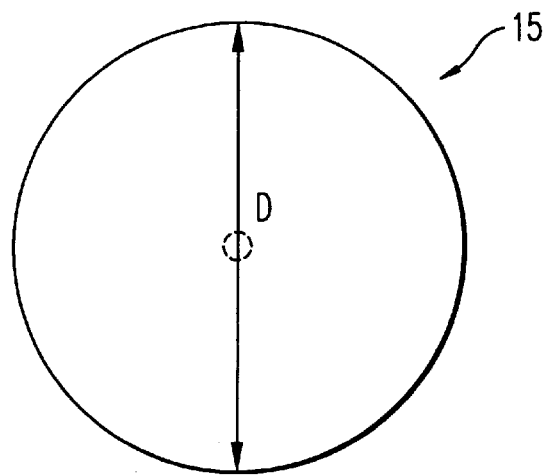
FIG. 17 is a plan view showing a molding obtained according to the first embodiment and the like of the present invention.

In Example 1, a disk-shaped molding 15 as shown in FIG. 17 was molded by use of the die and injection molding machine described in the first embodiment (FIG. 2) of the present invention.

Specifically, the following material, die, injection molding machine, and molding procedure were employed to obtain the molding of Example 1.

a) Molding material: Fiber-reinforced thermoplastic resin pellets comprising maleic-acid-modified polypropylene and glass fibers.

Pellet composition:
  Polypropylene: 58% by weight
  Maleic-acid-modified polypropylene: 2% by weight
  Glass fibers (diameter; 10 μm): 40% by weight
Pellet length: 10 mm
Contained glass fiber length: 10 mm
Melt index (MI) of polypropylene: 60 g/10 min. (230° C., 2.16 kgf)

b) Die: A die having a cavity for molding the disk-shaped molding 15 and a heater installed along the molding surface to mold the outer surface of the molding 15.
  Diameter of molding 15: 800 mm
  Thickness of molding 15: 16 mm c) Injection molding machine: A general-purpose injection molding machine equipped with the die-moving apparatus 20.
  Clamping force of die-clamping apparatus 5: 850 t
  Diameter of Nozzle 12 of injection cylinder 11: 10 mm
  Injection temperature of molten resin: 250° C. (as measured in injection cylinder 11)

e) Molding procedure: A molding procedure according to the first embodiment (FIG. 2) and including the following steps (1)–(4):

(1) Before the molten resin was injected, the movable die 10B of the die 10 was advanced to the position S and allowed to stand still. The position S was set such that the thickness t1 of the cavity formed by the movable die 10B became 4 mm.

(2) The molten resin was plasticized and measured in advance, and then injected into the interior of the die 10 in an amount equivalent to the volume of the cavity having a thickness t1 of 4 mm.

(3) Immediately after the injection of the molten resin was completed, the movable die 10B of the die 10 was retracted to the position T and allowed to stand still. The position T was set such that the thickness t2 of the cavity formed by the movable die 10B became 16 mm.

(4) Immediately after the movable die 10B reached the position T, injection of nitrogen gas was started. The injection pressure of nitrogen gas was set at 5 kg/cm² gauge.

Example 2

The molding of Example 2 was obtained in a manner similar to that of Example 1 except that the steps (3) and (4) in the molding procedure of Example 1 were replaced by the step (5) as described below.

(5) After the injection of the molten resin was completed, the movable die 10B of the die 10 was allowed to start retracting to the position T. At the same time, injection of nitrogen gas was started. When the movable die 10B reached the position T, it was allowed to stand still. The position T was set such that the thickness t2 of the cavity formed by the movable die 10B became 16 mm. The injection pressure of nitrogen gas was set at 5 kg/cm² gauge.

Example 3

The molding of Example 3 was obtained in a manner similar to that of Example 1 except that the gas pressure was 100 kg/cm².

Example 4

The molding of Example 4 was obtained in a manner similar to that of Example 1 except that 1.5 parts by weight of a foaming agent were added to 100 parts by weight of the molding material of Example 1. (The addition of the foaming agent was achieved by adding 5 parts by weight of master batch pellets (trade name; POLYSLEN TS-182, product of Eiwa Kasei Kogyo Co., Ltd.), which contained the foaming agent in an amount of 30% by weight.)

Example 5

Figure 18:
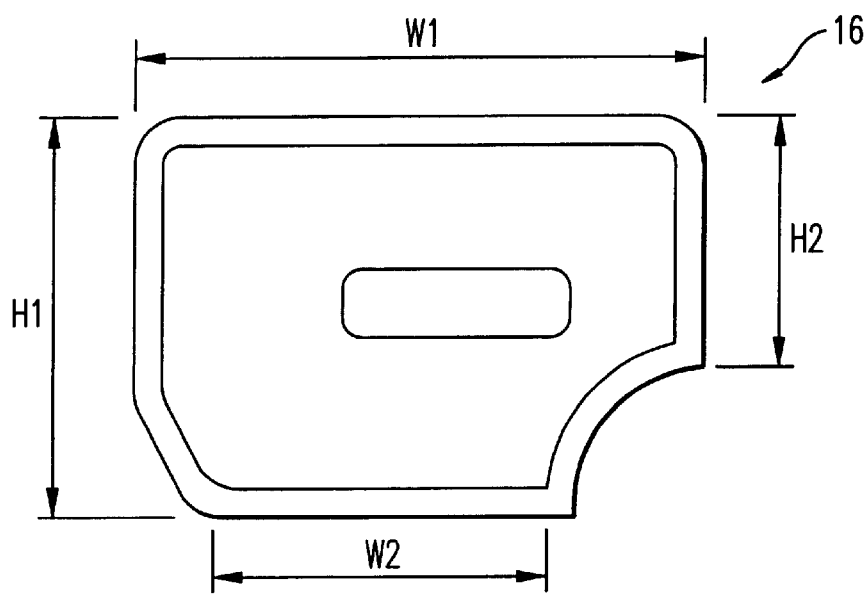
FIG. 18 is a side view showing a molding obtained according to the fifth embodiment and the like of the present invention.

In Example 5, an automobile interior material, specifically, a door panel 16 as shown in FIG. 18, was molded by use of the die and injection molding machine described in the second embodiment (FIG. 3) of the present invention.

The molding material, die, injection molding machine, and molding procedure used in this Example will next be described in detail.

a) Molding material: Fiber-reinforced thermoplastic resin pellets comprising maleic-acid-modified polypropylene and glass fibers.

Pellet composition:
  Polypropylene: 64% by weight
  Maleic-acid-modified polypropylene: 1% by weight
  Glass fibers (diameter; 16 μm): 35% by weight
Pellet length: 16 mm
Length of contained glass fiber: 16 mm
Melt index (MI) of polypropylene: 60 g/10 min. (230° C., 2.16 kgf)

b) Die: A die having a cavity for molding the door panel 16.
  Diameter of gate: 6 mm
  Dimensions of door panel 16 (see FIG. 18)
    Width (W1): 720 mm
    Height (H1): 16 mm
    Length of lower hem in FIG. 18 (W2): 400 mm
    Length of right-hand side in FIG. 18 (H2): 280 mm c) Injection molding machine: A general injection molding machine equipped with the die-moving apparatus 20.
  Clamping force of die-clamping apparatus 5: 850 t
  Injection temperature of molten resin: 250° C. (as measured in injection cylinder 11)

d) Molding procedure: A molding procedure according to the second embodiment (FIG. 3) and including the following steps (1)–(4):

(1) Before the molten resin was injected, the movable die 10B of the die 10 was moved to the position U and allowed to stand still. The position U was set such that the thickness t3 of the cavity formed by the movable die 10B became 7 mm.

(2) The molten resin was injected into the interior of the die 10 from the injection apparatus 1A in an amount equivalent to the volume of the cavity having a thickness of 2 mm.

(3) Upon start of injection of the molten resin, the movable die 10B was advanced to compress the molten resin contained in the cavity.

(4) Immediately after the movable die 10B reached the position V, the movable die 10B was allowed to start retracting to the position W. At the same time, injection of nitrogen gas was started. The position W was set such that the thickness t5 of the cavity formed by the movable die 10B became 6 mm. The injection pressure of nitrogen gas was set to 7 kg/cm$^2$ gauge.

Comparative Example 1

The molding of Comparative Example 1 was obtained in a manner similar to that of Example 1 described above except that the movable die 10B was fixed at the position which allowed the thickness of the cavity to become 4 mm from the start of injection to the completion of molding.

The elapsed time from the start of injection of the molten resin to the start of injection of nitrogen gas in Comparative Example 1 was the same as that in Example 1.

Comparative Example 2

The molding of Comparative Example 2 was obtained in a manner similar to that of Example 1 except that injection of low pressure gas performed in Example 1 was not performed.

Comparative Example 3

The molding of Comparative Example 3 was obtained in a manner similar to that of Example 2 except that fiber-reinforced polypropylene pellets having glass fibers of a weight average fiber length of 0.51 mm and a glass fiber content of 40 wt. % were used instead of the fiber-reinforced thermoplastic resin pellets used in Example 2.

Comparative Example 4

The molding of Comparative Example 4 was obtained in a manner similar to that of Comparative Example 3 except that 1.5 parts by weight of a foaming agent (the same one as used in Example 4) were added to 100 parts by weight of the glass fiber-reinforced polypropylene.

Comparative Example 5

The molding of Comparative Example 5 was obtained in a manner similar to that of Example 2 except that the injection of gas performed in Example 2 was not performed.

Results of experiment

The products obtained in Examples 1 to 5 and Comparative Examples 1 to 5 were evaluated according to the following evaluation methods A) to E).

A) The volume of each of the products was compared with the volume of the molding material, i.e. the expansion ratio of each of the products was determined and evaluated.

B) Each of the products was cut at the central portion thereof, and the cross-section was visually observed for the internal condition of expansion.

C) Each of the products was visually observed for appearance and the smoothness of surfaces to thereby be evaluated for appearance.

D) In each of the experiments described above, a plurality of moldings were manufactured and cooled for respective cooling times, which differ by increments of 20 seconds. Moldings free of thermal expansion or thermal shrinkage were evaluated as acceptable products. In each of the experiments, the shortest cooling time required for obtaining an acceptable product was deemed the cooling time.

E) Each of thus-obtained products was placed on two jigs positioned 400 mm apart in the atmosphere of −40° C. A steel ball having a weight of 3.6 kg was allowed to fall onto the product. The height was increased until the product was destroyed. The fracture strength of the product was evaluated according to the height which caused destruction.

The results of evaluation according to these evaluation methods are shown in Table 1 below.

TABLE 1

| | Expansion ratio | Evaluation of product Inside of molding | Surface condition of molding | Cooling time sec | Impact strength of product cm |
|---|---|---|---|---|---|
| Example 1 | 4.0 | No large internal hollow was observed. Good expansion. | Excellent. No sink mark, silver mark or the like was observed on surfaces. | 80 | 180 |
| Example 2 | 4.0 | No large internal hollow was observed. Good expansion. | Excellent. No sink mark, silver mark or the like was observed on surfaces. | 80 | 180 |
| Example 3 | 4.0 | Inner hollow was formed around the gas injection portion. | Wall thickness in the vicinity of gas injection port was thin. | 80 | 120 |
| Example 4 | 4.0 | No large internal hollow was observed. Good expansion. | No sink mark but some silver marks were observed on surface. | 80 | 180 |
| Example 5 | 3.0 | No large internal hollow | Excellent. No sink mark, silver mark | 60 | 120 |

TABLE 1-continued

|  | Expansion ratio | Evaluation of product Inside of molding | Surface condition of molding | Cooling time sec | Impact strength of product cm |
|---|---|---|---|---|---|
|  |  | was observed. Good expansion. | or the like was observed on surface. |  |  |
| Comparative Example 1 | Not expanded | No expansion was observed. | Excellent | 40 | 110 |
| Comparative Example 2 | 3.6 | No inner hollow was observed but expansion was slightly small. | Ripples due to sink marks were formed on surface. | 200 | 120 |
| Comparative Example 3 | 1.1 | No expansion was observed and closed cells were partially formed. | Roughness and warpages were formed on surfaces. | 96 | 60 |
| Comparative Example 4 | 1.8 | Expansion was observed, but insufficient. | Silver mark and ripples due to sink marks were formed on surface. | 240 | 40 |
| Comparative Example 5 | 2.8 | Expansion was observed, but insufficient. | Ripples due to sink marks were formed on surface. | 160 | 100 |

According to Example 1, the molten resin is sufficiently expanded; thus, weight reduction is sufficiently attained. In addition, thus-obtained products are endowed with impact strength as well as excellent appearance. Further, cooling time can be reduced.

In Example 2, there are attained, as in Example 1, weight reduction, impact strength, excellent appearance, and reduction in cooling time.

The average length of glass fibers contained in the moldings obtained in Example 2 is 7.5 mm.

In Example 3, when the moldings having a large expansion ratio are manufactured, acceptable products are difficult to obtain by only building gas pressure; thus, gas pressure is required to be set and controlled properly in consideration of the density of the molding.

According to Example 4, effects similar to those in Example 1 can be obtained by addition of a small amount of a foaming agent. However, a molding having an expansion ratio of about 4 does not require a foaming agent, although the precise ratio depends on the fiber content.

In Example 5, there are attained, as in Examples 1 and 2, weight reduction, impact strength, excellent appearance, and reduction in cooling time.

The expansion ratio in Example 5 is smaller than in Examples 1 and 2. However, the aforementioned molding procedure set the expansion ratio such that the maximum became 3.0. Therefore, the desired expansion ratio is attained in Example 5.

The impact resistance in Example 5 is less strong than in Examples 1 and 2. This is considered to be due to the difference in glass fiber content set initially, and the intended impact strength is attained in Example 5.

In Comparative Example 1, since weight reduction is not intended at all, the molten resin in the obtained moldings is not expanded. In view that the impact resistance thereof is less strong than those in Examples 1 and 2 of the invention, it is understood that according to the present invention impact strength is secured even when weight is reduced.

In Comparative Example 2, the molten resin is expanded, although the degree of expansion is less than in Examples 1 and 2; thus, weight reduction and impact strength are attained to a certain extent. However, due to a sink mark on the surface, the products do not exhibit excellent appearance.

According to Comparative Example 3, the surface of the product is in good condition. However, expansion stemming from a springback phenomenon are hardly observed in the molten resin; thus, weight reduction and impact strength are not attained.

In Comparative Example 4, weight reduction and impact strength are attained as in Examples 1 to 3. However, addition of a foaming agent generates silver mark and makes the pressure imposed on the resin against the die insufficient; thus, the resin is released from the die because of after shrinkage and cooling takes longer. Therefore, the products do not exhibit excellent appearance or cooling time cannot be reduced.

In Comparative Example 5, the molten resin is insufficiently expanded. In addition, the products do not exhibit excellent appearance, due to sink mark.

Example 6

In Example 6, the laminated molding 15 comprising a facing material integrated with the body and having a disk shape as shown in FIG. 17 was molded by use of the die and injection molding machine described in the third embodiment (FIG. 4) of the present invention.

The molding material, facing material, die, injection molding machine, and molding procedure used in this Example will next be described in detail.

a) Molding material: Fiber-reinforced thermoplastic resin pellets comprising maleic-acid-modified polypropylene and glass fibers.

Figure 19:
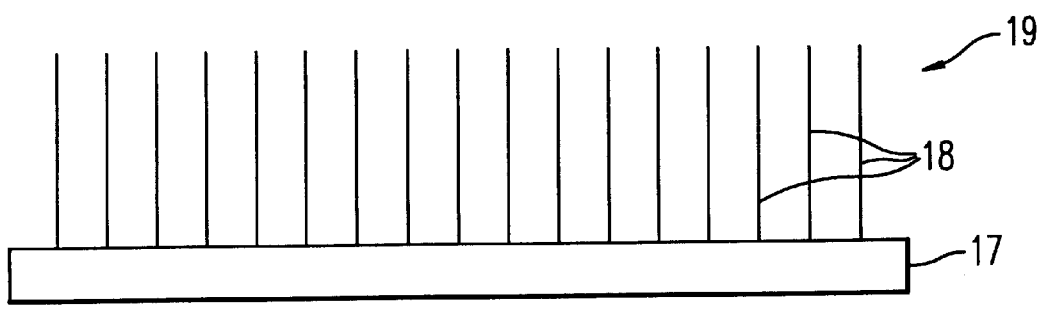
FIG. 19 is a sectional view showing a facing material employed in the sixth embodiment and the like of the present invention.

Pellet composition:
    Polypropylene: 58% by weight
    Maleic-acid-modified polypropylene: 2% by weight
    Glass fibers (diameter; 10 μm): 40% by weight
Pellet length: 14 mm
Length of contained glass fiber: 14 mm
Melt index (MI) of polypropylene; 60 g/10 min. (230° C., 2.16 kgf)

b) Facing material: The facing material 19 as shown in FIG. 19 was used. The facing material 19 having 3 mm of thickness is composed of a sheet-like backing material 17 and countless minute hairs 18 implanted in the backing material 17.

c) Die: A die having a cavity for molding the disk-shaped molding 15 includes a movable die 10B and a stationary die 10A. The movable die 10B is equipped with a heater oriented along the periphery of the molding 15. The stationary die 10A has a cooling path for the passage of cooling water at 5

Diameter of molding 15: 800 mm

Thickness of molding 15: 19 mm d) Injection molding machine: A general injection molding machine equipped with the die-moving apparatus 20.

Clamping force of die-clamping apparatus 5: 850 t

Diameter of Nozzle 12 of injection cylinder 11: 10 mm

Injection temperature of molten resin: 250° C. (as measured in-injection cylinder 11)

d) Molding procedure: A molding procedure according to the third embodiment (FIG. 4) and including the following steps (1)–(5):

(1) Before the molten resin was injected, the movable die 10B of the die 10 was moved to the position X and allowed to stand still. The position X was set such that the thickness t6 of the cavity formed by the movable die 10B became 18 mm.

(2) The molten resin was injected into the interior of the die 10 from the injection apparatus 1A in an amount equivalent to the volume of the cavity having a thickness of 4 mm.

(3) Upon start of injection of the molten resin, the movable die 10B was advanced to compress the molten resin contained in the cavity.

(4) Immediately after the movable die 10B reached the position Y, the movable die 10B was allowed to start retracting to the position Z. The position Z was set such that the thickness t8 of the cavity formed by the movable die 10B became 19 mm.

(5) Immediately after the movable die 10B reached the position Z, injection of gas of liquefied carbon dioxide was started. The injection pressure of gas was set to 8 kg/cm² gauge.

Example 7

The molding of Example 7 was obtained in a manner similar to that of Example 6 except that the steps (4) and (5) in the molding procedure of Example 6 were replaced by the step (6) as described below.

(6) Immediately after the movable die 10B reached the position Y, the movable die 10B start retracting to the position Z. At the same time, injection of gas of liquefied carbon dioxide was started. In Example 7, the thickness t8 of the cavity was set to become 19 mm, and the injection pressure of gas was set to 8 kg/cm² gauge, as in Example 6.

Example 8

In Example 8, the movable die 10B was allowed to stand still at the position where the volume of the cavity is equivalent to the total injected volume of the molten resin. Then the molten resin was injected into the die. Subsequently, retraction of the movable die 10B to the position Z was started. In other words, the molding of Example 8 was obtained in a manner similar to that of Example 6 except that the step of compressing the molten resin by advancing the movable die 10B performed in Example 6 was not performed.

Comparative Example 6

The molding of Comparative Example 6 was obtained in a manner similar to that of Example 6 except that injection of gas performed in Example 6 was not performed.

Comparative Example 7

The molding of Comparative Example 7 was obtained in a manner similar to that of Example 6 except that fiber-reinforced polypropylene pellets having glass fibers of a weight average fiber length of 0.51 mm and a glass fiber content of 40 wt. % were used instead of the fiber-reinforced thermoplastic resin pellets used in Example 6, and that 1.5 parts by weight of a foaming agent (the same one as used in Example 4) were added to 100 parts by weight of the molding material as described in Example 4.

Results of experiment:

The products obtained in Examples 6 to 8 and Comparative Examples 6 and 7 were evaluated according to the aforementioned evaluation methods A) to D) and the following method F).

F) The facing material integrated with the body of each of the products was visually observed and touched by hand to thereby be evaluated for its condition.

The results of evaluation according to these evaluation methods are shown in Table 2 below.

TABLE 2

| | | Evaluation of product | | | Cooling time sec |
|---|---|---|---|---|---|
| | Expansion ratio | Inside of molding | Surface condition of molding | Condition of facing | |
| Example 6 | 4.0 | No large internal hollow was observed. Good expansion. | Excellent. No sink mark, silver mark or the like was observed on surface. | Excellent. Implanted hairs of surface coat were slightly crushed. | 100 *(45) |
| Example 7 | 4.0 | No large internal hollow was observed. Good expansion. | Excellent. No sink mark, silver mark or the like was observed on surface. | Remarkably excellent. No implanted hairs of surface coat were crushed. | 100 |
| Example 8 | 4.0 | No large internal hollow was observed. Good expansion. | No sink mark, silver mark or the like was observed on surface. Good condition. | Implanted hairs of surface coat is considerably crushed. | 100 |
| Comparative Example 6 | 3.4 | No inner hollow was observed but | Ripples due to sink marks were formed on | No implanted hairs of surface coat were crushed | 320 |

TABLE 2-continued

| | Expansion ratio | Inside of molding | Surface condition of molding | Condition of facing | Cooling time sec |
|---|---|---|---|---|---|
| | | expansion was slightly small. | surface. | but unevenness was formed according to resin surface thereunder. | |
| Comparative Example 7 | 2.8 | Unsatisfactory expanding. | Silver marks and ripples due to sink marks were formed on surface. | No implanted hairs of surface coat were crushed but unevenness was formed according to resin surface thereunder. | 300 |

*Cooling time when gas was released after 10 seconds from the start of gas injection while maintaining a pressure of 8 kg/cm$^2$ (gauge pressure).

According to Example 6, the molten resin is sufficiently expanded; thus, weight reduction is sufficiently attained. In addition, properties of the facing material are not impaired, and excellent appearance is attained. Further, cooling time can be reduced.

In Example 7, there are attained, as in Example 6, weight reduction, maintenance of properties of the facing material, excellent appearance, and reduction in cooling time.

In Example 8, weight reduction, excellent appearance, and reduction in cooling time are attained as in Examples 6 and 7. Hairs implanted on the facing material were crushed, but the products were acceptable after the hairs were raised again.

In Comparative Example 6, the molten resin is insufficiently expanded; thus, weight reduction is insufficiently attained. In addition, since sink mark is generated, the products do not exhibit excellent appearance. Further, since gas is not used for cooling, the molten resin takes a considerably long time to cool.

In Comparative Example 7, expansion due to a spring-back phenomenon was hardly observed in the molten resin; thus, weight reduction due to expansion is not attained. In addition, the molding has a large hollow formed therein. Further, silver mark and sink mark are formed on the surface of the resin; thus, excellent appearance is not attained. Also, gas was not allowed to be injected into the molding; thus, cooling time remained long. Hairs implanted on the facing material were not crushed; thus, properties of the facing material could be maintained.

Example 9

In Example 9, a molding was molded by use of the die and injection molding machine described in the fourth embodiment (FIG. 4) of the present invention.

The molding material, molding, die, pin-and-sleeve arrangement, injection molding machine, and molding conditions employed in this Example will next be described in detail.

a) Molding material: Glass fiber-reinforced polypropylene pellets (trade name; MOSTRON L L-4000P, product of Idemitsu Petrochemical Co., Ltd.):
  1) Pellet diameter: 2 mm
  2) Pellet length: 12 mm
  3) Glass fiber content: 40 wt. %
  4) Glass fiber length:
  12 mm (the same length as pellets)
b) Molding: A rectangular flat plate:
  1) Length of molding: 600 mm
  2) Width of molding: 300 mm
  3) Thickness of molding: 12 mm c) Die: A die having a cavity for molding the aforementioned moldings: (Since a movable die is provided, the dimension of the cavity corresponding to the thickness of the molding is adjustable.)
d) Pin-and-sleeve arrangement: A pin-and-sleeve arrangement having a shape as shown in FIGS. 6 to 8.
  1) Overall length of pin-and-sleeve arrangement: 120 mm
  2) Internal diameter of sleeve element: 3 mm
  3) Outside diameter of sleeve element: 5 mm
  4) Diameter of tip surface of pin element: 3 mm
  5) Length of protrusion of sleeve element from pin element: 2 mm
  6) Length of protrusion of pin-and-sleeve arrangement from mold area: 2 mm
e) Injection molding machine: A horizontal type injection molding machine (850MGW-160, product of Mitsubishi Heavy Industries, Ltd., clamping force; 850 t) to which is attached a unit (trade name; Idemitsu IPM Unit, product of Idemitsu Petrochemical Co., Ltd.) to allow the movable die to advance and retreat:
f) Molding Conditions: A molding procedure according to the aforementioned embodiment:
  1) Molding temperature: 250° C. (as measured in injection cylinder)
  2) Die temperature: 60° C.
  3) Resin injection pressure: 60% (set point for rated maximum injection pressure)
    Injection speed: 70% (set point for rated maximum injection speed)
    Injection time: 3.7 seconds
  4) Thickness of Cavity (see FIG. 9)
    Thickness t12 at the time of resin injection: 4 mm
    Thickness t13 at the time of resin expansion: 12 mm (expansion ratio; 3)
  5) Timing of start of retraction of movable die: 4.2 seconds (after start of injection)
  Timing of completion of retraction of movable die: 5.2 seconds (after start of injection)
  6) Timing of gas injection: 7 seconds (after start of injection)
  7) Gas pressure: 0.5 MPa
  (When gas failed to be injected into the molten resin at 0.5 MPa, the pressure was gradually raised to the level which allowed gas injection, with the maximum pressure being 1.0 MPa.)
  8) Cooling time: 60 seconds Example 10

The molding in Example 10 was obtained in a manner similar to that in Example 9 except that a pin-and-sleeve arrangement as shown in FIG. 10 was used instead of the one used in Example 9.

Results of experiment:

The products obtained in Examples 9 and 10 were evaluated for their appearance. The results of evaluation are shown in Table 3. Table 3 also shows the gas pressures which permitted gas to be injected into the molten resin.

TABLE 3

|  | Gas pressure (MPa) | Appearance |
|---|---|---|
| Example 9 | 0.5 | Good |
| Example 10 | 0.5 | A few sink marks were formed. |

Table 3 shows that since a pin-and-sleeve arrangement having the sleeve element protruding from the tip of the pin element was used for molding in Example 9, the moldings exhibited excellent appearance having no deficiencies such as sink mark. Since a pin-and-sleeve arrangement having an acuminated tip of the pin element used in Example 10 allowed a slightly smaller amount of gas to be injected into the molten resin than a pin-and-sleeve arrangement used in Example 1, slight sink mark was formed. This is believed to have resulted from the fact that the surface of the molten resin pressed by gas was tilted, to thereby cause the gas to be concentrated at the top part of the surface of the molten resin and result in failure to uniformly fill the top space with gas.

Example 11

In Example 11, a molding was molded by use of the die, injection molding machine, and molding procedure described in the seventh embodiment (FIG. 16) of the present invention.

The molding material, molding, die, pin-and-sleeve arrangement, injection molding machine, and molding conditions employed in this Example will next be described in detail.

a) Molding material: Glass fiber-reinforced polypropylene pellets (trade name; MOSTRON L L-4000P, product of Idemitsu Petrochemical Co., Ltd.):

1) Pellet diameter: 2 mm

2) Pellet length: 12 mm

3) Glass fiber content: 40 wt. %

4) Glass fiber length: 12 mm,(the same length as pellets)

b) Molding: A rectangular flat plate:

1) Length of molding: 600 mm

2) Width of molding: 300 mm

3) Thickness of molding: 12 mm c) Die: A die having a cavity for molding the aforementioned moldings: (Since a movable die is provided, the dimension of the cavity corresponding to the thickness of the molding is adjustable.)

d) Pin-and-sleeve arrangement: A pin-and-sleeve arrangement having a shape as shown in FIGS. 7 to 8.

1) Overall length of pin-and-sleeve arrangement: 120 mm

2) Distance (D) between flat portions of pin element:

3) Clearance (t) of gas passage: 0.05 mm

4) Length (L) of protrusion of sleeve element from pin element: 2 mm e) Injection molding machine: A horizontal-type injection molding machine (850MGW-160, product of Mitsubishi Heavy Industries, Ltd., clamping force; 850 t) to which is attached a unit (trade name; Idemitsu IPM Unit, product of Idemitsu Petrochemical Co., Ltd.) to allow the movable die to advance and retreat:

f) Molding Conditions: A molding procedure according to the aforementioned embodiment:

1) Molding temperature: 250° C. (as measured in injection cylinder)

2) Die temperature: 60° C.

3) Resin injection pressure: 60% (set point for rated maximum injection pressure)

Injection speed: 70% (set point for rated maximum injection speed)

Injection time: 3.8 seconds

4) Thickness of Cavity

Thickness t26 at the time of resin injection: 12 mm

Thickness t27 at the time of resin compression: 3 mm

Thickness t28 at the time of resin expansion: 9 mm (expansion ratio: 3)

5) Timing of start of advance of movable die: 3.0 seconds (after start of injection)

Timing of start of retraction of movable die: 5.0 seconds (after start of injection)

Timing of completion of retraction of movable die: 6.0 seconds (after start of injection)

6) Timing of gas injection: 6.5 seconds (after start of injection)

Gas pressure: 0.5 MPa

Gas flow rate: 3 liters/min.

7) Liquid refrigerant: water

8) Facing material: 3 mm in thickness (15-fold-expanded polypropylene layer/polyvinyl chloride imitation leather)

Under the above conditions, moldings were molded with the facing material integrated with the body, and cooling temperature was determined. A plurality of moldings were manufactured and cooled for respective cooling times, which are differ by increments of 10 seconds. Moldings free of thermal expansion and thermal shrinkage were evaluated as acceptable products. In this experiment, the shortest cooling time required for obtaining an acceptable product was deemed the cooling time. The results are shown in Table 4.

TABLE 4

|  | Cooling time (sec) | Amount of gas used (litter) |
|---|---|---|
| Example 11 | 20 | 1 |

According to Table 4, the cooling time in Example 11 is as extremely short as 20 seconds. In addition, although gas is released at the time of molding in Example 11, only a small amount of gas is used.

The above-described embodiments and examples are to be considered illustrative and not restrictive. The present invention is not to be limited thereto, but may be modified without deviating from the gist of the invention.

For example, the thermoplastic resin serving as the main component of resin pellets is not limited to polypropylene, but may be any of polyolefin resins such as propylene-ethylene block copolymers and polyethylene, polyethylene resins, polystyrene resins, ABS resins, polyvinyl chloride resins, polyamide resins, polyester resins, polyacetal resins, polycarbonate resins, aromatic polyether or thioether resins, aromatic polyester resins, polysulfone resins, and acrylate resins. The specific composition of a thermoplastic resin can be selected as adequate so long as the thermoplastic resin enables the manufacture of a molding reinforced with glass fibers.

Reinforcing fibers contained in resin pellets are not limited to glass fibers, but may be ceramic fibers, inorganic fibers, metallic fibers, organic fibers, or the like. Reinforcing fibers to be used may be selected as adequate when the invention is used in practice.

Although in some of the examples a foaming agent was not contained in a molding material, a foaming agent can be contained in a molding material in an amount of not greater than 3 parts by weight based on 100 parts by weight of the molding material.

By virtue of a molding material containing a foaming agent as above, even when springback phenomenon alone fails to induce recovering force of fibers, the retraction of a movable die enables the molten resin to be reliably expanded to the volume of an intended molding even when gas injection pressure is insufficient due to low gas pressure, since the foaming of the foaming agent compensates for the lack of fiber recovering force.

When the content of a foaming agent is in excess of 3 parts by weight, silver mark is often formed with a resultant impairment in appearance, and a relatively large hollow may be formed in a molding, resulting in significant impairment in strength and rigidity.

An inlet for gas is not limited to a pin-and-sleeve arrangement (gas nozzle) that a die cavity is equipped with, but may be a gas nozzle (pin-and-sleeve arrangement) that communicates to a sprue or runner inside a die, or to a nozzle of an injection cylinder.

Gas injected into a molten resin is not limited to nitrogen gas, but inactive gas such as argon gas which does not easily react with the resin from which a molding is molded is preferred.

When injected gas is used for cooling, preferred examples include gas and liquefied carbon dioxide that are cooled to 15° C. or lower.

A liquid refrigerant may be injected into air gaps of the moldings following gas or the refrigerant and gas may be injected simultaneously.

A liquid refrigerant is not limited to water, but may be liquefied carbon dioxide; alcohols including a monohydric alcohol such as methanol or ethanol, a dihydric alcohol such as ethylene glycol or trimethylene glycol, and a trihydric alcohol such as glycerine; ether such as dimethyl ether and diethyl ether; or solutions in which salts such as calcium chloride and magnesium chloride are dissolved. Such liquid refrigerants which are liquid at room temperature may be selected as adequate.

A tube for providing gas to the molding may be separate from a tube for providing a liquid refrigerant to the molding.

According to the present invention, there is obtained a lightweight molding having excellent mechanical characteristics such as strength, rigidity, and heat resistance. Also, the molding exhibits excellent appearance having no deficiencies such as sink mark. In addition, productivity can be significantly improved due to high cooling efficiency.

Since a pin-and-sleeve arrangement having the edge of the sleeve element protruding from the tip of the pin element toward the gas exit is used for expanding the fiber-containing resin for molding, the gas pressure inside the top space surrounded by the tip of the pin element and the sleeve element can be increased even when the pressure of gas to be injected into a gas path is low. Therefore, gas is reliably injected into the molten resin by thrusting through the outermost surface layer of the molten resin in a sufficient amount. Thus, injected gas enables the molten resin to be cooled in a state in which the molten resin is pressed against the mold area of the die, to thereby reliably prevent impairment in appearance such as sink mark.

Further, as soon as the gas pressure is increased to a level which is high enough to thrust through the outermost surface layer of the molten resin, gas is released toward the inside of the molten resin, to thereby prevent the gas pressure from becoming too high. Thus, since the gas pressure upon injection into the molten resin can be adjusted to the minimum pressure required for thrusting through the outermost surface layer, a large hollow is not formed in the molding, to thereby endow the molding with excellent strength.

In addition, when a liquid refrigerant is used in addition to gas, cooling time can be reduced.

What is claimed is:

1. A method of obtaining a fiber-reinforced resin injection molding, comprising the steps of: injecting into a die having an internal cavity a molten resin obtained through the plasticization of a molding material; and introducing gas into the molten resin, the molding material comprising fiber-containing thermoplastic resin pellets which contain reinforcing fibers having a length of 2 mm to 100 mm, the reinforcing fibers accounting for 5% to 70% by weight of the molding material, the die including a movable die capable of advancing into and retracting from the internal cavity of the die, wherein after the injection of the molten resin into the die cavity is started, the movable die is retracted to a position where the die cavity assumes a volume corresponding to the molding, and gas is introduced into the molten resin filling the die cavity, wherein the molding material contains at least fiber-containing thermoplastic resin pellets which have a length of 2 mm to 100 mm and which contain reinforcing fibers having a length equal to that of the resin pellets and arranged in parallel to one another in an amount of 20% to 80% by weight.

2. The method according to claim 1, wherein the gas is introduced into the molten resin that has been supplied to the cavity, after the movable die is retracted until continuous spaces formed by small bubbles are formed within the molten resin.

3. The method according to claim 1, wherein the gas is introduced into the molten resin that has been supplied to the cavity, after the movable die has been retracted to the position at which the cavity assumes a volume corresponding to the molding.

4. The method according to claim 1 or 3, wherein the gas-introducing operation is performed simultaneous with the retreat movement of the movable die.

5. The method according to claim 1, wherein the movable die is advanced sometime between the start of injection of the molten resin and the start of retraction of the movable die, in order to compress the molten resin filling the die cavity.

6. The method according to claim 1, wherein the molding material contains a foaming agent in an amount of not more than 3 parts by weight with respect to 100 parts by weight of the molding material.

7. The method according to claim 1, wherein the gas is a refrigerant gas having a temperature equal to or lower than 15° C.

8. The method according to claim 1, wherein the pressure of the gas is in the range of 0.1–200 kg/cm$^2$.

9. The method according to claim 8, wherein the pressure of the gas is in the range of 0.1–20 kg/cm$^2$.

10. The method according to claim 1, wherein the molding is cooled by causing the gas to pass through the molten resin and evacuate.

11. The method according to claim 1, wherein the gas is introduced through a pin-and-sleeve arrangement provided in the die and opening to a sprue, runner, or die cavity.

12. The method according to claim 11, wherein the pin-and-sleeve arrangement includes a sleeve element, a pin element inserted into the sleeve element, and a gas flow passage defined by the sleeve element and the pin element, and the end portion of the sleeve element projects farther toward the gas outlet side than does the tip of the pin element.

13. The method according to claim 12, wherein the tip of the pin body on the side of the gas outlet has a flat tip surface substantially perpendicular to the axial direction of the pin body.

14. The method according to claim 12 or 13, wherein the sleeve element is cylindrically formed;

the pin element is formed substantially in the shape of the letter T and includes a pin body inserted into the sleeve element and an anchorage portion, which is provided at the gas-inlet-side base end of the pin body and covers the gas-inlet-side opening of the sleeve element; and the gas flow passage has a gas inlet comprising slits formed in the anchorage portion.

15. The method according to claim 12, wherein the gas-outlet-side end of the sleeve element projects beyond the tip of the pin element in an amount of 0.1 mm to 3 mm.

16. The method according to claim 1, wherein a gas is introduced into the molten resin and simultaneously a liquid refrigerant is supplied into the molten resin.

17. The method according to claim 16, wherein the gas alone is first injected into an air gap of the molding, and subsequently, a combination of the gas and the liquid refrigerant is injected into the molding.

18. The method according to claim 16 or 17, wherein the liquid refrigerant supplied along with the gas is vaporized and released to the exterior of the die.

19. The method according to claim 1, wherein a facing material for covering a molding is attached to the die prior to start of molding.

* * * * *